US010830305B2

(12) United States Patent
Sakuta et al.

(10) Patent No.: US 10,830,305 B2
(45) **Date of Patent: *Nov. 10, 2020**

(54) DAMPING VALVE AND SHOCK ABSORBER

(71) Applicant: KYB Corporation, Tokyo (JP)

(72) Inventors: Atsushi Sakuta, Kanagawa (JP); Yasuhiro Inagaki, Aichi (JP)

(73) Assignee: KYB CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/528,809

(22) PCT Filed: Nov. 24, 2015

(86) PCT No.: PCT/JP2015/082927

§ 371 (c)(1),
(2) Date: May 23, 2017

(87) PCT Pub. No.: WO2016/084797

PCT Pub. Date: Jun. 2, 2016

(65) Prior Publication Data

US 2017/0328440 A1 Nov. 16, 2017

(30) Foreign Application Priority Data

Nov. 25, 2014 (JP) ................................ 2014-237842
Nov. 25, 2014 (JP) ................................ 2014-237846

(51) Int. Cl.
*F16F 9/348* (2006.01)
*F16F 9/516* (2006.01)
(Continued)

(52) U.S. Cl.
CPC .............. *F16F 9/516* (2013.01); *F16F 9/067* (2013.01); *F16F 9/34* (2013.01); *F16F 9/46* (2013.01); *F16F 2234/02* (2013.01)

(58) Field of Classification Search
CPC ...... F16F 9/3488; F16F 9/3485; F16F 9/3487; F16F 9/3214; F16F 9/3228; F16F 9/3405;
(Continued)

(56) References Cited

U.S. PATENT DOCUMENTS 3,831,626 A * 8/1974 Peddinghaus ......... F16F 9/3214 137/493.8
5,018,608 A * 5/1991 Imaizumi ................. F16F 9/50 188/282.5

(Continued)

FOREIGN PATENT DOCUMENTS

CN 103443500 A 12/2013
EP 1947363 A1 7/2008

(Continued)

*Primary Examiner* — Bradley T King
*Assistant Examiner* — Stephen M Bowes
(74) *Attorney, Agent, or Firm* — Rabin & Berdo, P.C.

(57) ABSTRACT

A damping valve includes a valve disc including a passage and a valve seat configured to surround an outlet end of the passage, a leaf valve configured to separate from/sit on the valve seat to open/close the passage, and a biasing part configured to exert a variable biasing force on the leaf valve toward the valve disc, and a gap is provided between the leaf valve and the valve seat.

9 Claims, 8 Drawing Sheets

(51) Int. Cl.
*F16F 9/34* (2006.01)
*F16F 9/46* (2006.01)
*F16F 9/06* (2006.01)

(58) Field of Classification Search
CPC .. F16F 9/34; F16F 9/348; F16F 9/3481; F16F 9/3482; F16F 9/3484; F16F 9/14; F16F 9/16; F16F 9/182; F16F 9/512; F16K 15/148
USPC ........................................ 188/322.14, 322.15
See application file for complete search history.

(56) References Cited

U.S. PATENT DOCUMENTS 5,829,556 A * 11/1998 Domange ............... E04H 9/021 188/268
6,802,408 B2 * 10/2004 Krammer ................ F16F 9/348 188/282.1
7,290,643 B2 * 11/2007 Fujita ..................... B62K 25/08 188/282.5
2002/0000352 A1 1/2002 Matsumoto et al.
2004/0084264 A1 5/2004 Yonezawa
2004/0251099 A1 * 12/2004 Papp ..................... F16F 9/3214 188/322.15
2005/0133320 A1 6/2005 Fujita et al.
2009/0107782 A1 * 4/2009 Ota ....................... F16F 9/3485 188/282.5
2014/0000997 A1 1/2014 Tanaka
2017/0268595 A1 * 9/2017 Inagaki ..................... F16F 9/34

FOREIGN PATENT DOCUMENTS

GB 2118686 A 11/1983
JP 03163233 A * 7/1991
JP H06-033968 A 2/1994
JP H08-004818 A 1/1996
JP H10-122290 A 5/1998
JP H10-213172 A 8/1998
JP 2001-12530 A 1/2001
JP 2004-150574 A 5/2004
JP 2008-267489 A 11/2008
WO WO 9615389 A1 5/1996

* cited by examiner

DAMPING VALVE AND SHOCK ABSORBER

TECHNICAL FIELD

The present invention relates to a damping valve and a shock absorber.

BACKGROUND ART

A shock absorber used in a vehicle suspension is equipped with a damping valve that can vary a damping force. Such a shock absorber includes: a cylinder; a piston that partitions the inside of the cylinder into an extension-side chamber and a contraction-side chamber; a piston rod connected to the piston at one end and movably inserted into the cylinder; and a damping valve. The damping valve includes: a passage provided to the piston; a disc valve that separates from and sits on an annular valve seat that surrounds an outlet end of the passage provided to the piston; a back pressure chamber that causes pressure led from the extension-side chamber or the contraction-side chamber to act on the back surface of the disc valve; and a solenoid pressure control valve that controls the pressure within the back pressure chamber. The passage of the piston allows the extension-side chamber to communicate with the contraction-side chamber. The disc valve opens/closes the passage by separating from or sitting on the valve seat. A solenoid is used in the solenoid pressure control valve (for example, refer to JP2001-12530A).

In such a shock absorber, the damping force during extension and during contraction is controlled by controlling the pressure within the back pressure chamber using the solenoid pressure control valve. In a closed-valve state in which the disc valve is seated on the valve seat, liquid within the cylinder passes through a fixed orifice provided to the disc valve and enters/exits the extension-side chamber and the contraction-side chamber. When the piston moves at a low speed, the shock absorber mainly exerts the damping force with the fixed orifice.

SUMMARY OF INVENTION

In a vehicle shock absorber, there are cases in which the damping force needs to be decreased when the piston speed is in a low-speed region for the purpose of improving the riding comfort in the vehicle. In conventional shock absorbers, the damping force is exerted with the fixed orifice until an opened-valve state is reached in which the disc valve separates from the valve seat. Therein, in order to decrease the damping force, it is necessary to increase the opening area of the fixed orifice. When the opening area of the fixed orifice is increased, the damping force can be reliably decreased, but the maximum value of the damping force is determined by the fixed orifice. Thus, the damping force adjustment width is remarkably reduced.

When the disc valve is not provided with an orifice, the damping force adjustment width increases. However, even if the damping force characteristics of the shock absorber are set to full soft, the damping force may increase too much and this may worsen the riding comfort in the vehicle.

An object of the present invention is to provide a damping valve and a shock absorber with which the damping force when the piston speed is in a low-speed region can be decreased and the damping force adjustment width can be expanded.

According to one aspect of the present invention, a damping valve includes a valve disc including a passage and a valve seat configured to surround an outlet end of the passage, a leaf valve configured to separate from/sit on the valve seat to open/close the passage, and a biasing part configured to exert a variable biasing force on the leaf valve toward the valve disc, and a gap is provided between the leaf valve and the valve seat.

DESCRIPTION OF EMBODIMENTS

The present invention will now be explained based on the illustrated embodiments.

First Embodiment

Figure 1:
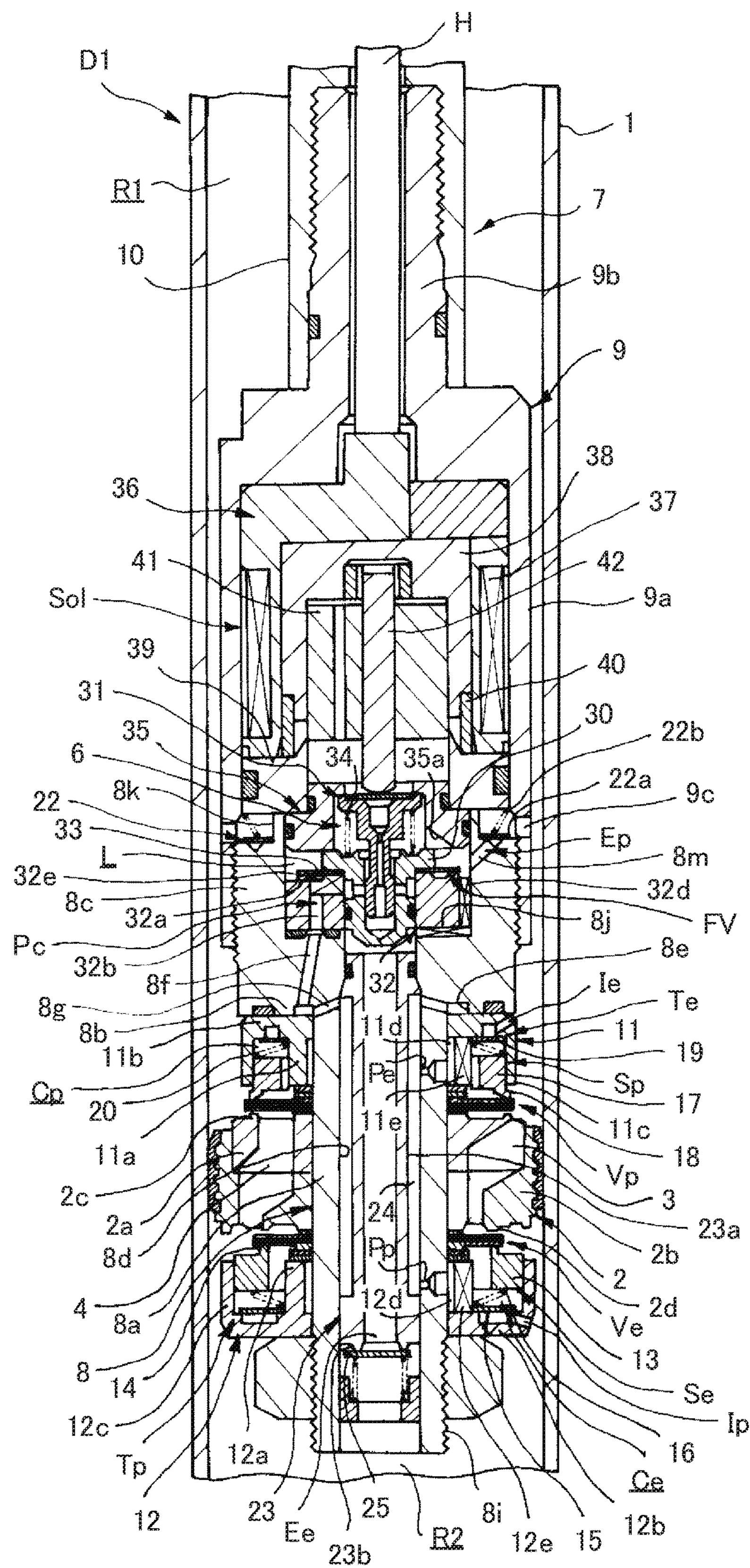
FIG. 1 is a cross-section view of a shock absorber using a damping valve according to a first embodiment of the present invention.

As shown in FIG. 1, a damping valve according to a first embodiment is utilized as both an extension-side damping valve and a contraction-side damping valve of a shock absorber D1. The damping valve includes the following: a piston 2 serving as a valve disc; an annular extension-side leaf valve Ve; an annular contraction-side leaf valve Vp; and a biasing part that exerts a variable biasing force on the extension-side leaf valve toward the piston 2 side and exerts a variable biasing force on the contraction-side leaf valve toward the piston 2 side. The piston 2 includes an extension-side passage 3 and a contraction-side passage 4 which serve as a passage, and an annular extension-side valve seat 2*d* and an annular contraction-side valve seat 2*c* that respectively surround the outlet ends of the extension-side passage 3 and the contraction-side passage 4. The extension-side leaf valve Ve separates from and sits on the extension-side valve seat 2*d* to open and close the extension-side passage 3. The contraction-side leaf valve Vp separates from and sits on the contraction-side valve seat 2*c* to open and close the contraction-side passage 4. The extension-side leaf valve Ve and the contraction-side leaf valve Vp are laminated on the piston 2. The biasing part exerts a variable biasing force on the extension-side leaf valve Ve toward the piston 2 side and exerts a variable biasing force on the contraction-side leaf valve Vp toward the piston 2 side. The damping valve of the present embodiment obviously may be applied to only the extension-side damping valve or to only the contraction-side damping valve of the shock absorber D1.

Meanwhile, the shock absorber D1 includes the following: a cylinder 1 that is filled with a liquid such as a hydraulic oil; the damping valve that is accommodated within the cylinder 1; an extension-side chamber R1 and a contraction-side chamber R2 that are partitioned within the cylinder 1 by the piston 2 which serves as a valve disc that constitutes the damping valve; and a piston rod 7 that is movably inserted into the cylinder 1 and connected to the piston 2. The piston 2 is inserted into the cylinder 1 such that the piston 2 can move in the axial direction. When the piston 2 moves in the axial direction (the up-down direction in FIG. 1) relative to the cylinder 1, the shock absorber D1 applies resistance with the extension-side leaf valve Ve to the flow of liquid passing through the extension-side passage 3, and applies resistance with the contraction-side leaf valve Vp to the flow of liquid passing through the contraction-side passage 4, and thereby exerts a damping force.

Although not illustrated, a free piston that slides through the inside of the cylinder 1 is provided at the bottom in FIG. 1 of the cylinder 1. A gas chamber is formed within the cylinder 1 by the free piston. The piston 2 is connected to one end of the piston rod 7 that is movably inserted into the cylinder 1. The piston rod 7 penetrates through the inner periphery of an annular rod guide (not illustrated) that is provided at the top end of the cylinder 1, and protrudes to the outside of the cylinder 1. A seal (not illustrated) is provided between the piston rod 7 and the cylinder 1, and the inside of the cylinder 1 is in a liquid-tight state due to this seal. As illustrated, the shock absorber D1 is set to a so-called single-rod type. The volume of the piston rod 7 that moves into/out of the cylinder 1 according to the extension/contraction of the shock absorber D1 is compensated by means of the volume of the gas within the gas chamber expanding or contracting and the free piston moving through the inside of the cylinder 1 in the up-down direction. In this way, the shock absorber D1 is set to a single-cylinder type. However, instead of installing the free piston and the gas chamber, a reservoir may be provided on the outer periphery or outside of the cylinder 1 and volume compensation of the piston rod 7 may be performed by this reservoir.

In this embodiment, the biasing part of the damping valve includes the following: an extension-side spool Se that biases the extension-side leaf valve Ve; an extension-side back pressure chamber Ce that presses the extension-side spool Se with internal pressure; a contraction-side spool Sp that biases the contraction-side leaf valve Vp; a contraction-side back pressure chamber Cp that presses the contraction-side spool Sp with internal pressure; a communication passage 24 that communicates with the contraction-side back pressure chamber Cp via an extension-side pilot orifice Pe serving as an extension-side resistance element, and that communicates with the extension-side back pressure chamber Ce via a contraction-side pilot orifice Pp serving as a contraction-side resistance element; an extension-side pressure introduction passage Ie that permits only the flow of liquid from the extension-side chamber R1 toward the contraction-side back pressure chamber Cp; a contraction-side pressure introduction passage Ip that permits only the flow of liquid from the contraction-side chamber R2 toward the extension-side back pressure chamber Ce; an adjustment passage Pc that is connected to the communication passage 24; a contraction-side discharge passage Ep that allows the downstream of the adjustment passage Pc to communicate with the extension-side chamber R1, and that permits only the flow of liquid from the adjustment passage Pc toward the extension-side chamber R1; an extension-side discharge passage Ee that allows the downstream of the adjustment passage Pc to communicate with the contraction-side chamber R2, and that permits only the flow of liquid from the adjustment passage Pc toward the contraction-side chamber R2; and a solenoid pressure control valve 6 provided in the adjustment passage Pc. The extension-side pilot orifice Pe applies resistance to the flow of liquid passing through the extension-side pilot orifice Pe. The contraction-side pilot orifice Pp applies resistance to the flow of liquid passing through the contraction-side pilot orifice Pp. The solenoid pressure control valve 6 controls the upstream pressure of the adjustment passage Pc.

The damping valve and the shock absorber D1 will now be explained in detail below. In the first embodiment, the piston rod 7 is formed by the following: a piston retaining member 8 that retains the piston 2; a solenoid valve accommodation tube 9 that is connected at one end to the piston retaining member 8; and a rod member 10 that is connected at one end to the solenoid valve accommodation tube 9 and protrudes at the other end to the outside from the top end of the cylinder 1. The solenoid valve accommodation tube 9 forms, together with the piston retaining member 8, a hollow accommodation part L that accommodates the solenoid pressure control valve 6.

The piston retaining member 8 includes: a retaining shaft **8*a*, the annular piston 2 being mounted on the outer periphery thereof; a flange 8*b* provided on the outer periphery at the top end in FIG. 1 of the retaining shaft 8*a*; and a cylindrical socket 8*c* provided on the outer periphery at the top end in FIG. 1 of the flange 8*b*. The piston retaining member 8 also includes the following: a vertical hole 8*d* that opens from the top end of the retaining shaft 8*a* and extends in the axial direction; an annular groove 8*e* provided to the bottom end in FIG. 1 of the flange 8*b* so as to surround the retaining shaft 8*a*; a port 8*f* that allows the annular groove 8*e* to communicate with the inside of the socket 8*c*; a horizontal hole 8*g* that allows the annular groove 8*e* to communicate with the inside of the vertical hole 8*d*; the extension-side pilot orifice Pe serving as an extension-side resistance element; the contraction-side pilot orifice Pp serving as a contraction-side resistance element; a threaded part 8*i* provided on the outer periphery at the bottom end in FIG. 1 of the retaining shaft 8*a*; and a groove 8*j* formed on the top end of the flange 8*b*. The vertical hole 8*d* communicates with the inside of the socket 8*c*. The extension-side pilot orifice Pe and the contraction-side pilot orifice Pp open from the outer periphery of the retaining shaft 8*a* to communicate with the vertical hole 8*d*. The groove 8*j* communicates with the vertical hole 8*d***.

A cylindrical separator 23 is inserted into the vertical hole **8*d* provided to the retaining shaft 8*a*. An annular groove 23*a* is provided on the outer periphery of the separator 23. The separator 23 forms, with the annular groove 23*a*, the communication passage 24 that allows the extension-side pilot orifice Pe to communicate with the contraction-side pilot orifice Pp within the vertical hole 8*d*. An annular valve seat 23*b* that surrounds the opening at the bottom end in FIG. 1 of the separator 23 is provided to the bottom end of the separator 23. The vertical hole 8*d* allows the contraction-side chamber R2 to communicate with the inside of the socket 8*c* via the separator 23. On the other hand, the separator 23 is formed so that the extension-side pilot orifice Pe and the contraction-side pilot orifice Pp do not communicate via the vertical hole 8*d* with the contraction-side chamber R2 and the inside of the socket 8*c*. Further, the horizontal hole 8***g* also communicates with the communication passage 24. The separator 23 is formed so that the horizontal hole 8*g* does not communicate via the inside of the vertical hole 8*d* with the contraction-side chamber R2 and the inside of the socket 8*c*.

The extension-side resistance element and the contraction-side resistance element are sufficient as long as they apply resistance to the flow of liquid passing therethrough, and thus they are not limited to orifices. For example, the extension-side resistance element and the contraction-side resistance element may be configured as other restrictors such as choke passages, and may also be configured as valves that apply resistance such as leaf valves or poppet valves.

An annular recess 8*k* is provided on the outer periphery at the top end in FIG. 1 of the socket 8*c*. A through hole 8*m* that communicates with the inside of the socket 8*c* from the recess 8*k* is provided in the socket 8*c*. An annular plate 22*a* is mounted in the recess 8*k*. The annular plate 22*a* is biased from above in FIG. 1 by a spring member 22*b* so as to close the through hole 8*m*.

The solenoid valve accommodation tube 9 includes: a closed-top cylindrical accommodation tube part 9*a*; a cylindrical connection part 9*b* that extends upwards in FIG. 1 from the top part of the accommodation tube part 9*a*; and a through hole 9*c* that opens from the side of the accommodation tube part 9*a* and communicates with the inside thereof. The outer diameter of the connection part 9*b* is smaller than the outer diameter of the accommodation tube part 9*a*. The piston retaining member 8 is integrated with the solenoid valve accommodation tube 9 by screwing the socket 8*c* of the piston retaining member 8 into the inner periphery of the accommodation tube part 9*a* of the solenoid valve accommodation tube 9. By this screwing, the accommodation part L that accommodates the solenoid pressure control valve 6 is formed within the accommodation tube part 9*a* by the solenoid valve accommodation tube 9 and the piston retaining member 8. A portion of the adjustment passage Pc (to be explained in detail later) is provided within the accommodation part L. The accommodation part L is in communication with the communication passage 24 by means of the port 8*f*, the annular groove 8*e*, and the horizontal hole 8*g* explained above. A portion of the adjustment passage Pc is formed by the port 8*f*, the annular groove 8*e*, and the horizontal hole 8*g*. As long as the accommodation part L is in communication with the communication passage 24, the port 8*f*, the annular groove 8*e*, and the horizontal hole 8*g* do not have to be used, and a passage that directly allows the accommodation part L to communicate with the communication passage 24 may be provided. Using the port 8*f*, the annular groove 8*e*, and the horizontal hole 8*g* is advantageous because the machining of the passage for allowing the accommodation part L to communicate with the communication passage 24 becomes easier.

When the piston retaining member 8 is integrated with the solenoid valve accommodation tube 9, the through hole 9*c* opposes the recess 8*k*. The through hole 9*c* allows the accommodation part L to communicate with the extension-side chamber R1 in cooperation with the through hole 8*m*. A check valve 22 that permits only the flow of liquid from within the accommodation part L toward the extension-side chamber R1 is formed by the annular plate 22*a* and the spring member 22*b*. In other words, the contraction-side discharge passage Ep is formed by the through hole 9*c*, the recess 8*k*, the through hole 8*m*, and the check valve 22.

A check valve 25, which separates from and sits on the annular valve seat 23*b* provided to the bottom end in FIG. 1 of the separator 23, is provided within the vertical hole 8*d* of the piston retaining member 8. The check valve 25 stops the flow of liquid from the contraction-side chamber R2 side toward the accommodation part L, and permits only the flow of liquid from the accommodation part L toward the contraction-side chamber R2. In other words, the extension-side discharge passage Ee is formed within the vertical hole 8*d* by the separator 23.

The rod member 10 has a cylindrical shape. The inner periphery at the bottom end in FIG. 1 of the rod member 10 is expanded in diameter so as to permit the insertion of the connection part 9*b* of the solenoid valve accommodation tube 9. The rod member 10 has on its inner periphery a threaded part (not assigned a reference numeral) that enables the screwing of the connection part 9*b*. The piston rod 7 is formed by integrating the rod member 10, the solenoid valve accommodation tube 9, and the piston retaining member 8.

A harness H which supplies power to a solenoid (to be explained later) is inserted into the rod member 10 and into the connection part 9*b* of the solenoid valve accommodation tube 9. Although not illustrated, the top end of the harness H extends outward from the top end of the rod member 10 and is connected to a power source.

Figure 3:
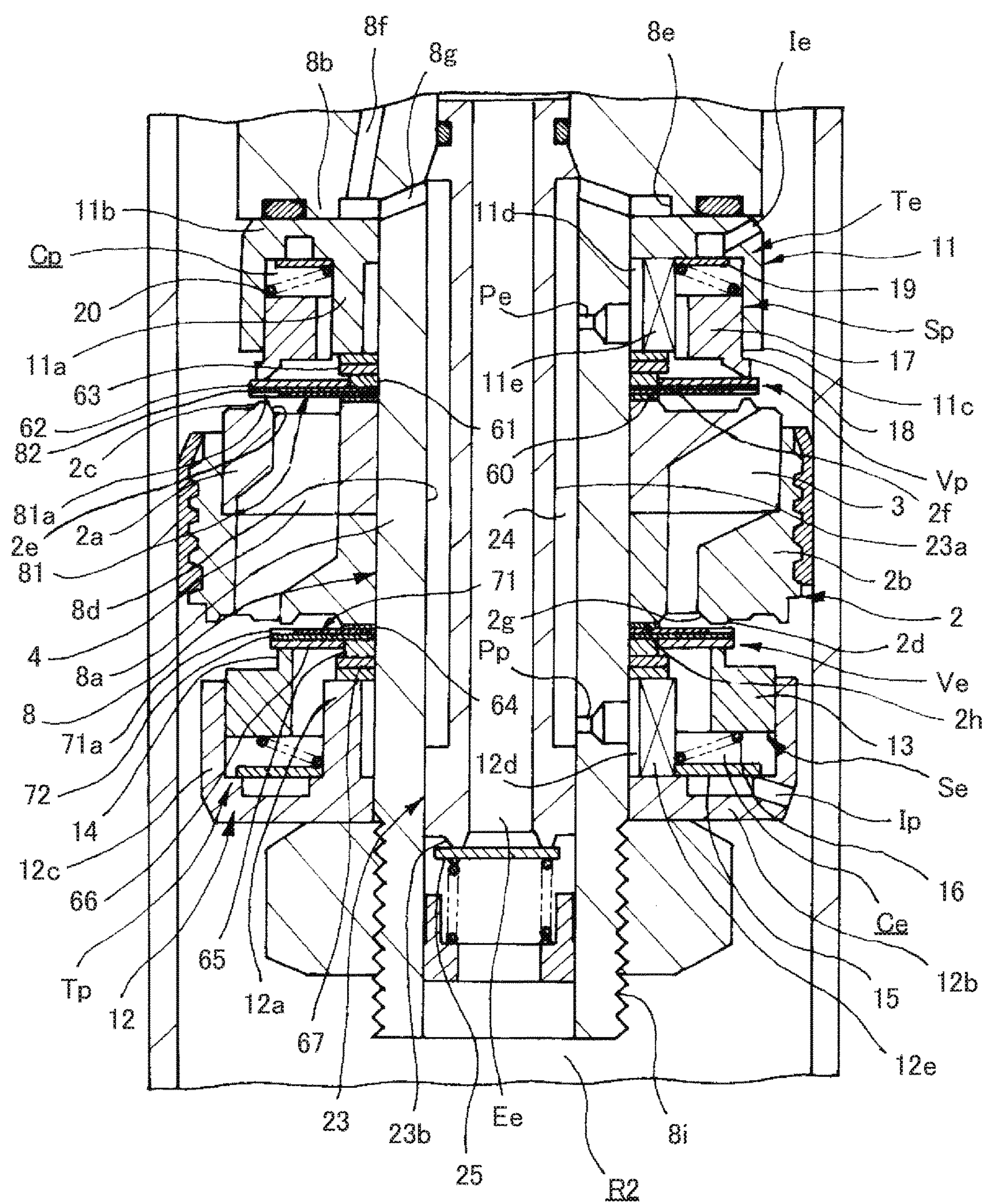
FIG. 3 is an enlarged cross-section view of the damping valve according to the first embodiment of the present invention.

As shown in FIG. 3, the annular piston 2 is assembled onto the outer periphery of the retaining shaft 8*a* provided to the piston retaining member 8. The following are assembled onto the outer periphery of the retaining shaft 8*a* above the piston 2 in FIG. 3: a contraction-side annular spacer 60 serving as an annular spacer; the contraction-side leaf valve Vp; a contraction-side spacer 61 serving as a spacer; a contraction-side annular plate 62 serving as an annular plate; a contraction-side plate stopper 63; the contraction-side spool Sp; and a contraction-side chamber 11. The contraction-side chamber 11 forms the contraction-side back pressure chamber Cp. The following are assembled onto the outer periphery of the retaining shaft 8*a* under the piston 2 in FIG. 3: an extension-side annular spacer 64 serving as an annular spacer; the extension-side leaf valve Ve; an extension-side spacer 65 serving as a spacer; an extension-side annular plate 66 serving as an annular plate; an extension-side plate stopper 67; the extension-side spool Se; and an extension-side chamber 12. The extension-side chamber 12 forms the extension-side back pressure chamber Ce.

The piston 2 is formed by stacking discs 2*a*, 2*b* so that the piston 2 is divided into a top half and a bottom half. The extension-side passage 3 and the contraction-side passage 4, each of which allows the extension-side chamber R1 to communicate with the contraction-side chamber R2, are formed in the piston 2. In this way, by forming the piston 2 with the discs 2*a*, 2*b* so that the piston 2 is divided into top and bottom halves, the extension-side passage 3 and the contraction-side passage 4, which have complex shapes, can be formed without requiring any drilling processing, and thus the piston 2 can be manufactured easily and inexpensively. Further, the disc 2*a* on the top side in FIG. 3 includes: an annular window 2*e* provided on the top end thereof; the annular contraction-side valve seat 2*c* provided on the outer periphery side of the annular window 2*e*; and an inner peripheral seat part 2*f* provided on the inner periphery of the annular window 2*e*. The annular window 2*e* is in communication with the contraction-side passage 4. The contraction-side valve seat 2*c* surrounds the contraction-side passage 4. On the other hand, the disc 2*b* on the bottom side includes: an annular window 2*g* provided on the bottom end thereof; the annular extension-side valve seat 2*d* provided on the outer periphery side of the annular window 2*g*; and an inner peripheral seat part 2*h* provided on the inner periphery of the annular window 2*g*. The annular window 2*g* is in communication with the extension-side passage 3. The extension-side valve seat 2*d* surrounds the extension-side passage 3.

As shown in FIG. 3, the extension-side leaf valve Ve is formed in an annular shape so as to permit the insertion of the retaining shaft 8*a* of the piston retaining member 8. In this embodiment, the extension-side leaf valve Ve is constituted by stacking two annular plates 71 and 72 on each other. The inner periphery of the extension-side leaf valve Ve is sandwiched by the piston 2 and the extension-side chamber 12, and due to this sandwiching, the extension-side leaf valve Ve is fixed to the retaining shaft 8*a* of the piston retaining member 8. Deflection of the outer periphery of the extension-side leaf valve Ve is permitted. In more detail, the extension-side spacer 65 is interposed between the extension-side leaf valve Ve and the extension-side chamber 12. Deflection of the extension-side leaf valve Ve toward the bottom side in FIG. 3 is permitted more toward the outer periphery side from an area that is supported by the extension-side spacer 65. Deflection of the extension-side leaf valve Ve toward the top side in FIG. 3 is permitted more toward an outer periphery side from an area that is supported by the extension-side annular spacer 64. A notch 71*a* that functions as an orifice when seated on the extension-side valve seat 2*d* is provided on the outer periphery of the annular plate 71 disposed on the piston 2 side.

The extension-side leaf valve Ve is laminated on the bottom in FIG. 3 of the piston 2 via the extension-side annular spacer 64, which is laminated on the inner peripheral seat part 2*h* of the piston 2. In a state in which a load is not acting on the extension-side leaf valve Ve, a gap is formed between the extension-side leaf valve Ve and the extension-side valve seat 2*d*. The length of this gap in the up-down direction in FIG. 3 can be adjusted by exchanging for an extension-side annular spacer 64 of a different thickness or by changing the number of extension-side annular spacers 64 that are laminated. The gap between the extension-side leaf valve Ve and the extension-side valve seat 2*d* can be formed without using the extension-side annular spacer 64 by setting the height of the inner peripheral seat part 2*h* to be greater than the height of the extension-side valve seat 2*d* and directly laminating the extension-side leaf valve Ve onto the inner peripheral seat part 2*h*. However, by providing the extension-side annular spacer 64 to the inner peripheral seat part 2*h*, the above-mentioned length of the gap can be easily adjusted.

The extension-side leaf valve Ve deflects when a biasing force is loaded thereon by the biasing part from the back surface side (opposite side of the piston 2). If this biasing force increases, the extension-side leaf valve Ve sits onto the extension-side valve seat 2*d* so as to close the extension-side passage 3. In this state, the extension-side passage 3 communicates with the contraction-side chamber R2 via only the notch 71*a*.

The extension-side annular plate 66 is slidably mounted on the outer periphery of the extension-side spacer 65. The axial direction length of the extension-side annular plate 66 is shorter than the axial direction length of the extension-side spacer 65. Thus, the extension-side annular plate 66 can move in the up-down direction while slidingly contacting the outer periphery of the extension-side spacer 65. Further, the annular extension-side plate stopper 67 is provided to the bottom in FIG. 3 of the extension-side spacer 65. The outer diameter of the extension-side plate stopper 67 is set to be greater than the inner diameter of the extension-side annular plate 66. The extension-side chamber 12 is laminated on the bottom of the extension-side plate stopper 67. The inner diameter of the extension-side annular plate 66 is set to be smaller than the outer diameter of the inner peripheral seat part 2*h* provided to the piston 2. The outer diameter of the extension-side annular plate 66 is set to be greater than the inner diameter of the extension-side valve seat 2*d*. The extension-side annular plate 66 is configured such that it can move in the axial direction (the up-down direction in FIG. 3) between the extension-side annular spacer 64 and the extension-side plate stopper 67.

The extension-side annular plate 66 has a higher deflection rigidity than that of the annular plates 71, 72 that constitute the extension-side leaf valve Ve. In the present embodiment, by setting the axial direction length (thickness) of the extension-side annular plate 66 to be greater than the axial direction length (thickness) of the annular plates 71, 72 of the extension-side leaf valve Ve, the rigidity of the extension-side annular plate 66 can be increased to be greater than the rigidity of the extension-side leaf valve Ve. Not only can the rigidity be strengthened by the thickness, but the rigidity of the extension-side annular plate 66 can also be increased by forming the extension-side annular plate 66 with a material having a higher rigidity than that of the extension-side leaf valve Ve.

When the extension-side annular plate 66 is compressed from the back surface side by the pressure within the extension-side back pressure chamber Ce and the extension-side spool Se, the extension-side annular plate 66 pushes up the extension-side leaf valve Ve causing it to deflect. When the extension-side leaf valve Ve deflects to the point at which it sits on the extension-side valve seat 2*d*, the extension-side annular plate 66 enters a state in which it is supported by the inner peripheral seat part 2*h* and the extension-side valve seat 2*d*. In this state, the biasing force generated by the pressure within the extension-side back pressure chamber Ce and the extension-side spool Se is received by the extension-side annular plate 66. Thus, any further deformation of the extension-side leaf valve Ve is suppressed, and an excessive load is prevented from being applied to the extension-side leaf valve Ve. Further, the extension-side annular plate 66 is slidably mounted on the extension-side spacer 65. Therefore, when the extension-side leaf valve Ve deflects in a direction away from the extension-side valve seat 2*d*, the extension-side annular plate 66 moves downward in FIG. 3 relative to the extension-side spacer 65. Thus, the deflection of the extension-side leaf valve Ve in the direction away from the piston 2 is not obstructed by the extension-side annular plate 66.

The extension-side chamber 12 includes: a tubular mounting part 12*a* that is fitted onto the outer periphery of the retaining shaft 8*a* of the piston retaining member 8; a flange 12*b* that is provided on the outer periphery at the bottom end in FIG. 3 of the mounting part 12*a*; a sliding contact tube 12*c* that extends from the outer periphery of the flange 12*b* toward the piston 2 side; an annular groove 12*d* provided on the inner periphery of the mounting part 12*a*; and a notch 12*e* that communicates with the annular groove 12*d* from the outer periphery of the mounting part 12*a*. In a state in which the extension-side chamber 12 is assembled onto the retaining shaft 8*a*, the annular groove 12*d* opposes the contraction-side pilot orifice Pp provided to the retaining shaft 8*a*. The extension-side plate stopper 67 is interposed between the mounting part 12*a* of the extension-side chamber 12 and the extension-side spacer 65. The extension-side plate stopper 67 may be eliminated and the lower limit of movement of the extension-side annular plate 66 may be restricted with the mounting part 12*a*. There are cases in which it is necessary to adjust the position of the extension-side chamber 12 so that it opposes the contraction-side pilot orifice Pp and the annular groove 12*d* when assembling the extension-side chamber 12 onto the retaining shaft 8*a* of the piston retaining member 8, and in such cases, the extension-side plate stopper 67 is preferably provided between the mounting part 12*a* and the extension-side spacer 65. The position of the extension-side chamber 12 relative to the piston retaining member 8 can be adjusted by the extension-side plate stopper 67.

The extension-side spool Se is accommodated within the sliding contact tube 12*c*. The outer periphery of the extension-side spool Se slidingly contacts the inner periphery of the sliding contact tube 12*c*, and the extension-side spool Se is configured such that it can move in the axial direction within the sliding contact tube 12*c*. The extension-side spool Se has an annular spool main body 13, and an annular projection 14 that rises up from the inner periphery at the top end in FIG. 3 of the spool main body 13. The inner diameter of the annular projection 14 is set to be smaller than the outer diameter of the extension-side annular plate 66, and the annular projection 14 is configured such that it can abut the back surface (bottom surface in FIG. 3) of the extension-side annular plate 66.

When the extension-side spool Se is assembled to the extension-side chamber 12 and the extension-side chamber 12 is assembled onto the retaining shaft 8*a*, the extension-side back pressure chamber Ce is formed on the back surface side (the bottom side in FIG. 3) of the extension-side leaf valve Ve. The inner diameter of the spool main body 13 is greater than the outer diameter of the mounting part 12*a*. The inner diameter of the spool main body 13 can be set so that the inner periphery of the spool main body 13 slidingly contacts the outer periphery of the mounting part 12*a*, and the extension-side back pressure chamber Ce can be sealed by the extension-side spool Se.

The annular groove 12*d* is provided on the inner periphery of the mounting part 12*a* of the extension-side chamber 12. The mounting part 12*a* includes the notch 12*e* that communicates with the annular groove 12*d* from the outer periphery of the mounting part 12*a*. In a state in which the extension-side chamber 12 is assembled onto the retaining shaft 8*a*, the annular groove 12*d* opposes the contraction-side pilot orifice Pp provided to the retaining shaft 8*a*, and the extension-side back pressure chamber Ce communicates with the contraction-side pilot orifice Pp.

Further, the contraction-side pressure introduction passage Ip that opens from the outer periphery of the flange 12*b* is provided to the extension-side chamber 12. The contraction-side chamber R2 communicates with the inside of the extension-side back pressure chamber Ce via the contraction-side pressure introduction passage Ip. An annular plate 15 is laminated on the top end in FIG. 3 of the flange 12*b* of the extension-side chamber 12. A spring member 16 is interposed between the annular plate 15 and the spool main body 13 of the extension-side spool Se. The annular plate 15 is pressed toward the flange 12*b* by the spring member 16 so that the contraction-side pressure introduction passage Ip is closed. The contraction-side pressure introduction passage Ip is configured so as to not generate any resistance against the flow of passing liquid.

If the shock absorber D1 contracts so that the contraction-side chamber R2 is compressed and the pressure therein increases, the annular plate 15 is pressed by this pressure so that it separates from the flange 12*b*, and thereby the contraction-side pressure introduction passage Ip is opened. During extension of the shock absorber D1 in which the pressure within the extension-side back pressure chamber Ce increases higher than that of the contraction-side chamber R2, the annular plate 15 is pressed to the flange 12*b* so as to close the contraction-side pressure introduction passage Ip. In other words, the annular plate 15 functions as a valve body of a contraction-side check valve Tp that permits only the flow of liquid from the contraction-side chamber R2. By this contraction-side check valve Tp, the contraction-side pressure introduction passage Ip is set to a one-way passage that permits only the flow of liquid from the contraction-side chamber R2 toward the extension-side back pressure chamber Ce.

The spring member 16 functions to press the annular plate 15 to the flange 12*b*. In other words, the spring member 16 constitutes the contraction-side check valve Tp together with the valve body (the annular plate 15) of the check valve. The spring member 16 also functions to bias the extension-side spool Se toward the extension-side leaf valve Ve. When the extension-side leaf valve Ve deflects so that the extension-side spool Se is pushed down in the direction away from the piston 2 (downwards in FIG. 3) and then the deflection of the extension-side leaf valve Ve subsequently terminates, the extension-side spool Se is still biased by the spring member 16, and thus the extension-side spool Se can quickly return to its original position (the position shown in FIG. 3) following the extension-side leaf valve Ve. It is also possible to bias the extension-side spool Se with a different spring member from the spring member 16. Using the same spring member for the spring member that constitutes the contraction-side check valve Tp and the spring member that biases the extension-side spool Se is advantageous because the number of parts can be reduced and the structure can be simplified. The outer diameter of the extension-side spool Se is set to be greater than the inner diameter of the annular projection 14, and the annular projection 14 is configured to abut the extension-side annular plate 66. The extension-side spool Se is constantly biased toward the extension-side leaf valve Ve by the pressure of the extension-side back pressure chamber Ce.

As shown in FIG. 3, similar to the extension-side leaf valve Ve, the contraction-side leaf valve Vp that is laminated on top of the piston 2 is formed in an annular shape so as to permit the insertion of the retaining shaft 8*a* of the piston retaining member 8. In this embodiment, the contraction-side leaf valve Vp is constituted by stacking two annular plates 81 and 82 on each other. The inner periphery of the contraction-side leaf valve Vp is sandwiched by the piston 2 and the contraction-side chamber 11, and due to this sandwiching, the contraction-side leaf valve Vp is fixed to the retaining shaft 8*a* of the piston retaining member 8. Deflection of the outer periphery of the contraction-side leaf valve Vp is permitted. In more detail, the contraction-side spacer 61 is interposed between the contraction-side leaf valve Vp and the contraction-side chamber 11. Deflection of the contraction-side leaf valve Vp toward the top side in FIG. 3 is permitted more toward the outer periphery side from an area that is supported by the contraction-side spacer 61. Deflection of the contraction-side leaf valve Vp toward the bottom side in FIG. 3 is permitted more toward an outer periphery side from an area that is supported by the contraction-side annular spacer 60. A notch 81*a* that functions as an orifice when seated on the contraction-side valve seat 2*c* is provided on the outer periphery of the annular plate 81 disposed on the piston 2 side.

The contraction-side leaf valve Vp is laminated on the top in FIG. 3 of the piston 2 via the contraction-side annular spacer 60, which is laminated on the inner peripheral seat part 2*f* of the piston 2. In a state in which a load is not acting on the contraction-side leaf valve Vp, a gap is formed between the contraction-side leaf valve Vp and the contraction-side valve seat 2*c*. The length of this gap in the up-down direction in FIG. 3 can be adjusted by exchanging for a contraction-side annular spacer 60 of a different thickness or by changing the number of contraction-side annular spacers 60 that are laminated. The gap between the contraction-side leaf valve Vp and the contraction-side valve seat 2*c* can be formed without using the contraction-side annular spacer 60 by setting the height of the inner peripheral seat part 2*f* to be greater than the height of the contraction-side valve seat 2*c* and directly laminating the contraction-side leaf valve Vp onto the inner peripheral seat part 2*f*. However, by providing the contraction-side annular spacer 60 to the inner peripheral seat part 2*f*, the above-mentioned length of the gap can be easily adjusted.

The contraction-side leaf valve Vp deflects when a biasing force is loaded thereon by the biasing part from the back surface side (opposite side of the piston 2). If this biasing force increases, the contraction-side leaf valve Vp sits onto the contraction-side valve seat 2*c* so as to close the contraction-side passage 4. In this state, the contraction-side passage 4 communicates with the extension-side chamber R1 via only the notch 81*a*.

The contraction-side annular plate 62 is slidably mounted on the outer periphery of the contraction-side spacer 61. The axial direction length of the contraction-side annular plate 62 is shorter than the axial direction length of the contraction-side spacer 61. Thus, the contraction-side annular plate 62 can move in the up-down direction while slidingly contacting the outer periphery of the contraction-side spacer 61. Further, the annular contraction-side plate stopper 63 is provided to the top in FIG. 3 of the contraction-side spacer 61. The outer diameter of the contraction-side plate stopper 63 is set to be greater than the inner diameter of the contraction-side annular plate 62. The contraction-side chamber 11 is laminated on the top of the contraction-side plate stopper 63. The inner diameter of the contraction-side annular plate 62 is set to be smaller than the outer diameter of the inner peripheral seat part 2*f* provided to the piston 2. The outer diameter of the contraction-side annular plate 62 is set to be greater than the inner diameter of the contraction-side valve seat 2*c*. The contraction-side annular plate 62 is configured such that it can move in the axial direction (the up-down direction in FIG. 3) between the contraction-side annular spacer 60 and the contraction-side plate stopper 63.

The contraction-side annular plate 62 has a higher deflection rigidity than that of the annular plates 81, 82 that constitute the contraction-side leaf valve Vp. In the present embodiment, by setting the axial direction length (thickness) of the contraction-side annular plate 62 to be greater than the axial direction length (thickness) of the annular plates 81, 82 of the contraction-side leaf valve Vp, the rigidity of the contraction-side annular plate 62 can be increased to be greater than the rigidity of the contraction-side leaf valve Vp. Not only can the rigidity be strengthened by the thickness, but the rigidity of the contraction-side annular plate 62 can also be increased by forming the contraction-side annular plate 62 with a material having a higher rigidity than that of the contraction-side leaf valve Vp.

When the contraction-side annular plate 62 is compressed from the back surface side by the pressure within the contraction-side back pressure chamber Cp and the contraction-side spool Sp, the contraction-side annular plate 62 pushes down the contraction-side leaf valve Vp causing it to deflect. When the contraction-side leaf valve Vp deflects to the point at which it sits on the contraction-side valve seat 2*c*, the contraction-side annular plate 62 enters a state in which it is supported by the inner peripheral seat part 2*f* and the contraction-side valve seat 2*c*. In this state, the biasing force generated by the pressure within the contraction-side back pressure chamber Cp and the contraction-side spool Sp is received by the contraction-side annular plate 62. Thus, any further deformation of the contraction-side leaf valve Vp is suppressed, and an excessive load is prevented from being applied to the contraction-side leaf valve Vp. Further, the contraction-side annular plate 62 is slidably mounted on the contraction-side spacer 61. Therefore, when the contraction-side leaf valve Vp deflects in a direction away from the contraction-side valve seat 2*c*, the contraction-side annular plate 62 moves upward in FIG. 3 relative to the contraction-side spacer 61. Thus, the deflection of the contraction-side leaf valve Vp is not obstructed by the contraction-side annular plate 62.

The contraction-side chamber 11 includes: a tubular mounting part 11*a* that is fitted onto the outer periphery of the retaining shaft 8*a* of the piston retaining member 8; a flange 11*b* that is provided on the outer periphery at the top end in FIG. 3 of the mounting part 11*a*; a sliding contact tube 11*c* that extends from the outer periphery of the flange 11*b* toward the piston 2 side; an annular groove 11*d* provided on the inner periphery of the mounting part 11*a*; and a notch 11*e* that communicates with the annular groove 11*d* from the outer periphery of the mounting part 11*a*. In a state in which the contraction-side chamber 11 is assembled onto the retaining shaft 8*a*, the annular groove 11*d* opposes the extension-side pilot orifice Pe provided to the retaining shaft 8*a*. The contraction-side plate stopper 63 is interposed between the mounting part 11*a* of the contraction-side chamber 11 and the contraction-side spacer 61. The contraction-side plate stopper 63 may be eliminated and the upper limit of movement of the contraction-side annular plate 62 may be restricted with the mounting part 11*a*. There are cases in which it is necessary to adjust the position of the contraction-side chamber 11 so that it opposes the extension-side pilot orifice Pe and the annular groove 11*d* when assembling the contraction-side chamber 11 onto the retaining shaft 8*a* of the piston retaining member 8, and in such cases, the contraction-side plate stopper 63 is preferably provided between the mounting part 11*a* and the contraction-side spacer 61. The position of the contraction-side chamber 11 relative to the piston retaining member 8 can be adjusted by the contraction-side plate stopper 63.

The contraction-side spool Sp is accommodated within the sliding contact tube 11*c*. The outer periphery of the contraction-side spool Sp slidingly contacts the inner periphery of the sliding contact tube 11*c*, and the contraction-side spool Sp is configured such that it can move in the axial direction within the sliding contact tube 11*c*. The contraction-side spool Sp has an annular spool main body 17, and an annular projection 18 that rises up from the inner periphery at the bottom end in FIG. 3 of the spool main body 17. The inner diameter of the annular projection 18 is set to be smaller than the outer diameter of the contraction-side annular plate 62, and the annular projection 18 is configured such that it can abut the back surface (top surface in FIG. 3) of the contraction-side annular plate 62.

When the contraction-side spool Sp is assembled to the contraction-side chamber 11 and the contraction-side chamber 11 is assembled onto the retaining shaft 8*a*, the contraction-side back pressure chamber Cp is formed on the back surface side (the top side in FIG. 3) of the contraction-side leaf valve Vp. The inner diameter of the spool main body 17 is greater than the outer diameter of the mounting part 11*a*. The inner diameter of the spool main body 17 can be set so that the inner periphery of the spool main body 17 slidingly contacts the outer periphery of the mounting part 11*a*, and the contraction-side back pressure chamber Cp can be sealed by the contraction-side spool Sp.

The annular groove 11*d* is provided on the inner periphery of the mounting part 11*a* of the contraction-side chamber 11. The mounting part 11*a* includes the notch 11*e* that communicates with the annular groove 11*d* from the outer periphery of the mounting part 11*a*. In a state in which the contraction-side chamber 11 is assembled onto the retaining shaft 8*a*, the annular groove 11*d* opposes the extension-side pilot orifice Pe provided to the retaining shaft 8*a*, and the contraction-side back pressure chamber Cp communicates with the extension-side pilot orifice Pe. By communicating with the extension-side pilot orifice Pe, the contraction-side back pressure chamber Cp is also in communication with the extension-side back pressure chamber Ce through the connection passage 24 formed within the vertical hole 8*d* of the retaining shaft 8*a* and the contraction-side pilot orifice Pp.

Further, the extension-side pressure introduction passage Ie that opens from the outer periphery of the flange 11*b* is provided to the contraction-side chamber 11. The extension-side chamber R1 communicates with the inside of the contraction-side back pressure chamber Cp via the extension-side pressure introduction passage Ie. An annular plate 19 is laminated on the bottom end in FIG. 3 of the flange 11*b* of the contraction-side chamber 11. A spring member 20 is interposed between the annular plate 19 and the spool main body 17 of the contraction-side spool Sp. The annular plate 19 is pressed toward the flange 11*b* by the spring member 20 so that the extension-side pressure introduction passage Ie is closed. The extension-side pressure introduction passage Ie is configured so as to not generate any resistance against the flow of passing liquid.

If the shock absorber D1 extends so that the extension-side chamber R1 is compressed and the pressure therein increases, the annular plate 19 is pressed by this pressure so that it separates from the flange 11*b*, and thereby the extension-side pressure introduction passage Ie is opened. During contraction of the shock absorber D1 in which the pressure within the contraction-side back pressure chamber Cp increases higher than that of the extension-side chamber R1, the annular plate 19 is pressed to the flange 11*b* so as to close the extension-side pressure introduction passage Ie. In other words, the annular plate 19 functions as a valve body of an extension-side check valve Te that permits only the flow of liquid from the extension-side chamber R1. By this extension-side check valve Te, the extension-side pressure introduction passage Ie is set to a one-way passage that permits only the flow of liquid from the extension-side chamber R1 toward the contraction-side back pressure chamber Cp.

As explained above, the connection passage 24 is in communication with the inside of the accommodation part L through the annular groove 8*e*, the port 8*f*, and the horizontal hole 8*g* provided to the piston retaining member 8. Thus, not only are the extension-side back pressure chamber Ce and the contraction-side back pressure chamber Cp in communication with each other via the extension-side pilot orifice Pe, the contraction-side pilot orifice Pp, and the communication passage 24, but the extension-side back pressure chamber Ce and the contraction-side back pressure chamber Cp are also in communication with the extension-side chamber R1 via the extension-side pressure introduction passage Ie, and in communication with the contraction-side chamber R2 via the contraction-side pressure introduction passage Ip, and are also in communication with the accommodation part L by means of the port 8*f* and the horizontal hole 8*g*.

The spring member 20 functions to press the annular plate 19 to the flange 11*b*. In other words, the spring member 20 constitutes the extension-side check valve Te together with the annular plate 19 which is the valve body. The spring member 20 also functions to bias the contraction-side spool Sp toward the contraction-side leaf valve Vp. When the contraction-side leaf valve Vp deflects so that the contraction-side spool Sp is pushed up in the direction away from the piston 2 (upwards in FIG. 3) and then the deflection of the contraction-side leaf valve Vp subsequently terminates, the contraction-side spool Sp is still biased by the spring member 20, and thus the contraction-side spool Sp can quickly return to its original position (the position shown in FIG. 3) following the contraction-side leaf valve Vp. It is also possible to bias the contraction-side spool Sp with a different spring member from the spring member 20. Using the same spring member for the spring member that constitutes the extension-side check valve Te and the spring member that biases the contraction-side spool Sp is advantageous because the number of parts can be reduced and the structure can be simplified. The outer diameter of the contraction-side spool Sp is set to be greater than the inner diameter of the annular projection 18, and the annular projection 18 is configured to abut the contraction-side annular plate 62. The contraction-side spool Sp is constantly biased toward the contraction-side leaf valve Vp by the pressure of the contraction-side back pressure chamber Cp. Therefore, a spring member for the purpose of biasing only the contraction-side spool Sp does not have to be provided to the shock absorber D1.

The extension-side spool Se receives the pressure of the extension-side back pressure chamber Ce and biases the extension-side leaf valve Ve toward the piston 2 via the extension-side annular plate 66. The pressure-receiving area of the extension-side spool Se that receives the pressure of the extension-side back pressure chamber Ce is the difference obtained by subtracting the area of a circle whose diameter is equal to the inner diameter of the annular projection 14 from the area of a circle whose diameter is equal to the outer diameter of the extension-side spool Se. Similarly, the contraction-side spool Sp receives the pressure of the contraction-side back pressure chamber Cp and biases the contraction-side leaf valve Vp toward the piston 2 via the contraction-side annular plate 62. The pressure-receiving area of the contraction-side spool Sp that receives the pressure of the contraction-side back pressure chamber Cp is the difference obtained by subtracting the area of a circle whose diameter is equal to the inner diameter of the annular projection 18 from the area of a circle whose diameter is equal to the outer diameter of the contraction-side spool Sp. In the hydraulic shock absorber D1 of the present embodiment, the pressure-receiving area of the extension-side spool Se is greater than the pressure-receiving area of the contraction-side spool Sp.

The annular projection 14 of the extension-side spool Se abuts the back surface of the extension-side annular plate 66, and the extension-side annular plate 66 is mounted on the outer periphery of the extension-side spacer 65. The pressure-receiving area in which the pressure of the extension-side back pressure chamber Ce directly acts on the extension-side annular plate 66 is obtained by subtracting the area of a circle whose diameter is equal to the outer diameter of the extension-side spacer 65 from the area of a circle whose diameter is equal to the inner diameter of the annular projection 14. Therefore, the size of the extension-side load is obtained by multiplying the pressure of the extension-side back pressure chamber Ce by an area obtained by subtracting the area of a circle whose diameter is equal to the outer diameter of the extension-side spacer 65 from the area of a circle whose diameter is equal to the outer diameter of the extension-side spool Se. The extension-side leaf valve Ve is biased toward the piston 2 by the extension-side load. The extension-side annular plate 66 may be eliminated and the annular projection 14 may be directly abutted to the back surface of the extension-side leaf valve Ve.

The annular projection 18 of the contraction-side spool Sp abuts the back surface of the contraction-side annular plate 62, and the contraction-side annular plate 62 is mounted on the outer periphery of the contraction-side spacer 61. The pressure-receiving area in which the pressure of the contraction-side back pressure chamber Cp directly acts on the contraction-side annular plate 62 is obtained by subtracting the area of a circle whose diameter is equal to the outer diameter of the contraction-side spacer 61 from the area of a circle whose diameter is equal to the inner diameter of the annular projection 18. Therefore, the size of the contraction-side load is obtained by multiplying the pressure of the contraction-side back pressure chamber Cp by an area obtained by subtracting the area of a circle whose diameter is equal to the outer diameter of the contraction-side spacer 61 from the area of a circle whose diameter is equal to the outer diameter of the contraction-side spool Sp. The contraction-side leaf valve Vp is biased toward the piston 2 by the contraction-side load. The contraction-side annular plate 62 may be eliminated and the annular projection 18 may be directly abutted to the back surface of the contraction-side leaf valve Vp.

In this way, the shock absorber D1 is set such that when the pressure of the extension-side back pressure chamber Ce and the pressure of the contraction-side back pressure chamber Cp are the same, the load received by the extension-side leaf valve Ve from the extension-side back pressure chamber Ce (extension-side load) is greater than the load received by the contraction-side leaf valve Vp from the contraction-side back pressure chamber Cp (contraction-side load).

In the case that the extension-side back pressure chamber Ce is closed by the extension-side spool Se and the pressure of the extension-side back pressure chamber Ce does not directly act on the extension-side annular plate 66, the extension-side load is determined by only the pressure-receiving area of the extension-side spool Se that receives the pressure of the extension-side back pressure chamber Ce. Similarly, in the case that the contraction-side back pressure chamber Cp is closed by the contraction-side spool Sp and the pressure of the contraction-side back pressure chamber Cp does not directly act on the contraction-side annular plate 62, the contraction-side load is determined by only the pressure-receiving area of the contraction-side spool Sp that receives the pressure of the contraction-side back pressure chamber Cp. Therefore, in an embodiment in which the pressures from the back pressure chambers Ce, Cp do not act directly on the extension-side leaf valve Ve and the contraction-side leaf valve Vp, in order to set the shock absorber D1 such that the extension-side load received by the extension-side leaf valve Ve from the extension-side back pressure chamber Ce is greater than the contraction-side load received by the contraction-side leaf valve Vp from the contraction-side back pressure chamber Cp when the pressure of the extension-side back pressure chamber Ce and the pressure of the contraction-side back pressure chamber Cp are the same, it is sufficient to set the pressure-receiving area of the extension-side spool Se to be greater than the pressure-receiving area of the contraction-side spool Sp.

In the case that the extension-side annular plate 66 and the contraction-side annular plate 62 are eliminated, the pressure of the extension-side back pressure chamber Ce can be made to act directly on the extension-side leaf valve Ve, and the pressure of the contraction-side back pressure chamber Cp can be made to act directly on the contraction-side leaf valve Vp. Further, in a structure in which the extension-side back pressure chamber Ce is closed by the extension-side spool Se, the extension-side spool Se can be abutted to the extension-side leaf valve Ve, and in a structure in which the contraction-side back pressure chamber Cp is closed by the contraction-side spool Sp, the contraction-side spool Sp can be abutted to the contraction-side leaf valve Vp. Whether or not to close the extension-side back pressure chamber Ce and the contraction-side back pressure chamber Cp with the spools is a matter that can be arbitrarily selected.

In the present embodiment, since the extension-side spool Se and the contraction-side spool Sp are used, the pressure-receiving area in which the pressure of the extension-side back pressure chamber Ce substantially acts on the extension-side leaf valve Ve can be set to be greater than the pressure-receiving area of only the extension-side leaf valve Ve. Since the difference between the pressure-receiving areas of the contraction-side spool Sp and the extension-side spool Se can be increased, the difference between the extension-side load and the contraction-side load can be increased. Thus, an extremely high degree of freedom can be imparted to the setting widths of the extension-side load and the contraction-side load.

During extension of the shock absorber D1, the extension-side leaf valve Ve receives pressure from the extension-side chamber R1 via the extension-side passage 3 and also receives the extension-side load from the back surface side. If the extension-side load (a force in a direction pushing up) surpasses a force generated by the pressure of the extension-side chamber R1 (a force in a direction pushing down), the extension-side leaf valve Ve deflects. When the extension-side leaf valve Ve deflects to the point at which it abuts the extension-side valve seat 2*d*, the extension-side passage 3 is closed. The extension-side load acting on the extension-side leaf valve Ve during extension of the shock absorber D1 at a certain piston speed can be set by the above-mentioned pressure-receiving area, the deflection rigidity of the extension-side leaf valve Ve, etc. In other words, by setting the above-mentioned pressure-receiving area, the deflection rigidity of the extension-side leaf valve Ve, etc., the extension-side passage 3 can be closed by the extension-side leaf valve Ve during extension of the shock absorber D1 at a certain piston speed.

Similar to the extension-side leaf valve Ve, the contraction-side load acting on the contraction-side leaf valve Vp during contraction of the shock absorber D1 at a certain piston speed can be set by the above-mentioned pressure-receiving area, the deflection rigidity of the contraction-side leaf valve Vp, etc. In other words, by setting the above-mentioned pressure-receiving area, the deflection rigidity of the contraction-side leaf valve Vp, etc., the contraction-side passage 4 can be closed by the contraction-side leaf valve Vp during contraction of the shock absorber D1 at a certain piston speed.

As shown in FIG. 1, the extension-side back pressure chamber Ce and the contraction-side back pressure chamber Cp are on the upstream side and the extension-side discharge passage Ee and the contraction-side discharge passage Ep are on the downstream side, and these are in communication with each other via the adjustment passage Pc. The solenoid pressure control valve 6 is provided in the adjustment passage Pc so that the pressures of the upstream extension-side back pressure chamber Ce and the contraction-side back pressure chamber Cp can be controlled. Since the extension-side load is greater than the contraction-side load, when controlling the pressures within the extension-side back pressure chamber Ce and the contraction-side back pressure chamber Cp by the solenoid pressure control valve 6, the extension-side load can be increased even with a small pressure. If the extension-side damping force is increased, the maximum pressure to be controlled by the solenoid pressure control valve 6 can be decreased.

In the present embodiment, the inner periphery of the extension-side spool Se does not slidingly contact the outer periphery of the mounting part 12*a* of the extension-side chamber 12. The pressure of the extension-side back pressure chamber Ce also acts on the inside of the abutting site of the annular projection 14 on the back surface side of the extension-side leaf valve Ve so as to bias the extension-side leaf valve Ve. In setting the extension-side load, the setting should be made considering the load that directly biases the extension-side leaf valve Ve with the pressure of the extension-side back pressure chamber Ce.

Similarly, the inner periphery of the contraction-side spool Sp does not slidingly contact the outer periphery of the mounting part 11*a* of the contraction-side chamber 11. The pressure of the contraction-side back pressure chamber Cp also acts on the inside of the abutting site of the annular projection 18 on the back surface side of the contraction-side leaf valve Vp so as to bias the contraction-side leaf valve Vp. In setting the contraction-side load, the setting should be made considering the load that directly biases the contraction-side leaf valve Vp with the pressure of the contraction-side back pressure chamber Cp.

In the present embodiment, the solenoid pressure control valve 6 is set so as to close the adjustment passage Pc when not energized, and to perform pressure control when energized. A fail valve FV that bypasses the solenoid pressure control valve 6 is provided in the adjustment passage Pc.

Figure 2:
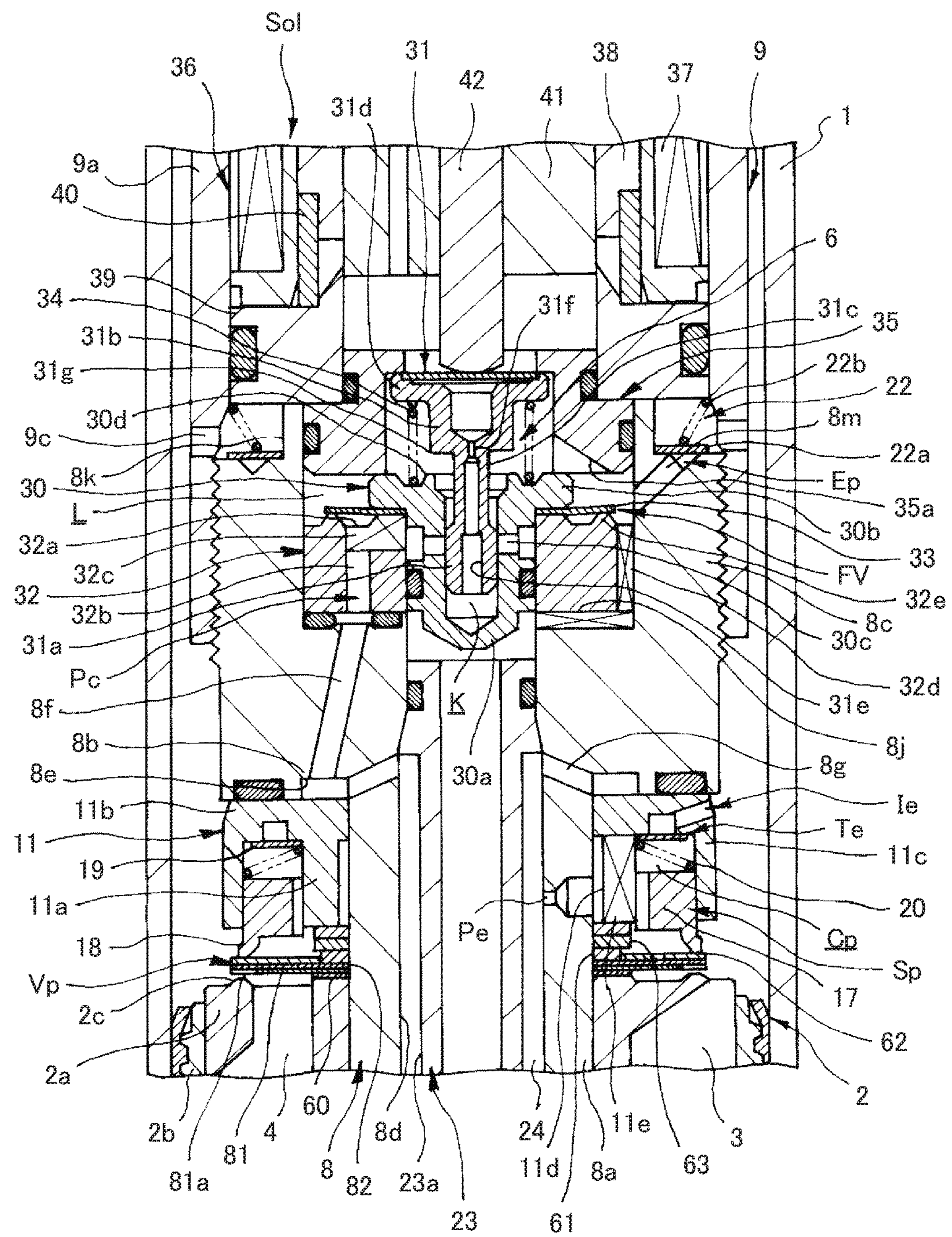
FIG. 2 is a partially enlarged cross-section view of the shock absorber using the damping valve according to the first embodiment of the present invention.

As shown in FIGS. 1 and 2, the solenoid pressure control valve 6 includes a valve seat member 30, a valve body 31 that separates from and sits on the valve seat member 30, and a solenoid Sol that provides thrust to the valve body 31 to drive the valve body 31 in the axial direction. The valve seat member 30 has a valve accommodation tube 30*a* and a valve seat 30*d*. The valve body 31 separates from and sits on the valve seat 30*d* of the valve seat member 30.

The valve seat member 30 is accommodated within the accommodation part L. The position of the valve seat member 30 in the radial direction is determined by inserting the valve accommodation tube 30*a* into the inner periphery of an annular valve housing 32 that is laminated on the top end in FIG. 2 of the flange 8*b*. The valve housing 32 is fitted into the socket 8*c* of the piston retaining member 8.

As shown in FIG. 2, the valve housing 32 is formed in an annular shape. The valve housing 32 includes: an annular window 32*a* provided on the top end in FIG. 2; a port 32*b* that opens from the annular window 32*a* and communicates with the bottom end in FIG. 2; a notched groove 32*c* that opens from the inner periphery at the top end in FIG. 2 and communicates with the port 32*b*; a groove 32*d* provided in the outer periphery along the axial direction; and a valve seat 32*e* of the fail valve FV. The valve seat 32*e* is formed in an annular shape so as to surround the outer periphery of the annular window 32*a*.

In a state in which the valve housing 32 is inserted into the socket 8*c* and is laminated on the top end in FIG. 2 of the flange 8*b*, the port 32*b* opposes an opening formed on a top end surface of the flange 8*b* of the port 8*f*, and the port 32*b* and the notched groove 32*c* are in communication with the port 8*f*. Further, the groove 32*d* opposes the groove 8*j* formed in the flange 8*b*, and the groove 32*d* and the groove 8*j* are in communication with each other.

The port 32*b* and the notched groove 32*c* are in communication with the communication passage 24 via the annular groove 8*e*, the port 8*f*, and the horizontal hole 8*g*. Further, the port 32*b* and the notched groove 32*c* are in communication with the extension-side back pressure chamber Ce and the contraction-side back pressure chamber Cp via the communication passage 24, the extension-side pilot orifice Pe, and the contraction-side pilot orifice Pp. The groove 32*d* is in communication with the inside of the separator 23 via the groove 8*j* and with the contraction-side chamber R2 via the extension-side discharge passage Ee formed by the check valve 25. Further, the groove 32*d* is in communication with the extension-side chamber R1 via the through hole 9*c*, the recess 8*k*, the through hole 8*m*, and the contraction-side discharge passage Ep formed by the check valve 22.

The valve accommodation tube 30*a* of the tubular valve seat member 30 is accommodated within the valve housing 32. The valve seat member 30 includes: the closed-bottom cylindrical valve accommodation tube 30*a*; a through hole 30*c* that opens from the side of the valve accommodation tube 30*a* and communicates with the inside thereof; and the annular valve seat 30*d* that projects toward the axial direction from the top end in FIG. 2 of the valve accommodation tube 30*a*. The valve accommodation tube 30*a* has a flange 30*b* on the outer periphery at the top end in FIG. 2.

The valve body 33 of the fail valve FV is mounted on the outer periphery of the valve accommodation tube 30*a* of the valve seat member 30. The valve body 33 consists of an annular leaf valve. In a state in which the valve accommodation tube 30*a* is inserted into the valve housing 32 and the valve seat member 30 is assembled to the valve housing 32, the inner periphery of the valve body 33 is sandwiched by the flange 30*b* of the valve seat member 30 and the inner periphery at the top end in FIG. 2 of the valve housing 32, and by this sandwiching, the valve body 33 is fixed to the valve seat member 30. The outer peripheral side of the valve body 33 sits on the annular valve seat 32*e* provided to the valve housing 32 in a state in which an initial deflection is provided, and the valve body 33 blocks the annular window 32*a*. The valve body 33 deflects when the pressure acting on the inside of the annular window 32*a* via the port 32*b* reaches a valve-opening pressure. As a result, the annular window 32*b* is opened, and the port 32*b* communicates with the extension-side discharge passage Ee and the contraction-side discharge passage Ep. In this way, the fail valve FV is formed by the valve body 33 and the valve seat 32*e*.

Further, in a state in which the valve accommodation tube 30*a* is inserted into the valve housing 32 and the valve seat member 30 is assembled to the valve housing 32, the notched groove 32*c* provided to the valve housing 32 opposes the through hole 30*c* provided to the valve accommodation tube 30*a*. The extension-side back pressure chamber Ce and the contraction-side back pressure chamber Cp are in communication with the inside of the valve accommodation tube 30*a* via the port 32*b*.

An annular valve fixing member 35 is laminated on the top in FIG. 1 of the valve seat member 30. The valve fixing member 35 abuts the top end in FIG. 1 of the flange 30*b*. Further, the solenoid Sol accommodated within the solenoid valve accommodation tube 9 is disposed on the top in FIG. 1 of the valve fixing member 35. When the solenoid valve accommodation tube 9 and the piston retaining member 8 are integrated by screwing, the valve housing 32, the valve body 33, the valve seat member 30, the valve fixing member 35, and the solenoid Sol are sandwiched by the solenoid valve accommodation tube 9 and the piston retaining member 8. A notched groove 35*a* is provided in the valve fixing member 35. Even in a state in which the valve fixing member 35 abuts the flange 30*b* of the valve seat member 30, a space on the inner peripheral side of the valve fixing member 35 communicates with a space on the outer peripheral side of the valve seat member 30 by means of the notched groove 35*a*. The space on the inner peripheral side of the valve fixing member 35 and the space on the outer peripheral side of the valve seat member 30 may communicate with each other via a hole such as a port instead of the notched groove 35*a*.

The solenoid Sol includes: a closed-top cylindrical mold stator 36, a first fixed iron core 38 that is fitted into the inner periphery of the mold stator 36; an annular second fixed iron core 39 that is laminated on the bottom end in FIG. 1 of the mold stator 36; a filler ring 40 that is interposed between the first fixed iron core 38 and the second fixed iron core 39; a cylindrical movable iron core 41 that is disposed such that it can move in the axial direction on the inner peripheral side of the first fixed iron core 38 and the second fixed iron core 39; and a shaft 42 that is fixed to the inner periphery of the movable iron core 41. The mold stator 36 is formed by integrating, using a molded resin, a coil 37 and a harness H that energizes the coil 37. The first fixed iron core 38 is formed in a closed-top cylindrical shape. The filler ring 40 has a magnetic air gap. By energizing the coil 37, the movable iron core 41 is suctioned, and thereby a thrust oriented downward in FIG. 1 can be provided to the shaft 42.

Further, the valve body 31 of the solenoid valve is slidingly inserted into the valve seat member 30. In detail, the valve body 31 includes: a small-diameter part 31*a* that is slidably inserted into the valve accommodation tube 30*a* of the valve seat member 30; a large-diameter part 31*b* that is provided to the small-diameter part 31*a* on the opposite side (the top side in FIG. 2) of the valve seat member 30; an annular recess 31*c* that is provided between the small-diameter part 31*a* and the large-diameter part 31*b*; a flange-shaped spring receiving part 31*d* that is provided on the outer periphery of the edge of the large-diameter part 31*b* on the opposite side of the valve seat member 30; a connection passage 31*e* that penetrates from the distal end to the rear end of the valve body 31; and an orifice 31*f* that is provided in the connection passage 31*e*. The large-diameter part 31*b* is not inserted into the valve accommodation tube 30*a*.

As described above, the valve body 31 of the solenoid valve has the large-diameter part 31*b*, which has an outer diameter that is greater than the outer diameter of the small-diameter part 31*a*, on the opposite side of the valve seat member 30 with the recess 31*c* as a boundary therebetween. The valve body 31 includes a seating part 31*g* that opposes the valve seat 30*d* of the control valve on the bottom end in FIG. 2 of the large-diameter part 31*b*. When the valve body 31 of the solenoid valve moves in the axial direction relative to the valve seat body 30, the seating part 31*g* separates from and sits on the valve seat 30*d* of the control valve. In other words, the solenoid pressure control valve 6 includes the valve body 31 and the valve seat member 30. When the seating part 31*g* sits on the valve seat 30*d* of the control valve, the solenoid pressure control valve 6 closes.

A coil spring 34, which biases the valve body 31 of the solenoid valve in a direction away from the valve seat member 30, is interposed between the flange 30*b* of the valve seat member 30 and the spring receiving part 31*d*. Therefore, the valve body 31 of the solenoid valve is constantly biased by the coil spring 34 in a direction away from the valve seat member 30. The shock absorber D1 includes the solenoid Sol that exerts a thrust against the biasing force of the coil spring 34. If the thrust against the coil spring 34 from the solenoid Sol does not act, the valve body 31 is positioned at a position farthest away from the valve seat member 30. In this case, the valve body 31 of the solenoid valve is biased in a direction away from the valve seat member 30 utilizing the coil spring 34, but an elastic body capable of exerting a biasing force other than the coil spring 34 can be used.

In a state in which the valve body 31 of the solenoid valve is farthest away from the valve seat member 30, the small-diameter part 31*a* opposes the through hole 30*c* and the through hole 30*c* is blocked. In a state in which the solenoid Sol is energized so that the valve body 31 moves by a prescribed amount toward the valve seat member side from the position farthest away from the valve seat member 30, the recess 31*c* constantly opposes the through hole 30*c* and the through hole 30*c* is opened.

In a state in which the valve body 31 of the solenoid valve opens the through hole 30*c* and the seating part 31*g* separates from the valve seat 30*d* of the control valve, the through hole 30*c* is in communication with the extension-side discharge passage Ee and the contraction-side discharge passage Ep via the recess 31*c* of the valve body 31 of the solenoid valve and the notched groove 35*a* provided to the valve fixing member 35. By adjusting the thrust of the solenoid Sol, the force that biases the valve body 31 of the solenoid valve toward the valve seat member 30 side can be controlled. If the action of the pressure upstream of the solenoid pressure control valve 6 and the force generated by the coil spring 34 that pushes the valve body 31 of the solenoid valve upward in FIG. 2 surpass the force generated by the solenoid Sol that pushes down the valve body 31 of the solenoid valve, the solenoid pressure control valve 6 opens. In other words, the pressure on the upstream side of the solenoid pressure control valve 6 can be controlled according to the thrust of the solenoid Sol. The upstream of the solenoid pressure control valve 6 communicates with the extension-side back pressure chamber Ce and the contraction-side back pressure chamber Cp via the adjustment passage Pc, and thus the pressures of the extension-side back pressure chamber Ce and the contraction-side back pressure chamber Cp can be controlled by the solenoid pressure control valve 6. Further, the downstream of the solenoid pressure control valve 6 communicates with the extension-side discharge passage Ee and the contraction-side discharge passage Ep. During extension of the hydraulic shock absorber D1, liquid passing through the solenoid pressure control valve 6 is discharged to the contraction-side chamber R2 on the low-pressure side. During contraction of the hydraulic shock absorber D1, liquid passing through the solenoid pressure control valve 6 is discharged to the extension-side chamber R1 on the low-pressure side. Therefore, the adjustment passage Pc is formed by the annular groove 8*e*, the port 8*f*, the horizontal hole 8*g*, the port 32*b*, the notched groove 32*c*, a portion of the accommodation part L, and the groove 32*d*.

The solenoid pressure control valve 6 includes a blocked position in which the through hole 30*c* of the valve seat member 30 is blocked by the small-diameter part 31*a* of the valve body 31 of the solenoid valve during a failure in which the solenoid Sol cannot be energized. In other words, the solenoid pressure control valve 6 functions not only as a pressure control valve but also as an opening/closing valve. The fail valve FV is configured so as to open/close the annular window 32*a* that communicates with the port 32*b*. The valve-opening pressure of the fail valve FV is set to a pressure exceeding the upper limit pressure that can be controlled by the solenoid pressure control valve 6. The fail valve FV is configured so as to be able to bypass the solenoid pressure control valve 6 and allow the port 32*b* to communicate with the extension-side discharge passage Ee and contraction-side discharge passage Ep. If the pressure on the upstream side of the solenoid pressure control valve 6 exceeds the control upper limit pressure, the fail valve is configured so as to open so that the pressures of the extension-side back pressure chamber Ce and the contraction-side back pressure chamber Cp can be controlled to the valve-opening pressure of the fail valve FV. Therefore, for example, if the solenoid pressure control valve 6 enters the blocked position during a failure, the pressures of the extension-side back pressure chamber Ce and the contraction-side back pressure chamber Cp are controlled by the fail valve FV.

When the valve body 31 of the solenoid valve is inserted into the valve accommodation tube 30*a* of the valve seat member 30, a space K is formed within the valve accommodation tube 30*a* more toward the distal end side than the through hole 30*c*. The space K is in communication with the outside of the valve body of the solenoid valve via the connection passage 31*e* and the orifice 31*f* provided to the valve body 31 of the solenoid valve. Therefore, when the valve body 31 of the solenoid valve moves in the axial direction (the up-down direction in FIG. 2) relative to the valve seat member 30, the space K functions as a dash pot. Thus, steep displacement of the valve body 31 of the solenoid valve can be suppressed, and vibrational movement of the valve body 31 of the solenoid valve can be suppressed.

Next, the operation of the shock absorber D1 will be explained. First, a case in which the damping force characteristics of the shock absorber D1 are set to soft, i.e. a case in which the biasing force that is generated by the biasing part and biases the extension-side leaf valve Ve and the contraction-side leaf valve Vp is decreased and the damping coefficient is decreased, will be explained. In order to make the damping force characteristics soft, the biasing force generated by the biasing part is controlled so that the extension-side leaf valve Ve and the contraction-side leaf valve Vp do not sit on the corresponding extension-side valve seat 2*d* and the contraction-side valve seat 2*c*. Specifically, the resistance applied by the solenoid pressure control valve 6 to the passing liquid is decreased by energizing the solenoid Sol.

In this state, even if the extension-side leaf valve Ve deflects due to the biasing force generated by the biasing part, the extension-side leaf valve Ve does not sit on the extension-side valve seat 2*d* and a gap is formed between the two. The same applies to the contraction-side leaf valve Vp, such that even if the contraction-side leaf valve Vp deflects due to the biasing force generated by the biasing part, the contraction-side leaf valve Vp does not sit on the contraction-side valve seat 2*c* and a gap is formed between the two.

Figure 4:
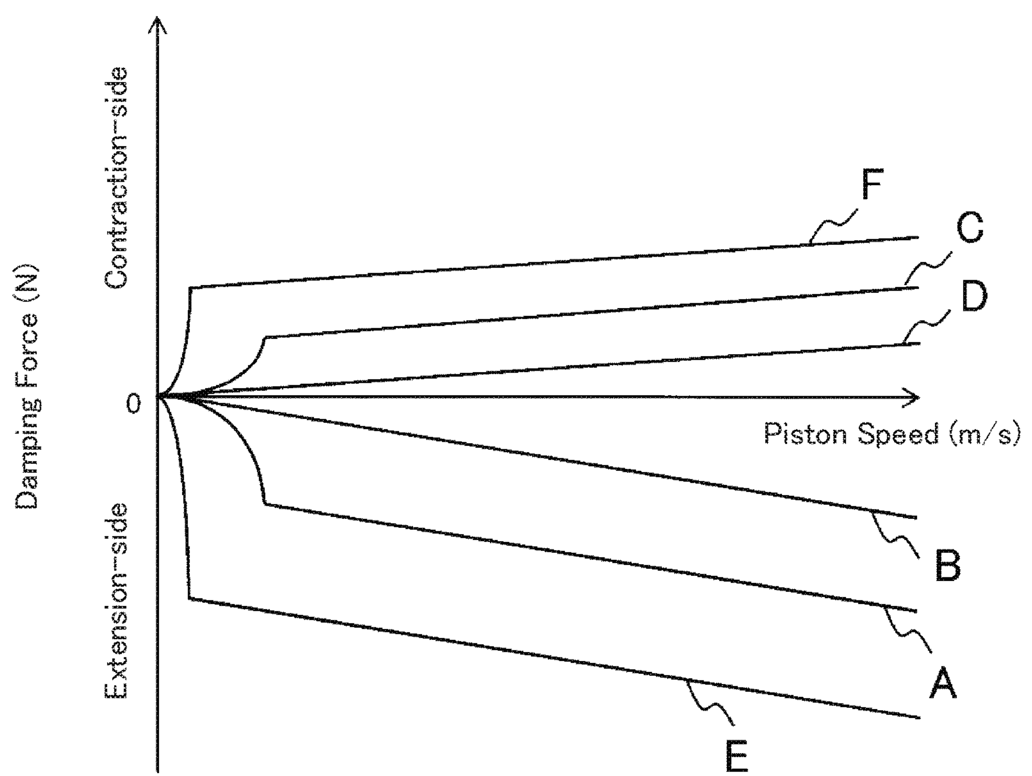
FIG. 4 is a diagram for explaining the damping force characteristics of the shock absorber using the damping valve according to the first embodiment of the present invention.

In this state, if the shock absorber D1 extends and the piston 2 moves upward in FIG. 1, the liquid within the extension-side chamber R1 that is compressed pushes the extension-side leaf valve Ve causing it to deflect. The liquid within the extension-side chamber R1 passes through the extension-side passage 3 and moves to the contraction-side chamber R2 that is expanded. Since a gap is formed between the extension-side leaf valve Ve and the extension-side valve seat 2*d*, a larger flow path area is secured compared to the state in which the extension-side leaf valve Ve sits on the extension-side valve seat 2*d* and the extension-side passage 3 communicates with the contraction-side chamber R2 via only the notch 71*a*. Therefore, as indicated by the line B in FIG. 4, the shock absorber D1 can reduce the damping force when the piston speed is in a low-speed region compared to the damping force generated by a conventional shock absorber as shown by the line A.

When the pressure within the extension-side chamber R1 rises in accordance with the extension of the shock absorber D1, the extension-side leaf valve Ve deflects. The amount of this deflection is determined by the balance between a force that is generated by the pressure of the extension-side chamber R1 and that attempts to make the extension-side leaf valve Ve deflect from the extension-side passage 3 side, and the total of a force that is generated by the spring reaction force possessed by the extension-side leaf valve Ve itself according to the above-mentioned amount of deflection and that attempts to return the extension-side leaf valve Ve to the extension-side valve seat 2*d* side and the extension-side load generated by the biasing part. The extension-side leaf valve Ve opens the extension-side passage 3 by deflecting.

The liquid within the extension-side chamber R1 pushes and opens the extension-side check valve Te. The liquid within the extension-side chamber R1 passes through the extension-side pressure introduction passage Ie and flows to the adjustment passage Pc. The liquid that has passed through the adjustment passage Pc pushes and opens the check valve 25, and is discharged to the contraction-side chamber R2 on the low-pressure side via the extension-side discharge passage Ee. The extension-side pilot orifice Pe applies resistance when liquid passes therethrough to cause a pressure loss. In a state in which the liquid is flowing, the pressure downstream of the adjustment passage Pc decreases lower than the pressure of the extension-side chamber R1, and thus the check valve 22 provided to the contraction-side discharge passage Ep does not open and remains closed.

The extension-side pressure introduction passage Ie not only communicates with the contraction-side back pressure chamber Cp, but also communicates with the extension-side back pressure chamber Ce via the communication passage 24. Since the contraction-side pressure introduction passage Ip is closed by the contraction-side check valve Tp, during extension of the shock absorber D1, the pressure within the extension-side back pressure chamber Ce can be increased higher than that of the contraction-side chamber R2. The pressure of the contraction-side back pressure chamber Cp becomes higher than the pressure of the contraction-side chamber R2 on the low-pressure side. The gap between the contraction-side leaf valve Vp and the contraction-side valve seat 2*c* acts as an orifice until the contraction-side leaf valve Vp deflects due to the pressure of the extension-side chamber R1 and the pressure of the contraction-side back pressure chamber Cp so that the contraction-side leaf valve Vp sits on the contraction-side valve seat 2*c*. During extension of the shock absorber D1, liquid does not need to flow through the contraction-side passage 4, and thus there is no problem even if the contraction-side leaf valve Vp deflects due to the pressure of the extension-side chamber R1 and the pressure of the contraction-side back pressure chamber Cp so as to sit on the contraction-side valve seat 2*c* causing the contraction-side passage 4 to be closed.

The solenoid pressure control valve 6 is provided in the adjustment passage Pc as explained above. When the solenoid Sol of the solenoid pressure control valve 6 is energized so as to control the pressure on the upstream side of the adjustment passage Pc, the pressure within the extension-side back pressure chamber Ce can be adjusted and the extension-side load can be controlled to a desired load. Given the above, the opening degree of the extension-side leaf valve Ve can be controlled by the solenoid pressure control valve 6, and thereby the extension-side damping force during extension of the shock absorber D1 can be controlled.

If the shock absorber D1 contracts and the piston 2 moves downward in FIG. 1, the liquid within the contraction-side chamber R2 that is compressed pushes the contraction-side leaf valve Vp causing it to deflect. The liquid within the contraction-side chamber R2 passes through the contraction-side passage 4 and moves to the extension-side chamber R1 that is expanded. Since a gap is formed between the contraction-side leaf valve Vp and the contraction-side valve seat 2*c*, a larger flow path area is secured compared to the state in which the contraction-side leaf valve Vp sits on the contraction-side valve seat 2*c* and the contraction-side passage 4 communicates with the extension-side chamber R1 via only the notch 81*a*. Therefore, as indicated by the line D in FIG. 4, the shock absorber D1 can reduce the damping force when the piston speed is in a low-speed region compared to the damping force generated by a conventional shock absorber as shown by the line C.

When the pressure within the contraction-side chamber R2 rises in accordance with the contraction of the shock absorber D1, the contraction-side leaf valve Vp deflects. The amount of this deflection is determined by the balance between a force that is generated by the pressure of the contraction-side chamber R2 and that attempts to make the contraction-side leaf valve Vp deflect from the contraction-side passage 4 side, and the total of a force that is generated by the spring reaction force possessed by the contraction-side leaf valve Vp itself according to the above-mentioned amount of deflection and that attempts to return the contraction-side leaf valve Vp to the contraction-side valve seat 2*c* side and the contraction-side load generated by the biasing part. The contraction-side leaf valve Vp opens the contraction-side passage 4 by deflecting.

The liquid within the contraction-side chamber R2 pushes and opens the contraction-side check valve Tp. The liquid within the contraction-side chamber R2 passes through the contraction-side pressure introduction passage Ip and flows to the adjustment passage Pc. The liquid that has passed through the adjustment passage Pc pushes and opens the check valve 22, and is discharged to the extension-side chamber R1 on the low-pressure side via the contraction-side discharge passage Ep. The contraction-side pilot orifice Pp applies resistance when liquid passes therethrough to cause a pressure loss. In a state in which the liquid is flowing, the pressure downstream of the adjustment passage Pc decreases lower than the pressure of the contraction-side chamber R2, and thus the check valve 25 provided to the extension-side discharge passage Ee does not open and remains closed.

The contraction-side pressure introduction passage Ip not only communicates with the extension-side back pressure chamber Ce, but also communicates with the contraction-side back pressure chamber Cp via the communication passage 24. Since the extension-side pressure introduction passage Ie is closed by the extension-side check valve Te, during contraction of the shock absorber D1, the pressure within the contraction-side back pressure chamber Cp can be increased higher than that of the extension-side chamber R1. The pressure of the extension-side back pressure chamber Ce becomes higher than the pressure of the extension-side chamber R1 on the low-pressure side. The gap between the extension-side leaf valve Ve and the extension-side valve seat 2*d* acts as an orifice until the extension-side leaf valve Ve deflects due to the pressure of the contraction-side chamber R2 and the pressure of the extension-side back pressure chamber Ce so that the extension-side leaf valve Ve sits on the extension-side valve seat 2*d*. During contraction of the shock absorber D1, liquid does not need to flow through the extension-side passage 3, and thus there is no problem even if the extension-side leaf valve Ve deflects due to the pressure of the contraction-side chamber R2 and the pressure of the extension-side back pressure chamber Ce so as to sit on the extension-side valve seat 2*d* causing the extension-side passage 3 to be closed.

The solenoid pressure control valve 6 is provided in the adjustment passage Pc as explained above. When the solenoid Sol of the solenoid pressure control valve 6 is energized so as to control the pressure on the upstream side of the adjustment passage Pc, the pressure within the contraction-side back pressure chamber Cp can be adjusted and the contraction-side load can be controlled to a desired load. Given the above, the opening degree of the contraction-side leaf valve Vp can be controlled by the solenoid pressure control valve 6, and thereby the contraction-side damping force during contraction of the shock absorber D1 can be controlled.

Next, a case in which the damping force characteristics of the shock absorber D1 are set to hard, i.e. a case in which the biasing force that is generated by the biasing part and biases the extension-side leaf valve Ve and the contraction-side leaf valve Vp is increased and the damping coefficient is increased, will be explained. In order to make the damping force characteristics hard, the biasing force generated by the biasing part is controlled so that the extension-side leaf valve Ve and the contraction-side leaf valve Vp sit on the corresponding extension-side valve seat 2*d* and the contraction-side valve seat 2*c*. Specifically, the solenoid Sol is energized so as to increase the resistance applied by the solenoid pressure control valve 6 to the passing liquid.

In this state, the extension-side leaf valve Ve deflects due to the biasing part and sits on the extension-side valve seat 2*d*, and no gap is formed between the two. The same applies to the contraction-side leaf valve Vp, such that the contraction-side leaf valve Vp deflects due to the biasing part and sits on the contraction-side valve seat 2*c*, and no gap is formed between the two.

When the piston 2 moves upward in FIG. 1 at a low piston speed and the shock absorber D1 extends, the extension-side leaf valve Ve does not separate from the extension-side valve seat 2*d* even if the extension-side leaf valve Ve receives pressure from the extension-side chamber R1 via the extension-side passage 3. Therefore, the extension-side leaf valve Ve allows the extension-side chamber R1 to communicate with the contraction-side chamber R2 via the notch 71*a* excluding the adjustment passage Pc. In this state, the shock absorber D1 applies resistance mainly with the notch 71*a* functioning as an orifice against the flow of liquid passing through the extension-side passage 3. Accordingly, the shock absorber D1 can exert a larger damping force compared to the damping force that is generated in the state in which a gap is formed between the extension-side leaf valve Ve and the extension-side valve seat 2*d*.

On the other hand, if the piston speed is high, the pressure of the extension-side chamber R1 that acts on the extension-side leaf valve Ve via the extension-side passage 3 increases. If the force in a direction causing the extension-side leaf valve Ve to separate from the extension-side valve seat 2*d* that is generated by the pressure of the extension-side chamber R1 surpasses the biasing force of the biasing part, the extension-side leaf valve Ve deflects and the extension-side annular plate 66 and the extension-side spool Se are pushed downward in FIG. 3 and separate from the extension-side valve seat 2*d*. Since the biasing force generated by the biasing part is large compared to the state in which the damping force characteristics are set to be soft, the amount of deflection of the extension-side leaf valve Ve is small. As indicated by the line E in FIG. 4, even at the same piston speed, the shock absorber D1 exerts a higher damping force when set to hard than when set to soft.

Similar to the case in which the damping force characteristics are set to soft, the liquid within the extension-side chamber R1 pushes and opens the extension-side check valve Te and passes through the extension-side pressure introduction chamber Ie to flow into the adjustment passage Pc. By controlling the pressure on the upstream side of the adjustment passage Pc with the solenoid pressure control valve 6 provided to the adjustment passage Pc, similar to when set to soft, the pressure within the extension-side back pressure chamber Ce can be adjusted and the extension-side load can be controlled to a desired load, and the opening degree of the extension-side leaf valve Ve can be controlled. Thereby, the damping force (extension-side damping force) during extension of the shock absorber D1 in which the damping force characteristics have been set to hard can be controlled.

When the piston 2 moves downward in FIG. 1 at a low piston speed and the shock absorber D1 contracts, the contraction-side leaf valve Vp does not separate from the contraction-side valve seat 2*c* even if the contraction-side leaf valve Vp receives pressure from the contraction-side chamber R2 via the contraction-side passage 4. Therefore, the contraction-side leaf valve Vp allows the contraction-side chamber R2 to communicate with the extension-side chamber R1 via the notch 81*a* excluding the adjustment passage Pc. In this state, the shock absorber D1 applies resistance mainly with the notch 81*a* functioning as an orifice against the flow of liquid passing through the contraction-side passage 4. Accordingly, the shock absorber D1 can exert a larger damping force compared to the damping force that is generated in the state in which a gap is formed between the contraction-side leaf valve Vp and the contraction-side valve seat 2*c*.

On the other hand, if the piston speed is high, the pressure of the contraction-side chamber R2 that acts on the contraction-side leaf valve Vp via the contraction-side passage 4 increases. If the force in a direction causing the contraction-side leaf valve Vp to separate from the contraction-side valve seat 2*c* that is generated by the pressure of the contraction-side chamber R2 surpasses the biasing force of the biasing part, the contraction-side leaf valve Vp deflects and the contraction-side annular plate 62 and the contraction-side spool Sp are pushed upward in FIG. 3 and separate from the contraction-side valve seat 2*c*. Since the biasing force generated by the biasing part is large compared to the state in which the damping force characteristics are set to be soft, the amount of deflection of the contraction-side leaf valve Vp is small. As indicated by the line F in FIG. 4, even at the same piston speed, the shock absorber D1 exerts a higher damping force when set to hard than when set to soft.

Similar to the case in which the damping force characteristics are set to soft, the liquid within the contraction-side chamber R2 pushes and opens the contraction-side check valve Tp and passes through the contraction-side pressure introduction chamber Ip to flow into the adjustment passage Pc. By controlling the pressure on the upstream side of the adjustment passage Pc with the solenoid pressure control valve 6 provided to the adjustment passage Pc, similar to when set to soft, the pressure within the contraction-side back pressure chamber Cp can be adjusted and the contraction-side load can be controlled to a desired load, and the opening degree of the contraction-side leaf valve Vp can be controlled. Thereby, the damping force (contraction-side damping force) during contraction of the shock absorber D1 in which the damping force characteristics have been set to hard can be controlled.

In this way, in the damping valve and shock absorber D1 of the present embodiment, gaps are provided between the leaf valves Ve, Vp and the valve seats 2*c*, 2*d*. Therefore, when the biasing force generated by the biasing part is reduced and the damping characteristics are set to soft, compared to a conventional damping valve and shock absorber using a fixed orifice, the flow passage area can be increased and the damping force can be decreased when the piston speed is in a low-speed region. Further, in the damping valve and shock absorber D1, when set to hard, the leaf valves Ve, Vp can be made to sit on the valve seats 2*c*, 2*d*, and thus the damping force variable width can also be secured.

Thus, according to the damping valve and the shock absorber of the present embodiment, the damping force when the piston speed is in a low-speed region can be decreased and the damping force adjustment width can be expanded.

In the case that the damping force characteristics of the shock absorber D1 according to the present embodiment are switched from soft to hard during the extension operation, the gap between the extension-side leaf valve Ve and the extension-side valve seat 2*d* gradually decreases due to the increase in pressure within the extension-side back pressure chamber Ce, and thus the extension-side leaf valve Ve sits on the extension-side valve seat 2*d*. In the case that the damping force characteristics of the shock absorber D1 are switched from soft to hard during the contraction operation, the gap between the contraction-side leaf valve Vp and the contraction-side valve seat 2*c* gradually decreases due to the increase in pressure within the contraction-side back pressure chamber Cp, and thus the contraction-side leaf valve Vp sits on the contraction-side valve seat 2*c*. Conversely, in the case that the damping force characteristics of the shock absorber D1 according to the present embodiment are switched from hard to soft during the extension operation, the gap between the extension-side leaf valve Ve and the extension-side valve seat 2*d* gradually increases due to the decrease in pressure within the extension-side back pressure chamber Ce. In the case that the damping force characteristics of the shock absorber D1 according to the present embodiment are switched from hard to soft during the contraction operation, the gap between the contraction-side leaf valve Vp and the contraction-side valve seat 2*c* gradually increases due to the decrease in pressure within the contraction-side back pressure chamber Cp. Therefore, when the damping force characteristics of the shock absorber D1 are switched from soft to hard or from hard to soft, any sudden changes in the damping force characteristics of the shock absorber D1 are mitigated. In a vehicle equipped with the shock absorber D1, sudden changes in the damping force characteristics are mitigated, and thus shocks during switching of the damping force characteristics are not perceived by the passengers, and the riding comfort of the vehicle can be improved.

The extension-side annular plate 66 is laminated on the back surface of the extension-side leaf valve Ve, and the extension-side annular plate 66 is slidingly mounted on the outer periphery of the extension-side spacer 65. The contraction-side annular plate 62 is laminated on the back surface of the contraction-side leaf valve Vp, and the contraction-side annular plate 62 is slidingly mounted on the outer periphery of the contraction-side spacer 61. Therefore, by setting the rigidity of the extension-side annular plate 66 to be higher than the rigidity of the extension-side leaf valve Ve and setting the rigidity of the contraction-side annular plate 62 to be higher than the rigidity of the contraction-side leaf valve Vp, the biasing force generated by the biasing part can be received by the extension-side annular plate 66 and the contraction-side annular plate 62. Thus, deformation of the extension-side leaf valve Ve and the contraction-side leaf valve Vp can be suppressed, and deterioration of the extension-side leaf valve Ve and the contraction-side leaf valve Vp can be suppressed.

The extension-side annular plate 66 is slidingly mounted on the outer periphery of the extension-side spacer 65 that is laminated on the back surface of the extension-side leaf valve Ve, and the contraction-side annular plate 62 is slidingly mounted on the outer periphery of the contraction-side spacer 61 that is laminated on the back surface of the contraction-side leaf valve Vp. The inner diameter of the extension-side annular plate 66 is smaller than the outer diameter of the inner peripheral seat part 2*h* of the piston 2, and the outer diameter of the extension-side annular plate 66 is greater than the inner diameter of the extension-side valve seat 2*d*. Further, the inner diameter of the contraction-side annular plate 62 is smaller than the outer diameter of the inner peripheral seat part 2*f* of the piston 2, and the outer diameter of the contraction-side annular plate 62 is greater than the inner diameter of the contraction-side valve seat 2*c*. Therefore, the pressure on the back surfaces of the extension-side leaf valve Ve and the contraction-side leaf valve Vp can be received by the extension-side annular plate 66 and the contraction-side annular plate 62. Accordingly, by providing the extension-side annular plate 66 and the contraction-side annular plate 62 to the shock absorber D1, excessive loads on the extension-side leaf valve Ve and the contraction-side leaf valve Vp can be prevented, and the rigidity of the extension-side leaf valve Ve and the contraction-side leaf valve Vp can be further reduced, and thus leaf valves with lower deflection rigidity can be utilized. Therefore, a lower damping force can be exerted by the shock absorber D1.

Further, the biasing part biases the leaf valves Ve, Vp using either one or both of the pressures of the extension-side chamber R1 and the contraction-side chamber R2 within the shock absorber D1. Therefore, the leaf valves Ve, Vp can be biased without using a biasing force generation source, and the biasing force can be changed by controlling the pressure.

In a shock absorber for a vehicle, it is necessary to make the extension-side damping force during the extension operation greater than the contraction-side damping force during the contraction operation. In the shock absorber D1 that is set to a single-rod type, the pressure-receiving area that receives the pressure of the extension-side chamber R1 is an area obtained by subtracting the cross-section area of the rod member 10 from the cross-section area of the piston 2. Thus, it is necessary to make the pressure of the extension-side chamber R1 during the extension operation much greater than the pressure of the contraction-side chamber R2 during the contraction operation.

In contrast, in the shock absorber D1 according to the present embodiment, in the case that the extension-side back pressure chamber Ce and the contraction-side back pressure chamber Cp are at equal pressures, the extension-side load that biases the extension-side leaf valve Ve is greater than the contraction-side load that biases the contraction-side leaf valve Vp. Further, in the present embodiment, the extension-side spool Se is used. Compared to a structure in which the extension-side spool Se is not used and the pressure of the extension-side back pressure chamber Ce is merely made to act on the back surface side of the extension-side leaf valve Ve, the pressure-receiving area of the extension-side spool Se that receives the pressure of the extension-side back pressure chamber Ce can be made greater than the back surface area of the extension-side leaf valve Ve. Therefore, a large extension-side load can be made to act on the extension-side leaf valve Ve. Further, by using the extension-side spool Se and the contraction-side spool Sp, the degree of freedom for designing the extension-side load and the contraction-side load can be improved.

Accordingly, in the shock absorber D1 of the present embodiment, in the case that it is necessary to greatly increase the extension-side load in order to adjust the extension-side damping force during the extension operation, it is possible to make settings so as to output a large extension-side load even if the pressure of the extension-side back pressure chamber Ce is small. Thus, the control width of the extension-side damping force can be secured even without using a large solenoid Sol.

Instead of performing pressure control of the extension-side back pressure chamber Ce and the contraction-side back pressure chamber Cp by driving independent valve bodies, by making the extension-side load greater than the contraction-side load, the control width of the extension-side damping force can be secured even if the pressures of the extension-side back pressure chamber Ce and the contraction-side back pressure chamber Cp are controlled in communication with each other. Thus, it is sufficient to provide a single valve body 31 of the solenoid valve to the solenoid pressure control valve 6. Therefore, the structure becomes extremely simple and the costs can also be lowered.

Due to the above, the size of the solenoid Sol in the solenoid pressure control valve 6 can be decreased, and in addition, the structure of the solenoid pressure control valve 6 is simplified and the size of the shock absorber D1 does not increase even if the solenoid pressure control valve 6 is utilized in the piston part of the shock absorber D1. Thus, according to the shock absorber D1 of the present embodiment, the structure of the shock absorber D1 is simplified and the size thereof is reduced, and the installation into the vehicle is not negatively affected. Further, since the extension-side damping force can be increased even if the solenoid Sol does not exert a large thrust, the power consumption when increasing the damping force can be reduced and thus power saving can be achieved.

Since the pressure-receiving area of the extension-side spool Se that receives the pressure of the extension-side back pressure chamber Ce is configured to be greater than the pressure-receiving area of the contraction-side spool Sp that receives the pressure of the contraction-side back pressure chamber Cp, the extension-side load can be easily configured to be greater than the contraction-side load.

The extension-side back pressure chamber Ce and the contraction-side back pressure chamber Cp communicate with each other through the communication passage 24 via the contraction-side resistance element and the extension-side resistance element. The contraction-side pressure introduction passage Ip introduces liquid from the contraction-side chamber R2 to the extension-side back pressure chamber Ce with hardly any resistance. Therefore, when the shock absorber D1 switches from the extension operation to the contraction operation, the pressure within the contraction-side chamber R2 is quickly introduced into the extension-side back pressure chamber Ce. Thus, the extension-side spool Se presses the extension-side leaf valve Ve by means of the pressure within the extension-side back pressure chamber Ce and the biasing by the spring member 16 so that the extension-side leaf valve Ve can be quickly seated on the extension-side valve seat 2*d* to close the extension-side passage 3. The extension-side pressure introduction passage Ie also introduces liquid from the extension-side chamber R1 to the contraction-side back pressure chamber Cp with hardly any resistance. Therefore, when the shock absorber D1 switches from the contraction operation to the extension operation, the pressure within the extension-side chamber R1 is quickly introduced into the contraction-side back pressure chamber Cp. Thus, the contraction-side spool Sp presses the contraction-side leaf valve Vp by means of the pressure within the contraction-side back pressure chamber Cp and the biasing by the spring member 20 so that the contraction-side leaf valve Vp can be quickly seated on the contraction-side valve seat 2*c* to close the contraction-side passage 4. In this way, in the shock absorber D1, even in a situation in which the extension/contraction speed is high and the switching between the extension/contraction operations occurs instantaneously, a desired damping force can be exerted from the beginning of the switch in the extension/contraction direction without any delays in closing the extension-side leaf valve Ve and the contraction-side leaf valve Vp.

Gaps may form between the annular plate 19 and the contraction-side chamber 11 and between the annular plate 15 and the extension-side chamber 12 due to deterioration over time of the valve body (annular plate 19) of the extension-side check valve Te and the valve body (annular plate 15) of the contraction-side check valve Tp, and this may lead to changes in the flow amount passing through the extension-side pressure introduction passage Ie and the contraction-side pressure introduction passage Ip. Since the extension-side resistance element and the contraction-side resistance element are provided on the downstream side of the extension-side pressure introduction passage Ie and the contraction-side back pressure chamber Cp and on the downstream side of the contraction-side pressure introduction passage Ip and the extension-side back pressure chamber Ce, such changes in the flow amount do not affect the damping force control or the valve-closing operation during switching between extension/contraction.

On the outer peripheral side of the piston rod 7, the piston 2, the extension-side leaf valve Ve, the contraction-side leaf valve Vp, the cylindrical extension-side chamber 12, and the cylindrical contraction-side chamber 11 are mounted. The piston 2 includes the extension-side passage 3 and the contraction-side passage 4, and the extension-side leaf valve Ve and the contraction-side leaf valve Vp are laminated on the piston 2. The extension-side chamber 12 forms the extension-side back pressure chamber Ce, and the extension-side spool Se is slidingly inserted into the inner periphery of the extension-side chamber 12. The contraction-side chamber 11 forms the contraction-side back pressure chamber Cp, and the contraction-side spool Sp is slidingly inserted into the inner periphery of the contraction-side chamber 11. The contraction-side pressure introduction passage Ip is provided to the extension-side chamber 12, and the extension-side pressure introduction passage Ie is provided to the contraction-side chamber 11, and thus the members required to adjust the damping force can be disposed in a concentrated manner in the piston part of the shock absorber D1.

The extension-side leaf valve Ve of the extension-side spool Se and the valve body (annular plate 15) of the contraction-side check valve Tp that opens/closes the contraction-side pressure introduction passage Ip are biased by the single spring member 16. The contraction-side leaf valve Vp of the contraction-side spool Sp and the valve body (annular plate 19) of the extension-side check valve Te that opens/closes the extension-side pressure introduction passage Ie are biased by the single spring member 20. Therefore, the check valves Te, Tp and the spools Se, Sp can be restored to the return side with the single spring members 16, 20, and thus the number of parts can be reduced.

In the shock absorber D1, the retaining shaft 8*a*, the vertical hole 8*d*, the extension-side pilot orifice Pe serving as the extension-side resistance element, the contraction-side pilot orifice Pp serving as the contraction-side resistance element, the accommodation part L, the adjustment passage Pc, and the contraction-side discharge passage Ep are provided to the piston rod 7. The retaining shaft 8*a* is provided on the distal end of the piston rod 7, and the piston 2, the extension-side leaf valve Ve, the contraction-side leaf valve Vp, the extension-side chamber 12, and the contraction-side chamber 11 are mounted on the outer periphery of the retaining shaft 8*a*. The vertical hole 8*d* opens from the distal end of the retaining shaft 8*a*. The extension-side pilot orifice Pe and the contraction-side pilot orifice Pp are provided to the retaining shaft 8*a*, and communicate with the communication passage 24 provided in the vertical hole 8*d*. The accommodation part L is provided on the inside of the piston rod 7 so as to communicate with the vertical hole 8*d*, and the solenoid pressure control valve 6 is accommodated in the accommodation part L. The adjustment passage Pc allows the communication passage 24 to communicate with the accommodation part L. The contraction-side discharge passage Ep allows the accommodation part L to communicate with the extension-side chamber R1. The shock absorber D1 includes the separator 23 that is inserted into the vertical hole 8*d*. The separator 23 forms, by the annular groove 23*a* provided on the outer periphery thereof, the communication passage 24 that allows the extension-side back pressure chamber Ce to communicate with the contraction-side back pressure chamber Cp within the vertical hole 8*d*. The separator 23 also forms the extension-side discharge passage Ee on the inner periphery thereof. Therefore, the solenoid pressure control valve 6 can be accommodated within the piston rod 7 without any trouble, and the extension-side back pressure chamber Ce and the contraction-side back pressure chamber Cp can be provided on the outer periphery of the piston rod 7 shifted in the axial direction from the solenoid pressure control valve 6.

The solenoid pressure control valve 6 is set so as to close the adjustment passage Pc when not energized, and to perform pressure control when energized. The shock absorber D1 includes the fail valve FV provided in the adjustment passage Pc. The fail valve FV bypasses the solenoid pressure control valve 6. The valve-opening pressure of the fail valve FV is greater than the maximum control pressure of the solenoid pressure control valve 6. Thus, during a failure, the extension-side load and the contraction-side load reach a maximum, and the shock absorber D1 exerts the greatest damping force. Therefore, the vehicle body posture can be stabilized even during a failure.

When the solenoid pressure control valve 6 enters the blocked position, the small-diameter part 31*a* of the valve body 31 of the solenoid valve opposes the through hole 30*c* to block the through hole 30*c*, and thereby the solenoid pressure control valve 6 is closed. The solenoid pressure control valve 6 can also be made to function as a throttle valve by not completely blocking the through hole 30*c* and configuring the recess 31*c* so as to partially oppose the through hole 30*c* in the blocked position or the like. Thereby, the characteristic of a throttle valve achieved by the solenoid pressure control valve 6 when in the blocked position can be added to the damping characteristics, particularly the damping characteristics in a region in which the piston speed is low, of the shock absorber D1 during a failure. Thus, the riding comfort in the vehicle can be improved even during a failure.

The solenoid pressure control valve 6 includes: the cylindrical valve seat member 30; the small-diameter part 31*a*; the large-diameter part 31*b*; the recess 31*c* provided between the small-diameter part 31*a* and the large-diameter part 31*b*; and the valve body 31 of the solenoid valve. The valve seat member 30 includes the valve accommodation tube 30*a* that forms a portion of the adjustment passage Pc, and the annular valve seat 30*d* provided on the end of the valve accommodation tube 30*a*. The valve accommodation tube 30*a* has the through hole 30*c* that allows the inside to communicate with outside of the valve accommodation tube 30*a*. The small-diameter part 31*a* is slidingly inserted into the valve accommodation tube 30*a*. The recess 31*c* can oppose the through hole 30*c*. The valve body 31 of the solenoid valve makes the end of the large-diameter part 31*b* separate from and sit on the valve seat 30*d* of the control valve. The solenoid pressure control valve blocks the adjustment passage Pc by making the small-diameter part 31*a* oppose the through hole 30*c*. Thus, the pressure-receiving area on which pressure in a direction in which the valve body 31 of the solenoid valve escapes from the valve seat member 30 acts is an area obtained by subtracting the area of a circle whose diameter is equal to the outer diameter of the small-diameter part 31*a* from the area of a circle whose diameter is equal to the inner diameter of the valve seat 30*d* of the control valve. Therefore, the pressure-receiving area can be greatly decreased, and the flow passage area during valve opening can be increased. Accordingly, the necessary solenoid thrust is small and the amount of movement of the valve body 31 of the solenoid valve is also reduced, and thus the movement of the valve body 31 of the solenoid valve is stable. Further, in the blocked position, the outer periphery of the small-diameter part 31*a* opposes the through hole 30*c* so that the through hole 30*c* is blocked. Therefore, the solenoid pressure control valve 6 remains closed even upon receiving pressure from the upstream side, and thus it is possible to activate only the fail valve FV.

The above-described constitution of the biasing part is just one example, and the constitution of the biasing part is not limited to that in the present embodiment. In the above, the present invention was explained using an example in which the present embodiment was realized for both the damping valve on the extension-side and the damping valve on the contraction-side. However, the present embodiment can also be applied to only either one of the damping valve on the extension-side or the damping valve on the contraction-side of the shock absorber. Although not illustrated, the present embodiment can also be applied to a damping valve provided to a base valve instead of a damping valve provided to the piston part of a shock absorber.

Second Embodiment

Figure 5:
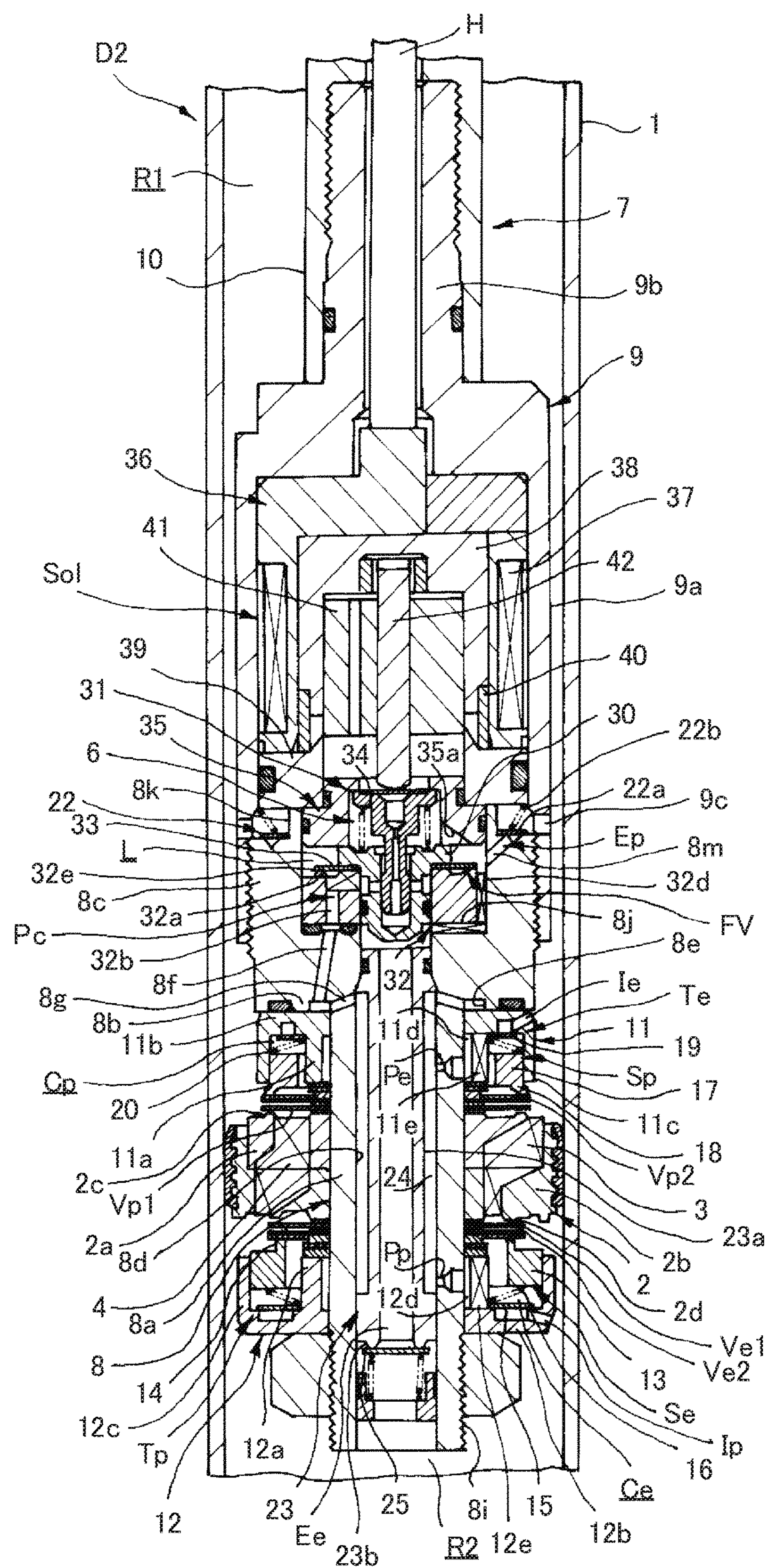
FIG. 5 is a cross-section view of a shock absorber using a damping valve according to a second embodiment of the present invention.
Figure 6:
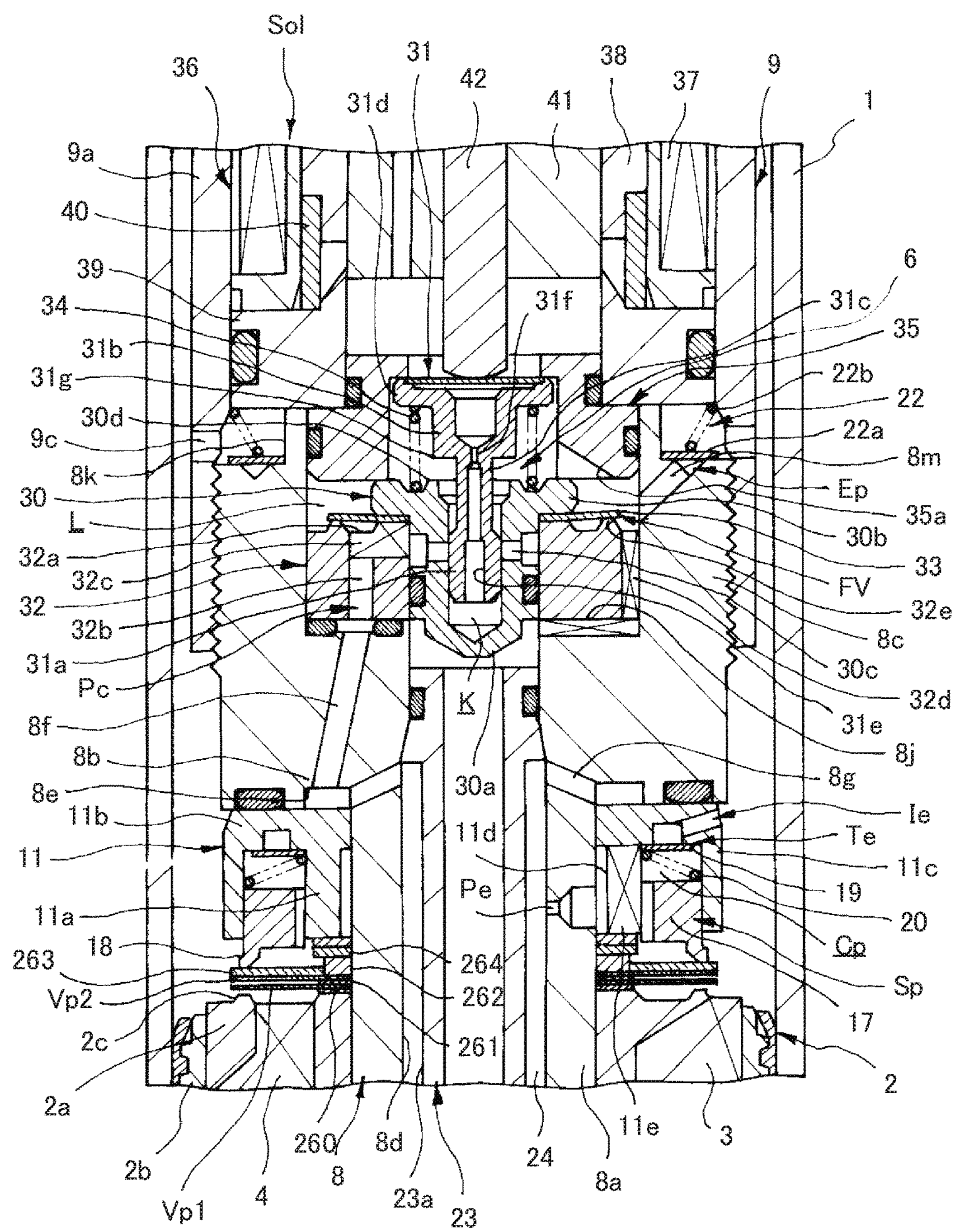
FIG. 6 is a partially enlarged cross-section view of the shock absorber using the damping valve according to the second embodiment of the present invention.

As shown in FIG. 5, a damping valve according to a second embodiment is utilized as both an extension-side damping valve and a contraction-side damping valve of a shock absorber D2. The damping valve includes the following: a piston 2 serving as a valve disc; an extension-side first leaf valve Ve1 serving as an annular first leaf valve; a contraction-side first leaf valve Vp1 serving as an annular first leaf valve; an extension-side second leaf valve Ve2 serving as an annular second leaf valve; a contraction-side first second valve Vp2 serving as an annular second leaf valve; and a biasing part that exerts a variable biasing force on the extension-side second leaf valve Ve2 toward the piston 2 side and exerts a variable biasing force on the contraction-side second leaf valve Vp2 toward the piston 2 side. The piston 2 includes an extension-side passage 3 and a contraction-side passage 4 which serve as a passage, and an annular extension-side valve seat 2*d* and an annular contraction-side valve seat 2*c* that respectively surround the outlet ends of the extension-side passage 3 and the contraction-side passage 4. The extension-side first leaf valve Ve1 and the contraction-side first leaf valve Vp1 are laminated on the piston 2. An extension-side first gap serving as a first gap is provided between the extension-side first leaf valve Ve1 and the extension-side valve seat 2*d*. A contraction-side first gap serving as a first gap is provided between the contraction-side first leaf valve Vp1 and the contraction-side valve seat 2*c*. The extension-side second leaf valve Ve2 is laminated on the counter-valve disc side (counter-piston 2 side) of the extension-side first leaf valve Ve1. An extension-side second gap serving as a second gap is provided between the extension-side second leaf valve Ve2 and the extension-side first leaf valve Ve1. The contraction-side second leaf valve Vp2 is laminated on the counter-valve disc side (counter-piston 2 side) of the contraction-side first leaf valve Vp1. A contraction-side second gap serving as a second gap is provided between the contraction-side second leaf valve Vp2 and the contraction-side first leaf valve Vp1. The damping valve of the present embodiment obviously may be applied to only the extension-side damping valve or to only the contraction-side damping valve of the shock absorber D2.

Meanwhile, the shock absorber D2 includes the following: a cylinder 1; the above-described damping valve; an extension-side chamber R1 and a contraction-side chamber R2 that are partitioned within the cylinder 1 by the piston 2; and a piston rod 7. When the piston 2 moves in the axial direction (the up-down direction in FIG. 5) relative to the cylinder 1, the shock absorber D2 applies resistance with the extension-side first leaf valve Ve1 to the flow of liquid passing through the extension-side passage 3, and applies resistance with the contraction-side first leaf valve Vp1 to the flow of liquid passing through the contraction-side passage 4, and thereby exerts a damping force.

Although not illustrated, a free piston is provided at the bottom in FIG. 5 of the cylinder 1 similar to the first embodiment. A gas chamber is formed within the cylinder 1 by the free piston. A seal (not illustrated) is provided between the piston rod 7 and the cylinder 1, and the inside of the cylinder 1 is in a liquid-tight state due to this seal. As illustrated, the shock absorber D2 is set to a so-called single-rod type. The volume of the piston rod 7 that moves into/out of the cylinder 1 according to the extension/contraction of the shock absorber D2 is compensated by means of the volume of the gas within the gas chamber expanding or contracting and the free piston moving through the inside of the cylinder 1 in the up-down direction. In this way, the shock absorber D2 is set to a single-cylinder type. However, instead of installing the free piston and the gas chamber, a reservoir may be provided on the outer periphery or outside of the cylinder 1 and volume compensation of the piston rod 7 may be performed by this reservoir.

In this embodiment, the biasing part of the damping valve includes the following: an extension-side spool Se that biases the extension-side second leaf valve Ve2; an extension-side back pressure chamber Ce that presses the extension-side spool Se with internal pressure; a contraction-side spool Sp that biases the contraction-side second leaf valve Vp2; a contraction-side back pressure chamber Cp that presses the contraction-side spool Sp with internal pressure; a communication passage 24 that communicates with the extension-side back pressure chamber Ce via a contraction-side pilot orifice Pp serving as a contraction-side resistance element, and that communicates with the contraction-side back pressure chamber Cp via an extension-side pilot orifice Pe serving as an extension-side resistance element; an extension-side pressure introduction passage Ie that permits only the flow of liquid from the extension-side chamber R1 toward the contraction-side back pressure chamber Cp; a contraction-side pressure introduction passage Ip that permits only the flow of liquid from the contraction-side chamber R2 toward the extension-side back pressure chamber Ce; an adjustment passage Pc that is connected to the communication passage 24; a contraction-side discharge passage Ep that allows the downstream of the adjustment passage Pc to communicate with the extension-side chamber R1, and that permits only the flow of liquid from the adjustment passage Pc toward the extension-side chamber R1; an extension-side discharge passage Ee that allows the downstream of the adjustment passage Pc to communicate with the contraction-side chamber R2, and that permits only the flow of liquid from the adjustment passage Pc toward the contraction-side chamber R2; and a solenoid pressure control valve 6 provided in the adjustment passage Pc. The contraction-side pilot orifice Pp applies resistance to the flow of liquid passing through the contraction-side pilot orifice Pp. The extension-side pilot orifice Pe applies resistance to the flow of liquid passing through the extension-side pilot orifice Pe. The solenoid pressure control valve 6 controls the upstream pressure of the adjustment passage Pc.

The damping valve and the shock absorber D2 will now be explained in detail. Those constitutions which are the same as in the first embodiment will be assigned the same reference numeral, and explanations thereof will be omitted.

Figure 7:
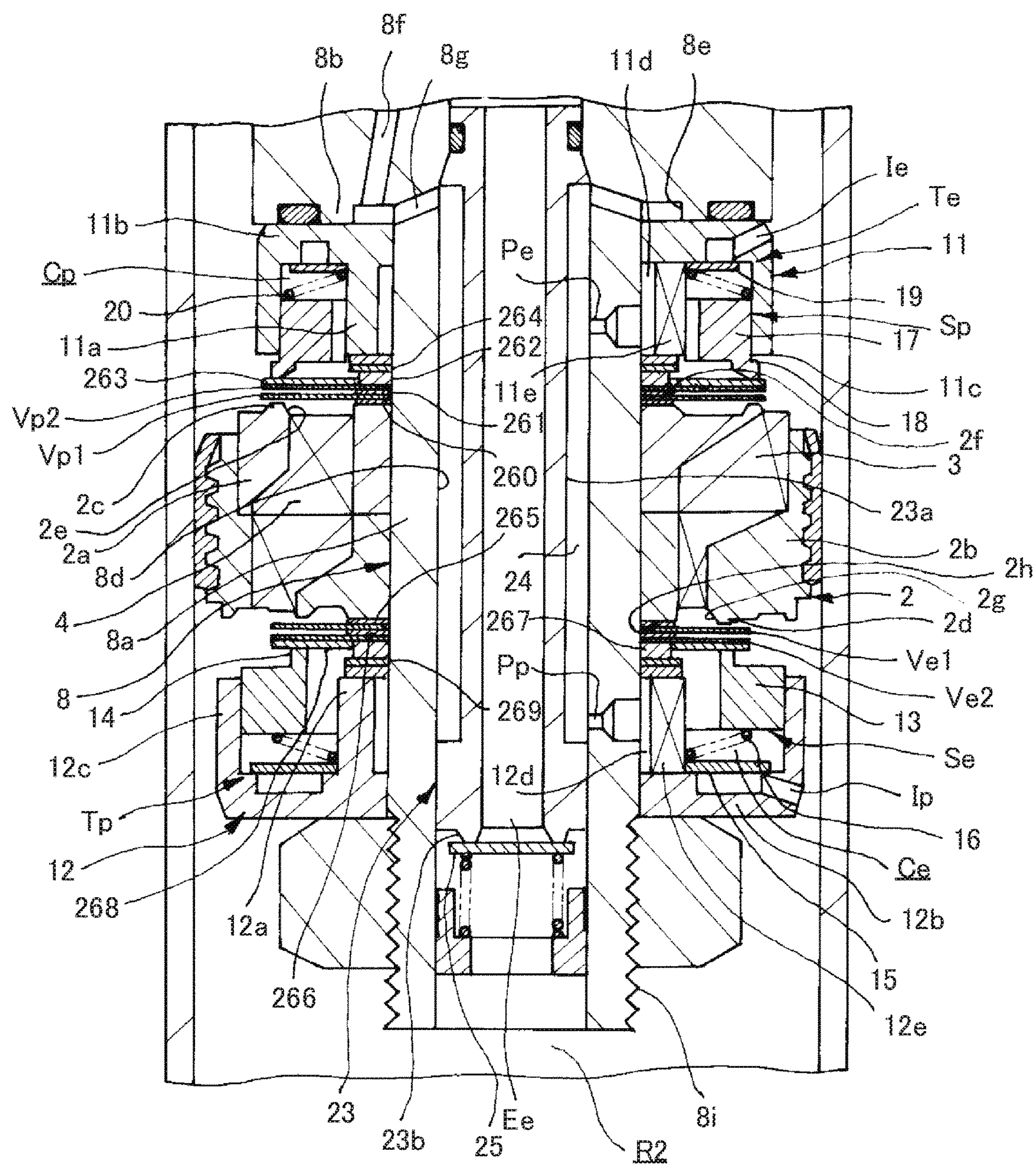
FIG. 7 is an enlarged cross-section view of the damping valve according to the second embodiment of the present invention.

As shown in FIG. 7, the annular piston 2 is assembled onto the outer periphery of the retaining shaft 8*a* provided to the piston retaining member 8. The following are assembled onto the outer periphery of the retaining shaft 8*a* above the piston 2 in FIG. 7: a contraction-side first annular spacer 260 serving as a first annular spacer; the contraction-side first leaf valve Vp1; a contraction-side second annular spacer 261 serving as a second annular spacer; the contraction-side second leaf valve Vp2; a contraction-side spacer 262 serving as a spacer; a contraction-side annular plate 263 serving as an annular plate; a contraction-side plate stopper 264; the contraction-side spool Sp; and a contraction-side chamber 11. The contraction-side chamber 11 forms the contraction-side back pressure chamber Cp. The following are assembled onto the outer periphery of the retaining shaft 8*a* under the piston 2 in FIG. 7: an extension-side first annular spacer 265 serving as a first annular spacer; the extension-side first leaf valve Ve1; an extension-side second annular spacer 266 serving as a second annular spacer; the extension-side second leaf valve Ve2; an extension-side spacer 267 serving as a spacer; an extension-side annular plate 268 serving as an annular plate; an extension-side plate stopper 269; the extension-side spool Se; and an extension-side chamber 12. The extension-side chamber 12 forms the extension-side back pressure chamber Ce.

As shown in FIG. 7, the extension-side first leaf valve Ve1 is formed in an annular shape so as to permit the insertion of the retaining shaft 8*a* of the piston retaining member 8. The inner periphery of the extension-side first leaf valve Ve1 is sandwiched by the piston 2 and the extension-side chamber 12, and due to this sandwiching, the extension-side first leaf valve Ve1 is fixed to the retaining shaft 8*a* of the piston retaining member 8. Deflection of the outer periphery of the extension-side first leaf valve Ve1 is permitted. In more detail, the extension-side second annular spacer 266, which has an outer diameter than is smaller than the outer diameter of the extension-side first leaf valve Ve, is interposed on the back surface side of the extension-side first leaf valve Ve1. Deflection of the extension-side first leaf valve Ve1 toward the bottom side in FIG. 7 is permitted more toward the outer periphery side from an area that is supported by the extension-side second annular spacer 266. Deflection of the extension-side first leaf valve Ve1 toward the top side in FIG. 7 is permitted more toward an outer periphery side from an area that is supported by the extension-side first annular spacer 265.

The extension-side second leaf valve Ve2 is laminated on the extension-side second annular spacer 266 on the opposite side of the valve disc (the bottom side in FIG. 7). Similar to the extension-side first leaf valve Ve1, the inner periphery of the extension-side second leaf valve Ve2 is sandwiched by the piston 2 and the extension-side chamber 12, and due to this sandwiching, the extension-side second leaf valve Ve2 is fixed to the retaining shaft 8*a* of the piston retaining member 8. Deflection of the outer periphery of the extension-side second leaf valve Ve2 is permitted. The extension-side second leaf valve Ve2 is directly sandwiched by the extension-side second annular spacer 266, which has an outer diameter that is smaller than the outer diameter of the extension-side second leaf valve Ve2, and the extension-side spacer 267. Deflection of the extension-side second leaf valve Ve2 is permitted more toward the outer periphery side from the area that is supported by the extension-side second annular spacer 266 and the extension-side spacer 267.

The extension-side first leaf valve Ve1 is laminated on the bottom in FIG. 7 of the piston 2 via the extension-side first annular spacer 265, which is laminated on the inner peripheral seat part 2*h* of the piston 2. In a state in which a load is not acting on the extension-side first leaf valve Ve1, the extension-side first gap is formed between the extension-side first leaf valve Ve1 and the extension-side valve seat 2*d*. The length of the extension-side first gap in the up-down direction in FIG. 7 can be adjusted by exchanging for an extension-side first annular spacer 265 of a different thickness or by changing the number of extension-side first annular spacers 265 that are laminated. The extension-side first gap between the extension-side first leaf valve Ve1 and the extension-side valve seat 2*d* can be formed without using the extension-side first annular spacer 265 by setting the height of the inner peripheral seat part 2*h* to be greater than the height of the extension-side valve seat 2*d* and directly laminating the extension-side first leaf valve Ve1 onto the inner peripheral seat part 2*h*. However, by providing the extension-side first annular spacer 265 to the inner peripheral seat part 2*h*, the above-mentioned length of the extension-side first gap can be easily adjusted.

Further, the extension-side second leaf valve Ve2 is laminated on the bottom in FIG. 7 of the extension-side first leaf valve Ve1 via the extension-side second annular spacer 266. In a state in which a load is not acting on the extension-side second leaf valve Ve2, the extension-side second gap is formed between the extension-side second leaf valve Ve2 and the extension-side first leaf valve Ve1. The length of the extension-side second gap in the up-down direction in FIG. 7 can be adjusted by exchanging for an extension-side second annular spacer 266 of a different thickness or by changing the number of extension-side second annular spacers 266 that are laminated. By providing the extension-side second annular spacer 266, the above-mentioned length of the extension-side second gap can be easily adjusted.

The extension-side annular plate 268 is slidably mounted on the outer periphery of the extension-side spacer 267. The axial direction length of the extension-side annular plate 268 is shorter than the axial direction length of the extension-side spacer 267. Thus, the extension-side annular plate 268 can move in the up-down direction while slidingly contacting the outer periphery of the extension-side spacer 267. Further, the annular extension-side plate stopper 269 is provided to the bottom in FIG. 7 of the extension-side spacer 267. The outer diameter of the extension-side plate stopper 269 is set to be greater than the inner diameter of the extension-side annular plate 268. The extension-side chamber 12 is laminated on the bottom of the extension-side plate stopper 269. The inner diameter of the extension-side annular plate 268 is set to be smaller than the outer diameter of the inner peripheral seat part 2*h* provided to the piston 2. The outer diameter of the extension-side annular plate 268 is set to be greater than the inner diameter of the extension-side valve seat 2*d*. The extension-side annular plate 268 is configured such that it can move in the axial direction (the up-down direction in FIG. 7) between the extension-side second annular spacer 266 and the extension-side plate stopper 269.

The extension-side annular plate 268 has a higher deflection rigidity than that of the extension-side second leaf valve Ve2. In the present embodiment, by setting the axial direction length (thickness) of the extension-side annular plate 268 to be greater than the axial direction length (thickness) of the extension-side second leaf valve Ve2, the rigidity of the extension-side annular plate 268 can be increased to be greater than the rigidity of the extension-side second leaf valve Ve2. Not only can the rigidity be strengthened by the thickness, but the rigidity of the extension-side annular plate 268 can also be increased by forming the extension-side annular plate 268 with a material having a higher rigidity than that of the extension-side second leaf valve Ve2.

When the extension-side annular plate 268 is compressed from the back surface side (opposite side of the piston 2) by the biasing part, specifically by the pressure within the extension-side back pressure chamber Ce and the extension-side spool Se, the extension-side annular plate 268 pushes up the extension-side second leaf valve Ve2 and deflects together with the extension-side second leaf valve Ve2. The extension-side second leaf valve Ve2 deflects as described above when a biasing force generated by the biasing part is loaded onto the extension-side second leaf valve Ve2 from the back surface side via the extension-side annular plate 268. If this biasing force increases and the outer periphery displaces by an amount equal to or greater than the extension-side second gap, the extension-side second leaf valve Ve2 abuts the extension-side first leaf valve Ve1. When the extension-side second leaf valve Ve2 compresses the extension-side first leaf valve Ve1, the extension-side first leaf valve Ve1 deflects. If the displacement of the outer periphery of the extension-side first leaf valve Ve1 caused by the deflection becomes equal to or greater than the extension-side first gap, the extension-side first leaf valve Ve1 sits on the extension-side valve seat 2*d* and closes the extension-side passage 3.

When the extension-side first leaf valve Ve1 deflects to the point at which it sits on the extension-side valve seat 2*d*, the extension-side annular plate 268 enters a state in which it is supported by the inner peripheral seat part 2*h* and the extension-side valve seat 2*d*. In this state, the biasing force generated by the pressure within the extension-side back pressure chamber Ce and the extension-side spool Se is received by the extension-side annular plate 268. Thus, any further deformation of the extension-side first leaf valve Ve1 and the extension-side second leaf valve Ve2 is suppressed, and an excessive load is prevented from being applied to the extension-side first leaf valve Ve1 and the extension-side second leaf valve Ve2. Further, the extension-side annular plate 268 is slidably mounted on the extension-side spacer 267. Therefore, when the extension-side first leaf valve Ve1 and the extension-side second leaf valve Ve2 deflect in a direction away from the extension-side valve seat 2*d*, the extension-side annular plate 268 moves downward in FIG. 7 relative to the extension-side spacer 267. Thus, the deflection of the extension-side first leaf valve Ve1 and the extension-side second leaf valve Ve2 in the direction away from the piston 2 is not obstructed by the extension-side annular plate 268.

The extension-side chamber 12 includes: an annular mounting part 12*a* that is fitted onto the outer periphery of the retaining shaft 8*a* of the piston retaining member 8; a flange 12*b* that is provided on the outer periphery at the bottom end in FIG. 7 of the mounting part 12*a*; a sliding contact tube 12*c* that extends from the outer periphery of the flange 12*b* toward the piston 2 side; an annular groove 12*d* provided on the inner periphery of the mounting part 12*a*; and a notch 12*e* that communicates with the annular groove 12*d* from the outer periphery of the mounting part 12*a*. In a state in which the extension-side chamber 12 is assembled onto the retaining shaft 8*a*, the annular groove 12*d* opposes the contraction-side pilot orifice Pp provided to the retaining shaft 8*a*. The extension-side plate stopper 269 is interposed between the mounting part 12*a* of the extension-side chamber 12 and the extension-side spacer 267. The extension-side plate stopper 269 may be eliminated and the lower limit of movement of the extension-side annular plate 268 may be restricted with the mounting part 12*a*. There are cases in which it is necessary to adjust the position of the extension-side chamber 12 so that it opposes the contraction-side pilot orifice Pp and the annular groove 12*d* when assembling the extension-side chamber 12 onto the retaining shaft 8*a* of the piston retaining member 8, and in such cases, the extension-side plate stopper 269 is preferably provided between the mounting part 12*a* and the extension-side spacer 267. The position of the extension-side chamber 12 relative to the piston retaining member 8 can be adjusted by the extension-side plate stopper 269.

The extension-side spool Se is accommodated within the sliding contact tube 12*c*. The outer periphery of the extension-side spool Se slidingly contacts the inner periphery of the sliding contact tube 12*c*, and the extension-side spool Se is configured such that it can move in the axial direction within the sliding contact tube 12*c*. The extension-side spool Se has an annular spool main body 13, and an annular projection 14 that rises up from the inner periphery at the top end in FIG. 3 of the spool main body 13. The inner diameter of the annular projection 14 is set to be smaller than the outer diameter of the extension-side annular plate 268, and the annular projection 14 is configured such that it can abut the back surface (bottom surface in FIG. 7) of the extension-side annular plate 268.

When the extension-side spool Se is assembled to the extension-side chamber 12 and the extension-side chamber 12 is assembled onto the retaining shaft 8*a*, the extension-side back pressure chamber Ce is formed on the back surface side (the bottom side in FIG. 7) of the extension-side second leaf valve Ve2. The inner diameter of the spool main body 13 is greater than the outer diameter of the mounting part 12*a*. The inner diameter of the spool main body 13 can be set so that the inner periphery of the spool main body 13 slidingly contacts the outer periphery of the mounting part 12*a*, and the extension-side back pressure chamber Ce can be sealed by the extension-side spool Se.

The annular groove 12*d* is provided on the inner periphery of the mounting part 12*a* of the extension-side chamber 12. The mounting part 12*a* includes the notch 12*e* that communicates with the annular groove 12*d* from the outer periphery of the mounting part 12*a*. In a state in which the extension-side chamber 12 is assembled onto the retaining shaft 8*a*, the annular groove 12*d* opposes the contraction-side pilot orifice Pp provided to the retaining shaft 8*a*, and the extension-side back pressure chamber Ce communicates with the contraction-side pilot orifice Pp.

Further, the contraction-side pressure introduction passage Ip that opens from the outer periphery of the flange 12*b* is provided to the extension-side chamber 12. The contraction-side chamber R2 communicates with the inside of the extension-side back pressure chamber Ce via the contraction-side pressure introduction passage Ip. An annular plate 15 is laminated on the top end in FIG. 7 of the flange 12*b* of the extension-side chamber 12. A spring member 16 is interposed between the annular plate 15 and the spool main body 13 of the extension-side spool Se. The annular plate 15 is pressed toward the flange 12*b* by the spring member 16 so that the contraction-side pressure introduction passage Ip is closed. The contraction-side pressure introduction passage Ip is configured so as to not generate any resistance against the flow of passing liquid.

If the shock absorber D2 contracts so that the contraction-side chamber R2 is compressed and the pressure therein increases, the annular plate 15 is pressed by this pressure so that it separates from the flange 12*b*, and thereby the contraction-side pressure introduction passage Ip is opened. During extension of the shock absorber D2 in which the pressure within the extension-side back pressure chamber Ce increases higher than that of the contraction-side chamber R2, the annular plate 15 is pressed to the flange 12*b* so as to close the contraction-side pressure introduction passage Ip. In other words, the annular plate 15 functions as a valve body of a contraction-side check valve Tp that permits only the flow of liquid from the contraction-side chamber R2. By this contraction-side check valve Tp, the contraction-side pressure introduction passage Ip is set to a one-way passage that permits only the flow of liquid from the contraction-side chamber R2 toward the extension-side back pressure chamber Ce.

The spring member 16 functions to press the annular plate 15 to the flange 12*b*. In other words, the spring member 16 constitutes the contraction-side check valve Tp together with the valve body (the annular plate 15) of the check valve. The spring member 16 also functions to bias the extension-side spool Se toward the extension-side second leaf valve Ve2. When the extension-side second leaf valve Ve2 deflects so that the extension-side spool Se is pushed down in the direction away from the piston 2 (downwards in FIG. 7) and then the deflection of the extension-side second leaf valve Ve2 subsequently terminates, the extension-side spool Se is still biased by the spring member 16, and thus the extension-side spool Se can quickly return to its original position (the position shown in FIG. 7) following the extension-side second leaf valve Ve2. It is also possible to bias the extension-side spool Se with a different spring member from the spring member 16. Using the same spring member for the spring member that constitutes the contraction-side check valve Tp and the spring member that biases the extension-side spool Se is advantageous because the number of parts can be reduced and the structure can be simplified. The outer diameter of the extension-side spool Se is set to be greater than the inner diameter of the annular projection 14, and the annular projection 14 is configured to abut the extension-side annular plate 268. The extension-side spool Se is constantly biased toward the extension-side second leaf valve Ve2 by the pressure of the extension-side back pressure chamber Ce.

As shown in FIG. 7, similar to the extension-side first leaf valve Ve1, the contraction-side first leaf valve Vp1 that is laminated on top of the piston 2 is formed in an annular shape so as to permit the insertion of the retaining shaft 8*a* of the piston retaining member 8. The inner periphery of the contraction-side first leaf valve Vp1 is sandwiched by the piston 2 and the contraction-side chamber 11, and due to this sandwiching, the contraction-side first leaf valve Vp1 is fixed to the retaining shaft 8*a* of the piston retaining member 8. Deflection of the outer periphery of the contraction-side first leaf valve Vp1 is permitted. In more detail, the contraction-side second annular spacer 261, which has an outer diameter that is larger than the outer diameter of the contraction-side first leaf valve Vp1, is interposed on the back surface side of the contraction-side first leaf valve Vp1. Deflection of the contraction-side first leaf valve Vp1 toward the top side in FIG. 7 is permitted more toward the outer periphery side from an area that is supported by the contraction-side second annular spacer 261. Deflection of the contraction-side first leaf valve Vp1 toward the bottom side in FIG. 7 is permitted more toward an outer periphery side from an area that is supported by the contraction-side first annular spacer 260.

The contraction-side second leaf valve Vp2 is laminated on the contraction-side second annular spacer 261 on the opposite side of the valve disc (the top side in FIG. 7). Similar to the contraction-side first leaf valve Vp1, the inner periphery of the contraction-side second leaf valve Vp2 is sandwiched by the piston 2 and the contraction-side chamber 11, and due to this sandwiching, the contraction-side second leaf valve Vp2 is fixed to the retaining shaft 8*a* of the piston retaining member 8. Deflection of the outer periphery of the contraction-side second leaf valve Vp2 is permitted. The contraction-side second leaf valve Vp2 is directly sandwiched by the contraction-side second annular spacer 261 and the contraction-side spacer 262. The contraction-side second annular spacer 261 and the contraction-side spacer 262 have outer diameters that are smaller than the outer diameter of the contraction-side second leaf valve Vp2. Deflection of the contraction-side second leaf valve Vp2 is permitted more toward the outer periphery side from the area that is supported by the contraction-side second annular spacer 261 and the contraction-side spacer 262.

The contraction-side first leaf valve Vp1 is laminated on the top in FIG. 7 of the piston 2 via the contraction-side first annular spacer 260, which is laminated on the inner peripheral seat part 2*f* of the piston 2. In a state in which a load is not acting on the contraction-side first leaf valve Vp1, a contraction-side first gap is formed between the contraction-side first leaf valve Vp1 and the contraction-side valve seat 2*c*. The length of this gap in the up-down direction in FIG. 7 can be adjusted by exchanging for a contraction-side first annular spacer 260 of a different thickness or by changing the number of contraction-side first annular spacers 260 that are laminated. The contraction-side first gap between the contraction-side first leaf valve Vp1 and the contraction-side valve seat 2*c* can be formed without using the contraction-side first annular spacer 260 by setting the height of the inner peripheral seat part 2*f* to be greater than the height of the contraction-side valve seat 2*c* and directly laminating the contraction-side first leaf valve Vp1 onto the inner peripheral seat part 2*f*. However, by providing the contraction-side first annular spacer 260 to the inner peripheral seat part 2*f*, the above-mentioned length of the contraction-side first gap can be easily adjusted.

Further, the contraction-side second leaf valve Vp2 is laminated on the top in FIG. 7 of the contraction-side first leaf valve Vp1 via the contraction-side second annular spacer 261. In a state in which a load is not acting on the contraction-side second leaf valve Vp2, the contraction-side second gap is formed between the contraction-side second leaf valve Vp2 and the contraction-side first leaf valve Vp1. The length of the contraction-side second gap in the up-down direction in FIG. 7 can be adjusted by exchanging for a contraction-side second annular spacer 261 of a different thickness or by changing the number of contraction-side second annular spacers 261 that are laminated. By providing the contraction-side second annular spacer 261, the above-mentioned length of the contraction-side second gap can be easily adjusted.

The contraction-side annular plate 263 is slidably mounted on the outer periphery of the contraction-side spacer 262. The axial direction length of the contraction-side annular plate 263 is shorter than the axial direction length of the contraction-side spacer 262. Thus, the contraction-side annular plate 263 can move in the up-down direction while slidingly contacting the outer periphery of the contraction-side spacer 262. Further, the annular contraction-side plate stopper 264 is provided to the top in FIG. 7 of the contraction-side spacer 262. The outer diameter of the contraction-side plate stopper 264 is set to be greater than the inner diameter of the contraction-side annular plate 263. The contraction-side chamber 11 is laminated on the top of the contraction-side plate stopper 264. The inner diameter of the contraction-side annular plate 263 is set to be smaller than the outer diameter of the inner peripheral seat part 2*f* provided to the piston 2. The outer diameter of the contraction-side annular plate 263 is set to be greater than the inner diameter of the contraction-side valve seat 2*c*. The contraction-side annular plate 263 is configured such that it can move in the axial direction (the up-down direction in FIG. 7) between the contraction-side annular spacer 261 and the extension-side plate stopper 264.

The contraction-side annular plate 263 has a higher deflection rigidity than that of the contraction-side second leaf valve Vp2. In the present embodiment, by setting the axial direction length (thickness) of the contraction-side annular plate 263 to be greater than the axial direction length (thickness) of the contraction-side second leaf valve Vp2, the rigidity of the contraction-side annular plate 263 can be increased to be greater than the rigidity of the contraction-side second leaf valve Vp2. Not only can the rigidity be strengthened by the thickness, but the rigidity of the contraction-side annular plate 263 can also be increased by forming the contraction-side annular plate 263 with a material having a higher rigidity than that of the contraction-side second leaf valve Vp2.

When the contraction-side annular plate 263 is compressed from the back surface side (opposite side of the piston 2) by the biasing part, specifically by the pressure within the contraction-side back pressure chamber Cp and the contraction-side spool Sp, the contraction-side annular plate 263 pushes down the contraction-side second leaf valve Vp2 and deflects together with the contraction-side second leaf valve Vp2. The contraction-side second leaf valve Vp2 deflects as described above when a biasing force generated by the biasing part is loaded onto the contraction-side second leaf valve Vp2 from the back surface side via the contraction-side annular plate 263. If this biasing force increases and the outer periphery displaces by an amount equal to or greater the contraction-side second gap, the contraction-side second leaf valve Vp2 abuts the contraction-side first leaf valve Vp1. When the contraction-side second leaf valve Vp2 compresses the contraction-side first leaf valve Vp1, the contraction-side first leaf valve Vp1 deflects. If the displacement of the outer periphery of the contraction-side first leaf valve Vp1 caused by the deflection becomes equal to or greater than the contraction-side first gap, the contraction-side first leaf valve Vp1 sits on the contraction-side valve seat 2*c* and closes the contraction-side passage 4.

When the contraction-side first leaf valve Vp1 deflects to the point at which it sits on the contraction-side valve seat 2*c*, the contraction-side annular plate 263 enters a state in which it is supported by the inner peripheral seat part 2*f* and the contraction-side valve seat 2*c*. In this state, the biasing force generated by the pressure within the contraction-side back pressure chamber Cp and the contraction-side spool Sp is received by the contraction-side annular plate 263. Thus, any further deformation of the contraction-side first leaf valve Vp1 and the contraction-side second leaf valve Vp2 is suppressed, and an excessive load is prevented from being applied to the contraction-side first leaf valve Vp1 and the contraction-side second leaf valve Vp2. Further, the contraction-side annular plate 263 is slidably mounted on the contraction-side spacer 262. Therefore, when the contraction-side first leaf valve Vp1 and the contraction-side second leaf valve Vp2 deflect in a direction away from the contraction-side valve seat 2*c*, the contraction-side annular plate 263 moves upward in FIG. 7 relative to the contraction-side spacer 262. Thus, the deflection of the contraction-side first leaf valve Vp1 and the contraction-side second leaf valve Vp2 in the direction away from the piston 2 is not obstructed by the contraction-side annular plate 263.

The contraction-side chamber 11 includes: an annular mounting part 11*a* that is fitted onto the outer periphery of the retaining shaft 8*a* of the piston retaining member 8; a flange 11*b* that is provided on the outer periphery at the top end in FIG. 7 of the mounting part 11*a*; a sliding contact tube 11*c* that extends from the outer periphery of the flange 11*b* toward the piston 2 side; an annular groove 11*d* provided on the inner periphery of the mounting part 11*a*; and a notch 11*e* that communicates with the annular groove 11*d* from the outer periphery of the mounting part 11*a*. In a state in which the contraction-side chamber 11 is assembled onto the retaining shaft 8*a*, the annular groove 11*d* opposes the extension-side pilot orifice Pe provided to the retaining shaft 8*a*. The contraction-side plate stopper 264 is interposed between the mounting part 11*a* of the contraction-side chamber 11 and the contraction-side spacer 262. The contraction-side plate stopper 264 may be eliminated and the upper limit of movement of the contraction-side annular plate 263 may be restricted with the mounting part 11*a*. There are cases in which it is necessary to adjust the position of the contraction-side chamber 11 so that it opposes the extension-side pilot orifice Pe and the annular groove 11*d* when assembling the contraction-side chamber 11 onto the retaining shaft 8*a* of the piston retaining member 8, and in such cases, the contraction-side plate stopper 264 is preferably provided between the mounting part 11*a* and the contraction-side spacer 262. The position of the contraction-side chamber 11 relative to the piston retaining member 8 can be adjusted by the contraction-side plate stopper 264.

The contraction-side spool Sp is accommodated within the sliding contact tube 11*c*. The outer periphery of the contraction-side spool Sp slidingly contacts the inner periphery of the sliding contact tube 11*c*, and the contraction-side spool Sp is configured such that it can move in the axial direction within the sliding contact tube 11*c*. The contraction-side spool Sp has an annular spool main body 17, and an annular projection 18 that rises up from the outer periphery at the bottom end in FIG. 7 of the spool main body 17. The inner diameter of the annular projection 18 is set to be smaller than the outer diameter of the contraction-side annular plate 263, and the annular projection 18 is configured such that it can abut the back surface (top surface in FIG. 7) of the contraction-side annular plate 263.

When the contraction-side spool Sp is assembled to the contraction-side chamber 11 and the contraction-side chamber 11 is assembled onto the retaining shaft 8*a*, the contraction-side back pressure chamber Cp is formed on the back surface side (the top side in FIG. 7) of the contraction-side second leaf valve Vp2. The inner diameter of the spool main body 17 is greater than the outer diameter of the mounting part 11*a*. The inner diameter of the spool main body 17 can be set so that the inner periphery of the spool main body 17 slidingly contacts the outer periphery of the mounting part 11*a*, and the contraction-side back pressure chamber Cp can be sealed by the contraction-side spool Sp.

The annular groove 11*d* is provided on the inner periphery of the mounting part 11*a* of the contraction-side chamber 11. The mounting part 11*a* includes the notch 11*e* that communicates with the annular groove 11*d* from the outer periphery of the mounting part 11*a*. In a state in which the contraction-side chamber 11 is assembled onto the retaining shaft 8*a*, the annular groove 11*d* opposes the extension-side pilot orifice Pe provided to the retaining shaft 8*a*, and the contraction-side back pressure chamber Cp communicates with the extension-side pilot orifice Pe. By communicating with the extension-side pilot orifice Pe, the contraction-side back pressure chamber Cp is also in communication with the extension-side back pressure chamber Ce through the connection passage 24 formed within the vertical hole 8*d* of the retaining shaft 8*a* and the contraction-side pilot orifice Pp.

Further, the extension-side pressure introduction passage Ie that opens from the outer periphery of the flange 11*b* is provided to the contraction-side chamber 11. The extension-side chamber R1 communicates with the inside of the contraction-side back pressure chamber Cp via the extension-side pressure introduction passage Ie. An annular plate 19 is laminated on the bottom end in FIG. 7 of the flange 11*b* of the contraction-side chamber 11. A spring member 20 is interposed between the annular plate 19 and the spool main body 17 of the contraction-side spool Sp. The annular plate 19 is pressed toward the flange 11*b* by the spring member 20 so that the extension-side pressure introduction passage Ie is closed. The extension-side pressure introduction passage Ie is configured so as to not generate any resistance against the flow of passing liquid.

If the shock absorber D2 extends so that the extension-side chamber R1 is compressed and the pressure therein increases, the annular plate 19 is pressed by this pressure so that it separates from the flange 11*b*, and thereby the extension-side pressure introduction passage Ie is opened. During contraction of the shock absorber D2 in which the pressure within the contraction-side back pressure chamber Cp increases higher than that of the extension-side chamber R1, the annular plate 19 is pressed to the flange 11*b* so as to close the extension-side pressure introduction passage Ie. In other words, the annular plate 19 functions as a valve body of an extension-side check valve Te that permits only the flow of liquid from the extension-side chamber R1. By this extension-side check valve Te, the extension-side pressure introduction passage Ie is set to a one-way passage that permits only the flow of liquid from the extension-side chamber R1 toward the contraction-side back pressure chamber Cp.

As explained above, the connection passage 24 is in communication with the inside of the accommodation part L through the annular groove 8*e*, the port 8*f*, and the horizontal hole 8*g* provided to the piston retaining member 8. Thus, not only are the extension-side back pressure chamber Ce and the contraction-side back pressure chamber Cp in communication with each other via the extension-side pilot orifice Pe, the contraction-side pilot orifice Pp, and the communication passage 24, but the extension-side back pressure chamber Ce and the contraction-side back pressure chamber Cp are also in communication with the extension-side chamber R1 via the extension-side pressure introduction passage Ie, and in communication with the contraction-side chamber R2 via the contraction-side pressure introduction passage Ip, and are also in communication with the accommodation part L by means of the port 8*f* and the horizontal hole 8*g*.

The spring member 20 functions to press the annular plate 19 to the flange 11*b*. In other words, the spring member 20 constitutes the extension-side check valve Te together with the valve body (annular plate 19) of the check valve. The spring member 20 also functions to bias the contraction-side spool Sp toward the contraction-side second leaf valve Vp2. When the contraction-side second leaf valve Vp2 deflects so that the contraction-side spool Sp is pushed up in the direction away from the piston 2 (upwards in FIG. 7) and then the deflection of the contraction-side second leaf valve Vp2 subsequently terminates, the contraction-side spool Sp is still biased by the spring member 20, and thus the contraction-side spool Sp can quickly return to its original position (the position shown in FIG. 7) following the contraction-side second leaf valve Vp2. It is also possible to bias the contraction-side spool Sp with a different spring member from the spring member 20. Using the same spring member for the spring member that constitutes the extension-side check valve Te and the spring member that biases the contraction-side spool Sp is advantageous because the number of parts can be reduced and the structure can be simplified. The outer diameter of the contraction-side spool Sp is set to be greater than the inner diameter of the annular projection 18, and the annular projection 18 is configured to abut the contraction-side annular plate 263. The contraction-side spool Sp is constantly biased toward the contraction-side second leaf valve Vp2 by the pressure of the contraction-side back pressure chamber Cp. Therefore, a spring member for the purpose of biasing only the contraction-side spool Sp does not have to be provided to the shock absorber D2.

The extension-side spool Se receives the pressure of the extension-side back pressure chamber Ce and biases the extension-side second leaf valve Ve2 toward the piston 2 via the extension-side annular plate 268. In a state in which the extension-side second leaf valve Ve2 abuts the extension-side first leaf valve Ve1, the extension-side spool Se also biases the extension-side first leaf valve Ve1 toward the piston 2. The pressure-receiving area of the extension-side spool Se that receives the pressure of the extension-side back pressure chamber Ce is the difference obtained by subtracting the area of a circle whose diameter is equal to the inner diameter of the annular projection 14 from the area of a circle whose diameter is equal to the outer diameter of the extension-side spool Se.

Similarly, the contraction-side spool Sp receives the pressure of the contraction-side back pressure chamber Cp and biases the contraction-side second leaf valve Vp2 toward the piston 2 via the contraction-side annular plate 263. In a state in which the contraction-side second leaf valve Vp2 abuts the contraction-side first leaf valve Vp1, the contraction-side spool Sp also biases the contraction-side first leaf valve Vp1 toward the piston 2. The pressure-receiving area of the contraction-side spool Sp that receives the pressure of the contraction-side back pressure chamber Cp is the difference obtained by subtracting the area of a circle whose diameter is equal to the inner diameter of the annular projection 18 from the area of a circle whose diameter is equal to the outer diameter of the contraction-side spool Sp. In the hydraulic shock absorber D2 of the present embodiment, the pressure-receiving area of the extension-side spool Se is greater than the pressure-receiving area of the contraction-side spool Sp.

The annular projection 14 of the extension-side spool Se abuts the back surface of the extension-side annular plate 268, and the extension-side annular plate 268 is mounted on the outer periphery of the extension-side spacer 267. The pressure-receiving area in which the pressure of the extension-side back pressure chamber Ce directly acts on the extension-side annular plate 268 is obtained by subtracting the area of a circle whose diameter is equal to the outer diameter of the extension-side spacer 267 from the area of a circle whose diameter is equal to the inner diameter of the annular projection 14. Therefore, the size of the extension-side load is obtained by multiplying the pressure of the extension-side back pressure chamber Ce by an area obtained by subtracting the area of a circle whose diameter is equal to the outer diameter of the extension-side spacer 267 from the area of a circle whose diameter is equal to the outer diameter of the extension-side spool Se. The extension-side second leaf valve Ve2 and the extension-side first leaf valve Ve1 are biased toward the piston 2 by the extension-side load. The extension-side annular plate 268 may be eliminated and the annular projection 14 may be directly abutted to the back surface of the extension-side second leaf valve Ve2.

The annular projection 18 of the contraction-side spool Sp abuts the back surface of the contraction-side annular plate 263, and the contraction-side annular plate 263 is mounted on the outer periphery of the contraction-side spacer 262. The pressure-receiving area in which the pressure of the contraction-side back pressure chamber Cp directly acts on the contraction-side annular plate 263 is obtained by subtracting the area of a circle whose diameter is equal to the outer diameter of the contraction-side spacer 262 from the area of a circle whose diameter is equal to the inner diameter of the annular projection 18. Therefore, the size of the contraction-side load is obtained by multiplying the pressure of the contraction-side back pressure chamber Cp by an area obtained by subtracting the area of a circle whose diameter is equal to the outer diameter of the contraction-side spacer 262 from the area of a circle whose diameter is equal to the outer diameter of the contraction-side spool Sp. The contraction-side second leaf valve Vp2 and the contraction-side first leaf valve Ve1 are biased toward the piston 2 by the contraction-side load. The contraction-side annular plate 263 may be eliminated and the annular projection 18 may be directly abutted to the back surface of the contraction-side second leaf valve Vp2.

In this way, the shock absorber D2 is set such that when the pressure of the extension-side back pressure chamber Ce and the pressure of the contraction-side back pressure chamber Cp are the same, the load received by the extension-side second leaf valve Ve2 from the extension-side back pressure chamber Ce (extension-side load) is greater than the load received by the contraction-side second leaf valve Vp2 from the contraction-side back pressure chamber Cp (contraction-side load). Further, the shock absorber D2 is set such that in a state in which the pressure of the extension-side back pressure chamber Ce and the pressure of the contraction-side back pressure chamber Cp are the same and the extension-side second leaf valve Ve2 abuts the extension-side first leaf valve Ve1 and the contraction-side second leaf valve Vp2 abuts the contraction-side first leaf valve Vp1, the load received by the extension-side second leaf valve Ve2 and the extension-side first leaf valve Ve1 from the extension-side back pressure chamber Ce (extension-side load) is greater than the load received by the contraction-side second leaf valve Vp2 and the contraction-side first leaf valve Vp1 from the contraction-side back pressure chamber Cp (contraction-side load).

In the case that the extension-side back pressure chamber Ce is closed by the extension-side spool Se and the pressure of the extension-side back pressure chamber Ce does not directly act on the extension-side annular plate 268, the extension-side load is determined by only the pressure-receiving area of the extension-side spool Se that receives the pressure of the extension-side back pressure chamber Ce. Similarly, in the case that the contraction-side back pressure chamber Cp is closed by the contraction-side spool Sp and the pressure of the contraction-side back pressure chamber Cp does not directly act on the contraction-side annular plate 263, the contraction-side load is determined by only the pressure-receiving area of the contraction-side spool Sp that receives the pressure of the contraction-side back pressure chamber Cp. Therefore, in an embodiment in which the pressures from the back pressure chambers Ce, Cp do not act directly on the extension-side annular plate 268 and the contraction-side annular plate 263, in order to set the shock absorber D2 such that the extension-side load received by the extension-side first leaf valve Ve1 and the extension-side second leaf valve Ve2 from the extension-side back pressure chamber Ce is greater than the contraction-side load received by the contraction-side second leaf valve Vp2 or by the contraction-side first leaf valve Vp1 and the contraction-side second leaf valve Vp2 from the contraction-side back pressure chamber Cp when the pressure of the extension-side back pressure chamber Ce and the pressure of the contraction-side back pressure chamber Cp are the same, it is sufficient to set the pressure-receiving area of the extension-side spool Se to be greater than the pressure-receiving area of the contraction-side spool Sp.

In the case that the extension-side annular plate 268 and the contraction-side plate 263 are eliminated, the pressure of the extension-side back pressure chamber Ce can be made to act directly on the extension-side second leaf valve Ve2, and the pressure of the contraction-side back pressure chamber Cp can be made to act directly on the contraction-side second leaf valve Vp2. Further, in a structure in which the extension-side back pressure chamber Ce is closed by the extension-side spool Se, the extension-side spool Se can be abutted to the extension-side second leaf valve Ve2, and in a structure in which the contraction-side back pressure chamber Cp is closed by the contraction-side spool Sp, the contraction-side spool Sp can be abutted to the contraction-side second leaf valve Vp2. Whether or not to close the extension-side back pressure chamber Ce and the contraction-side back pressure chamber Cp with the spools is a matter that can be arbitrarily selected.

In the present embodiment, since the extension-side spool Se and the contraction-side spool Sp are used, the pressure-receiving area in which the pressure of the extension-side back pressure chamber Ce substantially acts on the extension-side second leaf valve Ve2 can be set to be greater than the pressure-receiving area of only the extension-side second leaf valve Ve2. Since the difference between the pressure-receiving areas of the contraction-side spool Sp and the extension-side spool Se can be increased, the difference between the extension-side load and the contraction-side load can be increased. Thus, an extremely high degree of freedom can be imparted to the setting widths of the extension-side load and the contraction-side load.

If the extension-side second leaf valve Ve2 is made to deflect by the extension-side load so as to abut the extension-side first leaf valve Ve1, and the extension-side first leaf valve Ve1 is made to deflect to the point at which it abuts the extension-side valve seat 2*d*, the extension-side first leaf valve Ve1 closes extension-side passage 3. The extension-side load acting on the extension-side first leaf valve Ve1 during at a certain piston speed can be set by the above-mentioned pressure-receiving area, the deflection rigidity of the extension-side first leaf valve Ve1 and the extension-side second leaf valve Ve2, etc. In other words, by setting the above-mentioned pressure-receiving area, the deflection rigidity of the extension-side first leaf valve Ve1 and the extension-side second leaf valve Ve2, etc., the extension-side passage 3 can be closed by the extension-side first leaf valve Ve1 at a certain piston speed.

Similar to the extension-side first leaf valve Ve1, the contraction-side first leaf valve Vp1 deflects due to the contraction-side load and abuts the contraction-side valve seat 2*c* so as to close the contraction-side passage 4. The contraction-side load acting on the contraction-side first leaf valve Vp1 at a certain piston speed can be set by the above-mentioned pressure-receiving area, the deflection rigidity of the contraction-side first leaf valve Vp1 and the contraction-side second leaf valve Vp2, etc. In other words, by setting the above-mentioned pressure-receiving area, the deflection rigidity of the contraction-side first leaf valve Vp1 and the contraction-side second leaf valve Vp2, etc., the contraction-side passage 4 can be closed by the contraction-side first leaf valve Vp1 at a certain piston speed.

As shown in FIG. 5, the extension-side back pressure chamber Ce and the contraction-side back pressure chamber Cp are on the upstream side and the extension-side discharge passage Ee and the contraction-side discharge passage Ep are on the downstream side, and these are in communication with each other via the adjustment passage Pc. The solenoid pressure control valve 6 is provided in the adjustment passage Pc so that the pressures of the upstream extension-side back pressure chamber Ce and the contraction-side back pressure chamber C can be controlled. Since the extension-side load is greater than the contraction-side load, when controlling the pressures within the extension-side back pressure chamber Ce and the contraction-side back pressure chamber Cp by the solenoid pressure control valve 6, the extension-side load can be increased with even a small pressure. If the extension-side damping force is increased, the maximum pressure to be controlled by the solenoid pressure control valve 6 can be decreased.

In the present embodiment, the inner periphery of the extension-side spool Se does not slidingly contact the outer periphery of the mounting part 12*a* of the extension-side chamber 12. The pressure of the extension-side back pressure chamber Ce also acts on the inside of the abutting site of the annular projection 14 on the back surface side of the extension-side annular plate 268 so as to bias the extension-side second leaf valve Ve2. In setting the extension-side load, the setting should be made considering the load that directly biases the extension-side second leaf valve Ve2 with the pressure of the extension-side back pressure chamber Ce.

Similarly, the inner periphery of the contraction-side spool Sp does not slidingly contact the outer periphery of the mounting part 11*a* of the contraction-side chamber 11. The pressure of the contraction-side back pressure chamber Cp also acts on the inside of the abutting site of the annular projection 18 on the back surface side of the contraction-side annular plate 263 so as to bias the contraction-side second leaf valve Vp2. In setting the contraction-side load, the setting should be made considering the load that directly biases the contraction-side second leaf valve Vp2 with the pressure of the contraction-side back pressure chamber Cp.

In the present embodiment, the solenoid pressure control valve 6 is set so as to close the adjustment passage Pc when not energized, and to perform pressure control when energized. A fail valve FV that bypasses the solenoid pressure control valve 6 is provided in the adjustment passage Pc. The structure of the solenoid pressure control valve 6 and the structure of the fail valve FV are basically the same as those in the first embodiment, and thus explanations thereof will be omitted herein.

Next, the operation of the shock absorber D2 will be explained. First, a case in which the damping force characteristics of the shock absorber D2 are set to soft, i.e. a case in which the biasing force that is generated by the biasing part and biases the extension-side second leaf valve Ve2 and the contraction-side second leaf valve Vp2 is decreased and the damping coefficient is decreased, will be explained. In order to make the damping force characteristics soft, the biasing force that is applied to the extension-side second leaf valve Ve2 and the contraction-side second leaf valve Vp2 by the biasing part is decreased. Specifically, the resistance applied by the solenoid pressure control valve 6 to the passing liquid is decreased by energizing the solenoid Sol.

More specifically, the biasing force is controlled to form the extension-side first gap between the extension-side first leaf valve Ve1 and the extension-side valve seat 2*d* so that the extension-side second leaf valve Ve2 does not abut the extension-side first leaf valve Ve1 even if the extension-side second leaf valve Ve2 is made to deflect by the biasing force generated by the biasing part, or so that the extension-side first leaf valve Ve1 does not sit on the extension-side valve seat 2*d* even if the extension-side second valve leaf Ve2 abuts the extension-side first leaf valve Ve1. Similarly, the biasing force is controlled to form the contraction-side first gap between the contraction-side first leaf valve Vp1 and the contraction-side valve seat 2*c* so that the contraction-side second leaf valve Vp2 does not abut the contraction-side first leaf valve Vp1 even if the contraction-side second leaf valve Vp2 is made to deflect by the biasing force generated by the biasing part, or so that the contraction-side first leaf valve Vp1 does not sit on the contraction-side valve seat 2*c* even if the contraction-side second valve leaf Vp2 abuts the contraction-side first leaf valve Vp1.

Figure 8:
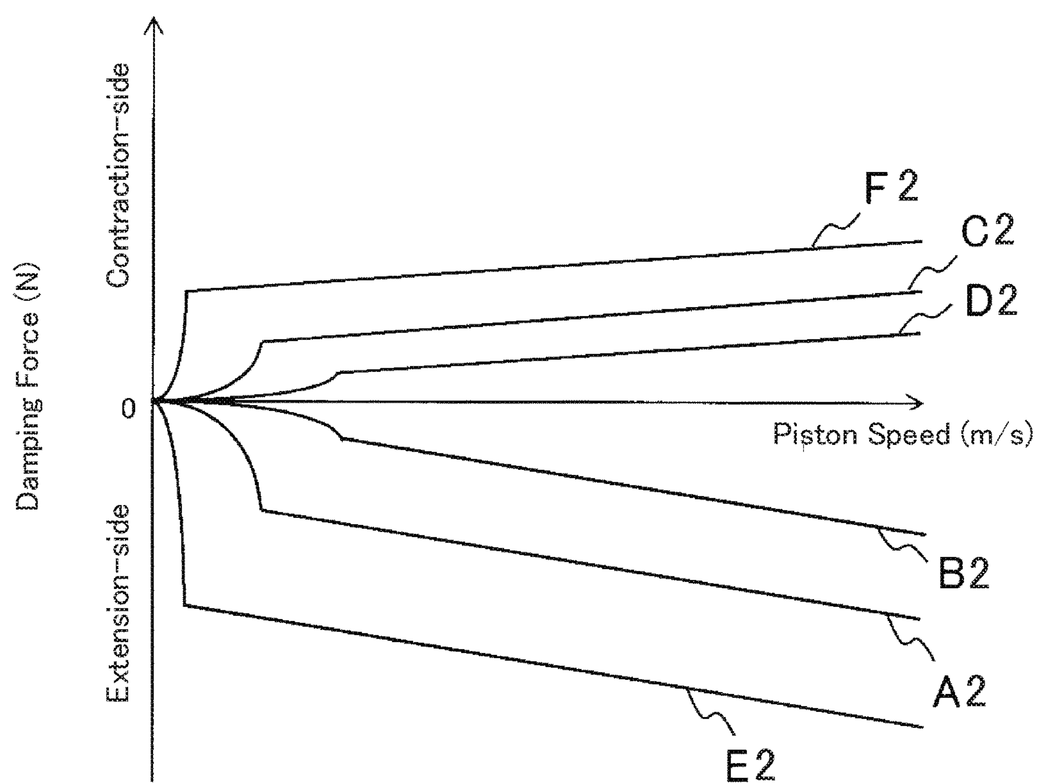
FIG. 8 is a diagram for explaining the damping force characteristics of the shock absorber using the damping valve according to the second embodiment of the present invention.

In this state, if the shock absorber D2 extends and the piston 2 moves upward in FIG. 5, the liquid within the extension-side chamber R1 that is compressed pushes the extension-side first leaf valve Ve1 causing it to deflect. The liquid within the extension-side chamber R1 passes through the extension-side passage 3 and moves to the contraction-side chamber R2 that is expanded. Since the extension-side first gap is formed between the extension-side first leaf valve Ve1 and the extension-side valve seat 2*d*, the liquid passes through the extension-side first gap. The flow path area of the extension-side first gap is greater than the flow path area in a state in which the leaf valve is made to sit on the valve seat in a conventional shock absorber (for example, the flow path area of a notch provided to the leaf valve or an orifice provided to the valve seat by punching). Therefore, as indicated by the line B2 in FIG. 8, the shock absorber D2 can reduce the damping force when the piston speed is in a low-speed region compared to the damping force generated by a conventional shock absorber as shown by the line A2.

When the pressure within the extension-side chamber R1 rises in accordance with the extension of the shock absorber D2, the extension-side first leaf valve Ve1 deflects. The amount of this deflection is determined by the balance between a force that is generated by the pressure of the extension-side chamber R1 and that attempts to make the extension-side first leaf valve Ve1 deflect from the extension-side passage 3 side, and a force that is generated by the spring reaction force possessed by the extension-side first leaf valve Ve1 itself according to the above-mentioned amount of deflection and that attempts to return the extension-side first leaf valve Ve1 to the extension-side valve seat 2*d* side. The extension-side first leaf valve Ve1 opens the extension-side passage 3 by deflecting.

If the shock absorber D2 extends at a high piston speed, the pressure within the extension-side chamber R1 increases and the extension-side first leaf valve Ve1 deflects greatly. If the outer periphery of the extension-side first leave valve Ve1 displaces by an amount equal to or greater than the extension-side second gap, it abuts the extension-side second leaf valve Ve2 and thus the deflection of the extension-side first leaf valve Ve1 is suppressed. Therefore, the inclination of the damping force characteristics of the shock absorber D2 gradually increases together with an increase in the piston speed as indicated by the line B2 in FIG. 8.

If the shock absorber D2 extends at an even higher piston speed, the pressure within the extension-side chamber R1 increases further, and the force causing the extension-side first leaf valve Ve1 to deflect also increases. If the force causing the extension-side first leaf valve Ve1 to deflect surpasses the force generated by the extension-side back pressure chamber Ce that pushes down the extension-side second leaf valve Ve2, the extension-side second leaf valve Ve2 deflects together with the extension-side first leaf valve Ve1 in a direction away from the piston 2. As a result, the extension-side first gap between the extension-side valve seat 2*d* and the extension-side first leaf valve Ve1 increases. The inclination of the damping force characteristics of the shock absorber D2 begins to decrease part way through as indicated by the line B2 in FIG. 8.

The liquid within the extension-side chamber R1 pushes and opens the extension-side check valve Te, and passes through the extension-side pressure introduction passage Ie and flows to the adjustment passage Pc. The liquid that has passed through the adjustment passage Pc pushes and opens the check valve 25, and is discharged to the contraction-side chamber R2 on the low-pressure side via the extension-side discharge passage Ee. The extension-side pilot orifice Pe applies resistance when liquid passes therethrough to cause a pressure loss. In a state in which the liquid is flowing, the pressure downstream of the adjustment passage Pc decreases lower than the pressure of the extension-side chamber R1, and thus the check valve 22 provided to the contraction-side discharge passage Ep does not open and remains closed.

The extension-side pressure introduction passage Ie not only communicates with the contraction-side back pressure chamber Cp, but also communicates with the extension-side back pressure chamber Ce via the communication passage 24. Since the contraction-side pressure introduction passage Ip is closed by the contraction-side check valve Tp, during extension of the shock absorber D2, the pressure within the extension-side back pressure chamber Ce can be increased higher than that of the contraction-side chamber R2. The pressure of the contraction-side back pressure chamber Cp becomes higher than the pressure of the contraction-side chamber R2 on the low-pressure side, and biases the contraction-side second leaf valve Vp2 that closes the contraction-side passage 4. Since a flow of liquid is not generated in the contraction-side passage 4, there is no problem even if the contraction-side second leaf valve Vp2 closes the contraction-side passage 4.

The solenoid pressure control valve 6 is provided in the adjustment passage Pc as explained above. When the solenoid Sol of the solenoid pressure control valve 6 is energized so as to control the pressure on the upstream side of the adjustment passage Pc, the pressure within the extension-side back pressure chamber Ce can be adjusted and the extension-side load can be controlled to a desired load. Given the above, the extension-side load that compresses the extension-side second leaf valve Ve2 can be controlled by the solenoid pressure control valve 6. By controlling the extension-side load, the gap amount of the extension-side first gap between the extension-side first leaf valve Ve1 and the extension-side valve seat 2*d* (the opening degree of the extension-side first leaf valve Ve1) in a state in which the extension-side first leaf valve Ve1 abuts the extension-side second leaf valve Ve2 can be controlled. Thereby, the extension-side damping force during extension of the shock absorber D2 can be controlled.

If the shock absorber D2 contracts and the piston 2 moves downward in FIG. 5, the liquid within the contraction-side chamber R2 that is compressed pushes the contraction-side first leaf valve Vp1 causing it to deflect. The liquid within the contraction-side chamber R2 passes through the contraction-side passage 4 and moves to the extension-side chamber R1 that is expanded. Since the contraction-side first gap is formed between the contraction-side first leaf valve Vp1 and the contraction-side valve seat 2*c*, the liquid passes through the contraction-side first gap. The flow path area of the contraction-side first gap is greater than the flow path area in a state in which the leaf valve is made to sit on the valve seat in a conventional shock absorber (for example, the flow path area of a notch provided to the leaf valve or an orifice provided to the valve seat by punching). Therefore, as indicated by the line D2 in FIG. 8, the shock absorber D2 can reduce the damping force when the piston speed is in a low-speed region compared to the damping force generated by a conventional shock absorber as shown by the line C2.

When the pressure within the contraction-side chamber R2 rises in accordance with the contraction of the shock absorber D2, the contraction-side first leaf valve Vp1 deflects. The amount of this deflection is determined by the balance between a force that is generated by the pressure of the contraction-side chamber R2 and that attempts to make the contraction-side first leaf valve Vp1 deflect from the contraction-side passage 4 side, and a force that is generated by the spring reaction force possessed by the contraction-side first leaf valve Vp1 itself according to the above-mentioned amount of deflection and that attempts to return the contraction-side first leaf valve Vp1 to the contraction-side valve seat 2*c* side. The contraction-side first leaf valve Vp1 opens the contraction-side passage 4 by deflecting.

If the shock absorber D2 extends at a high piston speed, the pressure within the contraction-side chamber R2 increases and the contraction-side first leaf valve Vp1 deflects greatly. If the outer periphery of the contraction-side first leave valve Ve2 displaces by an amount equal to or greater than the contraction-side second gap, it abuts the contraction-side second leaf valve Vp2 and thus the deflection of the contraction-side first leaf valve Vp1 is suppressed. Therefore, the inclination of the damping force characteristics of the shock absorber D2 gradually increases together with an increase in the piston speed as indicated by the line D2 in FIG. 8.

If the shock absorber D2 extends at an even higher piston speed, the pressure within the contraction-side chamber R2 increases further, and the force causing the contraction-side first leaf valve Vp1 to deflect also increases. If the force causing the contraction-side first leaf valve Vp1 to deflect surpasses the force generated by the contraction-side back pressure chamber Cp that pushes down the contraction-side second leaf valve Vp2, the contraction-side second leaf valve Vp2 deflects together with the contraction-side first leaf valve Vp1 in a direction away from the piston 2. As a result, the contraction-side first gap between the contraction-side valve seat 2*c* and the contraction-side first leaf valve Vp1 increases. The inclination of the damping force characteristics of the shock absorber D2 begins to decrease part way through as indicated by the line D2 in FIG. 8.

The liquid within the contraction-side chamber R2 pushes and opens the contraction-side check valve Tp, and passes through the contraction-side pressure introduction passage Ip and flows to the adjustment passage Pc. The liquid that has passed through the adjustment passage Pc pushes and opens the check valve 22, and is discharged to the extension-side chamber R1 on the low-pressure side via the contraction-side discharge passage Ep. The contraction-side pilot orifice Pp applies resistance when liquid passes therethrough to cause a pressure loss. In a state in which the liquid is flowing, the pressure downstream of the adjustment passage Pc decreases lower than the pressure of the contraction-side chamber R2, and thus the check valve 25 provided to the extension-side discharge passage Ee does not open and remains closed.

The contraction-side pressure introduction passage Ip not only communicates with the extension-side back pressure chamber Ce, but also communicates with the contraction-side back pressure chamber Cp via the communication passage 24. Since the extension-side pressure introduction passage Ie is closed by the extension-side check valve Te, during contraction of the shock absorber D2, the pressure within the contraction-side back pressure chamber Cp can be increased higher than that of the extension-side chamber R1. The pressure of the extension-side back pressure chamber Ce becomes higher than the pressure of the extension-side chamber R1 on the low-pressure side, and biases the extension-side second leaf valve Ve2 that closes the extension-side passage 3. Since a flow of liquid is not generated in the extension-side passage 3, there is no problem even if the extension-side second leaf valve Ve2 closes the extension-side passage 3.

The solenoid pressure control valve 6 is provided in the adjustment passage Pc as explained above. When the solenoid Sol of the solenoid pressure control valve 6 is energized so as to control the pressure on the upstream side of the adjustment passage Pc, the pressure within the contraction-side back pressure chamber Cp can be adjusted and the contraction-side load can be controlled to a desired load. Given the above, the contraction-side load that compresses the contraction-side second leaf valve Vp2 can be controlled by the solenoid pressure control valve 6. By controlling the contraction-side load, the gap amount of the contraction-side first gap between the contraction-side first leaf valve Vp1 and the contraction-side valve seat 2*c* (the opening degree of the contraction-side first leaf valve Vp1) in a state in which the contraction-side first leaf valve Vp1 abuts the contraction-side second leaf valve Vp2 can be controlled. Thereby, the contraction-side damping force during contraction of the shock absorber D2 can be controlled.

Next, a case in which the damping force characteristics of the shock absorber D2 are set to hard, i.e. a case in which the biasing force that is generated by the biasing part and biases the extension-side second leaf valve Ve2 and the contraction-side second leaf valve Vp2 is increased and the damping coefficient is increased, will be explained. In order to make the damping force characteristics hard, the biasing force generated by the biasing part is controlled so that the extension-side second leaf valve Ve2 and the contraction-side second leaf valve Vp2 deflect so as to abut the corresponding extension-side first leaf valve Ve1 and the contraction-side first leaf valve Vp1, and the extension-side first leaf valve Ve1 and the contraction-side first leaf valve Vp1 deflect so as to sit on the corresponding extension-side valve seat 2*d* and the contraction-side valve seat 2*c*. The solenoid Sol is energized so as to increase the resistance applied by the solenoid pressure control valve 6 to the passing liquid.

In this state, the extension-side second leaf valve Ve2 abuts the extension-side first leaf valve Ve1 and the extension-side first leaf valve Ve1 sits on the extension-side valve seat 2*d*, and the extension-side first gap and the extension-side second gap are not formed. Similarly, the contraction-side second leaf valve Vp2 abuts the contraction-side first leaf valve Vp1 and the contraction-side first leaf valve Vp1 sits on the contraction-side valve seat 2*c*, and the contraction-side first gap and the contraction-side second gap are not formed.

When the piston 2 moves upward in FIG. 5 at a low piston speed and the shock absorber D2 extends, the gap amount of the extension-side first gap that is formed between the extension-side first leaf valve Ve1 and the extension-side valve seat 2*d* is very small even if the extension-side first leaf valve Ve1 deflects upon receiving the pressure of the extension-side chamber R1 via the extension-side passage 3. The liquid passing through the extension-side passage 3 passes through the extension-side first gap consisting of a small gap amount, and thus the shock absorber D2 can exert a larger damping force compared to the case in which the damping characteristics are set to be soft.

On the other hand, if the piston speed is high, the pressure of the extension-side chamber R1 that acts on the extension-side first leaf valve Ve1 via the extension-side passage 3 increases. If the force in a direction causing the extension-side first leaf valve Ve1 to separate from the extension-side valve seat 2*d* that is generated by the pressure of the extension-side chamber R1 increases, the extension-side first leaf valve Ve1 and the extension-side second leaf valve Ve2 deflect greatly, and the extension-side annular plate 268 and the extension-side spool Se are pushed downward in FIG. 7. As a result, the gap amount of the extension-side first gap between the extension-side first leaf valve Ve1 and the extension-side valve seat 2*d* increases. Since the biasing force generated by the biasing part is large compared to the state in which the damping force characteristics are set to be soft, the amount of deflection of the extension-side first leaf valve Ve1 is small. Since the gap amount of the extension-side first gap is also small, as indicated by the line E2 in FIG. 8, even at the same piston speed, the shock absorber D2 exerts a higher damping force when set to hard than when set to soft.

Similar to the case in which the damping force characteristics are set to soft, the liquid within the extension-side chamber R1 pushes and opens the extension-side check valve Te and passes through the extension-side pressure introduction chamber Ie to flow into the adjustment passage Pc. By controlling the pressure on the upstream side of the adjustment passage Pc with the solenoid pressure control valve 6 provided to the adjustment passage Pc, similar to when set to soft, the pressure within the extension-side back pressure chamber Ce can be adjusted and the extension-side load can be controlled to a desired load, and the opening degree of the extension-side first leaf valve Ve1 can be controlled. Thereby, the damping force (extension-side damping force) during extension of the shock absorber D2 in which the damping force characteristics have been set to hard can be controlled.

When the piston 2 moves downward in FIG. 5 at a low piston speed and the shock absorber D2 contracts, the gap amount of the contraction-side first gap that is formed between the contraction-side first leaf valve Vp1 and the contraction-side valve seat 2*c* is very small even if the contraction-side first leaf valve Vp1 deflects upon receiving the pressure of the contraction-side chamber R2 via the contraction-side passage 4. The liquid passing through the contraction-side passage 4 passes through the contraction-side first gap consisting of a small gap amount, and thus the shock absorber D2 can exert a larger damping force compared to the case in which the damping characteristics are set to be soft.

On the other hand, if the piston speed is high, the pressure of the contraction-side chamber R2 that acts on the contraction-side first leaf valve Vp1 via the contraction-side passage 4 increases. If the force in a direction causing the contraction-side first leaf valve Vp1 to separate from the contraction-side valve seat 2*c* that is generated by the pressure of the contraction-side chamber R2 increases, the contraction-side first leaf valve Vp1 and the contraction-side second leaf valve Vp2 deflect greatly, and the contraction-side annular plate 263 and the contraction-side spool Sp are pushed upward in FIG. 7. As a result, the gap amount of the contraction-side first gap between the contraction-side first leaf valve Vp1 and the contraction-side valve seat 2*c* increases. Since the biasing force generated by the biasing part is large compared to the state in which the damping force characteristics are set to be soft, the amount of deflection of the contraction-side first leaf valve Vp1 is small. Since the gap amount of the contraction-side first gap is also small, as indicated by the line F2 in FIG. 8, even at the same piston speed, the shock absorber D2 exerts a higher damping force when set to hard than when set to soft.

Similar to the case in which the damping force characteristics are set to soft, the liquid within the contraction-side chamber R2 pushes and opens the contraction-side check valve Tp and passes through the contraction-side pressure introduction chamber Ip to flow into the adjustment passage Pc. By controlling the pressure on the upstream side of the adjustment passage Pc with the solenoid pressure control valve 6 provided to the adjustment passage Pc, similar to when set to soft, the pressure within the contraction-side back pressure chamber Cp can be adjusted and the contraction-side load can be controlled to a desired load, and the opening degree of the contraction-side first leaf valve Vp1 can be controlled. Thereby, the damping force (contraction-side damping force) during contraction of the shock absorber D2 in which the damping force characteristics have been set to hard can be controlled.

In this way, in the damping valve and shock absorber D2 of the present embodiment, the extension-side and contraction-side first gaps are formed between the extension-side and contraction-side first leaf valves Ve1, Vp1 and the corresponding extension-side and contraction-side valve seats 2*d*, 2*c*. Further, the extension-side and contraction-side second gaps are formed between the extension-side and contraction-side first leaf valves Ve1, Vp1 and the corresponding extension-side and contraction-side second leaf valves Ve2, Vp2. Therefore, when the damping characteristics are set to soft, compared to a conventional damping valve and shock absorber using a fixed orifice, the flow passage area can be increased and the damping force can be greatly decreased when the piston speed is in a low-speed region. In addition, the extension-side and contraction-side second gaps are formed between the extension-side and contraction-side first leaf valves Ve1, Vp1 and the corresponding extension-side and contraction-side second leaf valves Ve2, Vp2. Therefore, even if the deflection rigidity of the extension-side and contraction-side first leaf valves Ve1, Vp1 is low, the overall deflection rigidity of the extension-side and contraction-side first leaf valves Ve1, Vp1 and the corresponding extension-side and contraction-side second leaf valves Ve2, Vp2 increases in a state in which the extension-side and contraction-side first leaf valves Ve1, Vp1 deflect and abut the corresponding extension-side and contraction-side second leaf valves Ve2, Vp2. Thus, the damping force can be increased when the piston speed is high, and by reducing the deflection rigidity of the extension-side and contraction-side first leaf valves Ve1, Vp1, the damping force can be further decreased when the piston speed is low.

Thus, according to the damping valve and the shock absorber D2 of the present embodiment, the damping force when the piston speed is in a low-speed region can be decreased and the damping force adjustment width can be expanded.

Further, since the rigidity of the extension-side first leaf valve Ve1 can be reduced, during the switch from the extension operation to the contraction operation of the shock absorber D2, the extension-side first leaf valve Ve1 can receive the pressure of the contraction-side chamber R2 and quickly sit on the extension-side valve seat 2*d*. Also, since the rigidity of the contraction-side first leaf valve Vp1 can be reduced, during the switch from the contraction operation to the extension operation of the shock absorber D2, the contraction-side first leaf valve Vp1 can receive the pressure of the extension-side chamber R1 and quickly sit on the contraction-side valve seat 2c. In this way, the extension-side first leaf valve Ve1 and the contraction-side first leaf valve Vp1 can quickly function as check valves without any delays in closing, and thus the damping force generation responsiveness can be improved.

In the case that the damping force characteristics of the shock absorber D2 according to the present embodiment are switched from soft to hard during the extension operation, the extension-side first gap between the extension-side first leaf valve Ve1 and the extension-side valve seat 2d gradually decreases due to the increase in pressure within the extension-side back pressure chamber Ce, and thus the extension-side first leaf valve Ve1 sits on the extension-side valve seat 2d. In the case that the damping force characteristics of the shock absorber D2 are switched from soft to hard during the contraction operation, the contraction-side first gap between the contraction-side first leaf valve Vp1 and the contraction-side valve seat 2c gradually decreases due to the increase in pressure within the contraction-side back pressure chamber Cp, and thus the contraction-side first leaf valve Vp1 sits on the contraction-side valve seat 2c. Conversely, in the case that the damping force characteristics of the shock absorber D2 according to the present embodiment are switched from hard to soft during the extension operation, the extension-side first gap between the extension-side first leaf valve Ve1 and the extension-side valve seat 2d gradually increases due to the decrease in pressure within the extension-side back pressure chamber Ce. In the case that the damping force characteristics of the shock absorber D2 according to the present embodiment are switched from hard to soft during the contraction operation, the contraction-side first gap between the contraction-side first leaf valve Vp1 and the contraction-side valve seat 2c gradually increases due to the decrease in pressure within the contraction-side back pressure chamber Cp. Therefore, when the damping force characteristics of the shock absorber D2 are switched from soft to hard or from hard to soft, any sudden changes in the damping force characteristics of the shock absorber D2 are mitigated. In a vehicle equipped with the shock absorber D2, sudden changes in the damping force characteristics are mitigated, and thus shocks during switching of the damping force characteristics are not perceived by the passengers, and the riding comfort of the vehicle can be improved.

When the solenoid pressure control valve 6 provided to the adjustment passage Pc has closed due to a switch in the damping characteristics from soft to hard or the like, the pressures of the extension-side back pressure chamber Ce and the contraction-side back pressure chamber Cp instantaneously rise, i.e. a so-called surge occurs. In related damping valves, if a pressure fluctuation of a back pressure chamber that biases a leaf valve occurs, the biasing force that biases a disc valve changes suddenly and thus the damping force also changes quickly, and this may negatively impact the riding comfort in the vehicle.

In the present embodiment, since the extension-side and contraction-side second gaps are provided between the extension-side and contraction-side first leaf valves Ve1, Vp1 and the corresponding extension-side and contraction-side second leaf valves Ve2, Vp2, the extension-side and contraction-side second leaf valves Ve2, Vp2 cannot suddenly abut the corresponding extension-side and contraction-side first leaf valves Ve1, Vp1. Therefore, the extension-side and contraction-side first leaf valves Ve1, Vp1 are not suddenly pushed into the corresponding extension-side valve seat 2d and contraction-side valve seat 2c, and thus there are no sudden closures of the extension-side passage 3 and the contraction-side passage 4. Accordingly, spikes caused by sudden changes in the damping force do not occur in the damping force waveform, and the riding comfort in the vehicle is not negatively impacted.

The extension-side annular plate 268 is laminated on the back surface of the extension-side second leaf valve Ve2, and the extension-side annular plate 268 is slidingly mounted on the outer periphery of the extension-side spacer 267. The contraction-side annular plate 263 is laminated on the back surface of the contraction-side second leaf valve Vp2, and the contraction-side annular plate 263 is slidingly mounted on the outer periphery of the contraction-side spacer 262. Therefore, by setting the rigidity of the extension-side annular plate 268 to be higher than the rigidity of the extension-side second leaf valve Ve2 and setting the rigidity of the contraction-side annular plate 263 to be higher than the rigidity of the contraction-side second leaf valve Vp2, the biasing force generated by the biasing part can be received by the extension-side annular plate 268 and the contraction-side annular plate 263. Thus, deformation of the extension-side first and second leaf valves Ve1, Ve2 and the contraction-side first and second leaf valve Vp1, Vp2 can be suppressed, and deterioration of the leaf valves Ve1, Ve2, Vp1, Vp2 can be suppressed.

The extension-side annular plate 268 is slidingly mounted on the outer periphery of the extension-side spacer 267 that is laminated on the back surface of the extension-side second leaf valve Ve2, and the contraction-side annular plate 263 is slidingly mounted on the outer periphery of the contraction-side spacer 262 that is laminated on the back surface of the contraction-side second leaf valve Vp2. The inner diameter of the extension-side annular plate 268 is smaller than the outer diameter of the inner peripheral seat part 2h of the piston 2, and the outer diameter of the extension-side annular plate 268 is greater than the inner diameter of the extension-side valve seat 2d. Further, the inner diameter of the contraction-side annular plate 263 is smaller than the outer diameter of the inner peripheral seat part 2f of the piston 2, and the outer diameter of the contraction-side annular plate 263 is greater than the inner diameter of the contraction-side valve seat 2c. Therefore, the pressure on the back surfaces of the extension-side second leaf valve Ve2 and the contraction-side second leaf valve Vp2 can be received by the extension-side annular plate 268 and the contraction-side annular plate 263. Accordingly, by providing the extension-side annular plate 268 and the contraction-side annular plate 263 to the shock absorber D2, excessive loads on the extension-side first and second leaf valves Ve1, Ve2 and the contraction-side first and second leaf valves Vp1, Vp2 can be prevented, and the rigidity of the extension-side first leaf valve Ve1 and the contraction-side first leaf valve Vp2 can be further reduced, and thus leaf valves with lower deflection rigidity can be utilized. Therefore, a lower damping force can be exerted by the shock absorber D2.

Further, the biasing part biases the extension-side second leaf valve Ve2 and the contraction-side second leaf valve Vp2 using either one or both of the pressures of the extension-side chamber R1 and the contraction-side chamber R2 within the shock absorber D2. Therefore, the extension-side second leaf valve Ve2 and the contraction-side second leaf valve Vp2 can be biased without using a biasing force generation source, and the biasing force can be changed by controlling the pressure.

In general, in a shock absorber for a vehicle, in order to suppress vibrations in the up-down direction of the vehicle body, it is necessary to make the extension-side damping force during the extension operation greater than the contraction-side damping force during the contraction operation. In the shock absorber D2 that is set to a single-rod type, the pressure-receiving area that receives the pressure of the extension-side chamber R1 is an area obtained by subtracting the cross-section area of the rod member 10 from the cross-section area of the piston 2. Thus, it is necessary to make the pressure of the extension-side chamber R1 during the extension operation much greater than the pressure of the contraction-side chamber R2 during the contraction operation.

In contrast, in the shock absorber D2 according to the present embodiment, in the case that the extension-side back pressure chamber Ce and the contraction-side back pressure chamber Cp are at equal pressures, the extension-side load that biases the extension-side first leaf valve Ve1 is greater than the contraction-side load that biases the contraction-side first leaf valve Vp1. Further, in the present embodiment, the extension-side spool Se is used. Compared to a structure in which the extension-side spool Se is not used and the pressure of the extension-side back pressure chamber Ce is merely made to act on the back surface side of the extension-side second leaf valve Ve2, the pressure-receiving area of the extension-side spool Se that receives the pressure of the extension-side back pressure chamber Ce can be made greater than the back surface area of the extension-side second leaf valve Ve2. Therefore, a large extension-side load can be made to act on the extension-side second leaf valve Ve2. Further, by using the extension-side spool Se and the contraction-side spool Sp, the degree of freedom for designing the extension-side load and the contraction-side load can be improved.

Accordingly, in the shock absorber D2 of the present embodiment, in the case that it is necessary to greatly increase the extension-side load in order to adjust the extension-side damping force during the extension operation, it is possible to make settings so as to output a large extension-side load even if the pressure of the extension-side back pressure chamber Ce is small. Thus, the control width of the extension-side damping force can be secured even without using a large solenoid Sol.

Instead of performing pressure control of the extension-side back pressure chamber Ce and the contraction-side back pressure chamber Cp by driving independent valve bodies, by making the extension-side load greater than the contraction-side load, the control width of the extension-side damping force can be secured even if the pressures of the extension-side back pressure chamber Ce and the contraction-side back pressure chamber Cp are controlled in communication with each other. Thus, it is sufficient to provide a single valve body 31 of the solenoid valve to the solenoid pressure control valve 6. Therefore, the structure becomes extremely simple and the costs can also be lowered.

Due to the above, the size of the solenoid Sol in the solenoid pressure control valve 6 can be decreased, and in addition, the structure of the solenoid pressure control valve 6 is simplified and the size of the shock absorber D2 does not increase even if the solenoid pressure control valve 6 is utilized in the piston part of the shock absorber D2. Thus, according to the shock absorber D2 of the present embodiment, the structure of the shock absorber D2 is simplified and the size thereof is reduced, and the installation into the vehicle is not negatively affected. Further, since the extension-side damping force can be increased even if the solenoid Sol does not exert a large thrust, the power consumption when increasing the damping force can be reduced and thus power saving can be achieved.

Since the pressure-receiving area of the extension-side spool Se that receives the pressure of the extension-side back pressure chamber Ce is configured to be greater than the pressure-receiving area of the contraction-side spool Sp that receives the pressure of the contraction-side back pressure chamber Cp, the extension-side load can be easily configured to be greater than the contraction-side load.

The extension-side back pressure chamber Ce and the contraction-side back pressure chamber Cp communicate with each other through the communication passage 24 via the contraction-side resistance element and the extension-side resistance element. The contraction-side pressure introduction passage Ip introduces liquid from the contraction-side chamber R2 to the extension-side back pressure chamber Ce with hardly any resistance. Therefore, when the shock absorber D2 switches from the extension operation to the contraction operation, the pressure within the contraction-side chamber R2 is quickly introduced into the extension-side back pressure chamber Ce. Thus, the extension-side spool Se presses the extension-side second leaf valve Ve2 by means of the pressure within the extension-side back pressure chamber Ce and the biasing by the spring member 16 so that the extension-side first leaf valve Ve1 can be quickly seated on the extension-side valve seat 2*d* to close the extension-side passage 3. The extension-side pressure introduction passage Ie also introduces liquid from the extension-side chamber R1 to the contraction-side back pressure chamber Cp with hardly any resistance. Therefore, when the shock absorber D2 switches from the contraction operation to the extension operation, the pressure within the extension-side chamber R1 is quickly introduced into the contraction-side back pressure chamber Cp. Thus, the contraction-side spool Sp presses the contraction-side second leaf valve Vp2 by means of the pressure within the contraction-side back pressure chamber Cp and the biasing by the spring member 20 so that the contraction-side first leaf valve Vp1 can be quickly seated on the contraction-side valve seat 2*c* to close the contraction-side passage 4.

Gaps may form between the annular plate 19 and the contraction-side chamber 11 and between the annular plate 15 and the extension-side chamber 12 due to deterioration over time of the valve body (annular plate 19) of the extension-side check valve Te and the valve body (annular plate 15) of the contraction-side check valve Tp. Since the extension-side resistance element and the contraction-side resistance element are not provided to the extension-side pressure introduction passage Ie and the contraction-side pressure introduction passage Ip, the flow amounts passing through the extension-side pressure introduction passage Ie and the contraction-side pressure introduction passage Ip do not change. Therefore, the above-mentioned gaps do not affect the damping force control or the valve-closing operation during switching between extension/contraction.

On the outer peripheral side of the piston rod 7, the piston 2, the extension-side first leaf valve Ve1, the extension-side second leaf valve Ve2, the contraction-side first leaf valve Vp1, the contraction-side second leaf valve Vp2, the cylindrical extension-side chamber 12, and the cylindrical contraction-side chamber 11 are mounted. The piston 2 includes the extension-side passage 3 and the contraction-side passage 4, and the extension-side first leaf valve Ve1, the extension-side second leaf valve Ve2, the contraction-side first leaf valve Vp1, and the contraction-side second leaf valve Vp2 are laminated on the piston 2. The extension-side chamber 12 forms the extension-side back pressure chamber Ce, and the extension-side spool Se is slidingly inserted into the inner periphery of the extension-side chamber 12. The contraction-side chamber 11 forms the contraction-side back pressure chamber Cp, and the contraction-side spool Sp is slidingly inserted into the inner periphery of the contraction-side chamber 11. The contraction-side pressure introduction passage Ip is provided to the extension-side chamber 12, and the extension-side pressure introduction passage Ie is provided to the contraction-side chamber 11, and thus the members required to adjust the damping force can be disposed in a concentrated manner in the piston part of the shock absorber D2.

The extension-side second leaf valve Ve2 of the extension-side spool Se and the valve body (annular plate 15) of the contraction-side check valve Tp that opens/closes the contraction-side pressure introduction passage Ip are biased by the single spring member 16. The contraction-side second leaf valve Vp2 of the contraction-side spool Sp and the valve body (annular plate 19) of the extension-side check valve Te that opens/closes the extension-side pressure introduction passage Ie are biased by the single spring member 20. Therefore, the check valves Te, Tp and the spools Se, Sp can be restored to the return side with the single spring members 16, 20, and thus the number of parts can be reduced.

In the shock absorber D2, the retaining shaft 8*a*, the vertical hole 8*d*, the extension-side pilot orifice Pe serving as the extension-side resistance element, the contraction-side pilot orifice Pp serving as the contraction-side resistance element, the accommodation part L, the adjustment passage Pc, and the contraction-side discharge passage Ep are provided to the piston rod 7. The retaining shaft 8*a* is provided on the distal end of the piston rod 7, and the piston 2, the extension-side first leaf valve Ve1, the extension-side second leaf valve Ve2, the contraction-side first leaf valve Vp1, the contraction-side second leaf valve Vp2, the extension-side chamber 12, and the contraction-side chamber 11 are mounted on the outer periphery of the retaining shaft 8*a*. The vertical hole 8*d* opens from the distal end of the retaining shaft 8*a*. The extension-side pilot orifice Pe and the contraction-side pilot orifice Pp are provided to the retaining shaft 8*a*, and communicate with the communication passage 24 provided in the vertical hole 8*d*. The accommodation part L is provided on the inside of the piston rod 7 so as to communicate with the vertical hole 8*d*, and the solenoid pressure control valve 6 is accommodated in the accommodation part L. The adjustment passage Pc allows the communication passage 24 to communicate with the accommodation part L. The contraction-side discharge passage Ep allows the accommodation part L to communicate with the extension-side chamber R1. The shock absorber D2 includes the separator 23 that is inserted into the vertical hole 8*d*. The separator 23 forms, by the annular groove 23*a* provided on the outer periphery thereof, the communication passage 24 that allows the extension-side back pressure chamber Ce to communicate with the contraction-side back pressure chamber Cp within the vertical hole 8*d*. The separator 23 also forms the extension-side discharge passage Ee on the inner periphery thereof. Therefore, the solenoid pressure control valve 6 can be accommodated within the piston rod 7 without any trouble, and the extension-side back pressure chamber Ce and the contraction-side back pressure chamber Cp can be provided on the outer periphery of the piston rod 7 shifted in the axial direction from the solenoid pressure control valve 6.

Similar to the first embodiment, the shock absorber D2 can stabilize the vehicle body posture even during a failure. By making the solenoid pressure control valve 6 function as a throttle valve, the riding comfort in the vehicle can be improved even during a failure.

Similar to the first embodiment, the solenoid pressure control valve 6 blocks the adjustment passage Pc by making the small-diameter part 31*a* oppose the through hole 30*c*. Therefore, the pressure-receiving area on which pressure in a direction in which the valve body 31 of the solenoid valve escapes from the valve seat member 30 acts can be greatly decreased, and thus the flow passage area during valve opening can be increased. Accordingly, the movement of the valve body 31 of the solenoid valve is stable. Further, in the blocked position, the solenoid pressure control valve remains closed even upon receiving pressure from the upstream side, and thus it is possible to activate only the fail valve FV.

The constitution of the biasing part is not limited to that in the present embodiment. The present embodiment can also be applied to only either one of the damping valve on the extension-side or the damping valve on the contraction-side of the shock absorber. Although not illustrated, the present embodiment can also be applied to a damping valve provided to a base valve instead of a damping valve provided to the piston part of a shock absorber.

Embodiments of this invention were described above, but the above embodiments are merely examples of applications of this invention, and the technical scope of this invention is not limited to the specific constitutions of the above embodiments.

This application claims priority based on Japanese Patent Application No. 2014-237842 filed with the Japan Patent Office on Nov. 25, 2014, and Japanese Patent Application No. 2014-237846 filed with the Japan Patent Office on Nov. 25, 2014, the entire contents of which are incorporated into this specification.

The invention claimed is:

1. A damping valve, comprising:

a valve disc including at least one passage and a valve seat provided to surround an outlet end of the at least one passage;

an annular leaf valve laminated on the valve disc away from the valve seat in a state in which a load does not act on the leaf valve, the leaf valve being configured to sit on the valve seat by deflection of an outer periphery of the leaf valve toward the valve seat so as to close the at least one passage, and the leaf valve being configured to separate from the valve seat by termination of the deflection so as to open the at least one passage;

a spacer laminated on the leaf valve, the spacer being configured to sandwich an inner part of the leaf valve between the spacer and the valve disc;

an annular plate laminated on the leaf valve and mounted on an outer periphery of the spacer slidably in an axial direction, the annular plate being configured to slide on the outer periphery of the spacer toward the valve disc to cause the outer periphery of the leaf valve to deflect; and a biasing part configured to exert a variable biasing force on the annular plate toward the valve disc to slide the annular plate, wherein the valve disc further includes an inner seat part radially inside the at least one passage, the inner seat part being configured to support the inner part of the leaf valve, an inner diameter of the annular plate is smaller than an outer diameter of the inner seat part, and an outer diameter of the annular plate is greater than an inner diameter of the valve seat.

2. The damping valve according to claim 1, further comprising at least one annular spacer interposed between the leaf valve and the valve disc, the at least one annular spacer being configured to adjust a gap between the leaf valve and the valve seat.

3. A shock absorber comprising:

a cylinder;

the damping valve according to claim 1 and accommodated within the cylinder;

an extension-side chamber and a contraction-side chamber partitioned within the cylinder by the valve disc; and a piston rod movably inserted into the cylinder and connected to the valve disc, wherein the extension-side chamber and the contraction-side chamber communicate with each other through the at least one passage.

4. The damping valve according to claim 1, wherein a rigidity of the annular plate is higher than a rigidity of the leaf valve.

5. The damping valve according to claim 1, wherein:

the valve disc further includes an inner seat part provided radially inward of the at least one passage, the inner seat part being configured to support the inner part of the leaf valve; and the annular plate is supported by the inner seat part and the valve seat in a state in which the leaf valve sits on the valve seat while the variable biasing force is exerted on the annular plate toward the valve disc.

6. A shock absorber, comprising:

a cylinder;

a piston rod movably inserted into the cylinder; and a damping valve accommodated within the cylinder, wherein:

the damping valve includes:

a valve disc connected to the piston rod, the valve disc including at least one passage and a valve seat provided to surround an outlet end of the at least one passage;

an annular leaf valve laminated on the valve disc away from the valve seat in a state in which a load does not act on the leaf valve, the leaf valve being configured to sit on the valve seat by deflection of an outer periphery of the leaf valve toward the valve seat so as to close the at least one passage, and the leaf valve being configured to separate from the valve seat by termination of the deflection so as to open the at least one passage;

a spacer laminated on the leaf valve, the spacer being configured to sandwich an inner part of the leaf valve between the spacer and the valve disc;

an annular plate laminated on the leaf valve and mounted on an outer periphery of the spacer slidably in an axial direction, the annular plate being configured to slide on the outer periphery of the spacer toward the valve disc to cause the outer periphery of the leaf valve to deflect; and a biasing part configured to exert a variable biasing force on the annular plate toward the valve disc to slide the annular plate, wherein:

the valve disc is configured to partition an inside of the cylinder into an extension-side chamber and a contraction-side chamber;

the extension-side chamber and the contraction-side chamber communicate with each other through the at least one passage;

the at least one passage comprises an extension-side passage and a contraction-side passage, each of the extension-side passage and the contraction-side passage being configured to allow the extension-side chamber to communicate with the contraction-side chamber;

the valve seat comprises an extension-side valve seat and a contraction-side valve seat, the extension-side valve seat being configured to surround the outlet end of the extension-side passage, the contraction-side valve seat being configured to surround the outlet end of the contraction-side passage;

the leaf valve comprises an extension-side leaf valve configured to open/close the extension-side passage, and a contraction-side leaf valve configured to open/close the contraction-side passage; and the biasing part comprises:

an extension-side spool configured to bias the extension-side leaf valve utilizing pressure of the extension-side chamber;

an extension-side back pressure chamber configured to press the extension-side spool with internal pressure;

a contraction-side spool configured to bias the contraction-side leaf valve utilizing pressure of the contraction-side chamber;

a contraction-side back pressure chamber configured to press the contraction-side spool with internal pressure;

a communication passage configured to communicate with the contraction-side back pressure chamber via an extension-side resistance element configured to apply resistance to a flow of passing liquid, and configured to communicate with the extension-side back pressure chamber via a contraction-side resistance element configured to apply resistance to a flow of passing liquid;

an extension-side pressure introduction passage configured to permit a flow of liquid in only one direction from the extension-side chamber toward the contraction-side back pressure chamber;

a contraction-side pressure introduction passage configured to permit only a flow of liquid from the contraction-side chamber toward the extension-side back pressure chamber;

an adjustment passage connected to the communication passage;

a contraction-side discharge passage configured to allow a downstream of the adjustment passage to communicate with the extension-side chamber, and configured to permit only a flow of liquid from the adjustment passage toward the extension-side chamber;

an extension-side discharge passage configured to allow a downstream of the adjustment passage to communicate with the contraction-side chamber, and configured to permit only a flow of liquid from the adjustment passage toward the contraction-side chamber; and a solenoid pressure control valve provided in the adjustment passage and configured to control upstream pressure of the adjustment passage.

7. The shock absorber according to claim 6, wherein when the pressure of the extension-side back pressure chamber and the pressure of the contraction-side back pressure chamber are the same, an extension-side load biasing the extension-side leaf valve by the pressure of the extension-side back pressure chamber is greater than a contraction-side load biasing the contraction-side leaf valve by the pressure of the contraction-side back pressure chamber.

8. The shock absorber according to claim 7, wherein a pressure-receiving area of the extension-side spool configured to receive the pressure of the extension-side back pressure chamber is greater than a pressure-receiving area of the contraction-side spool configured to receive the pressure of the contraction-side back pressure chamber.

9. A damping valve, comprising:

a valve disc including at least one passage and a valve seat provided to surround an outlet end of the at least one passage;

an annular leaf valve laminated on the valve disc away from the valve seat in a state in which a load does not act on the leaf valve, the leaf valve being configured to sit on the valve seat by deflection of an outer periphery of the leaf valve toward the valve seat so as to close the at least one passage, and the leaf valve being configured to separate from the valve seat by termination of the deflection so as to open the at least one passage;

a spacer laminated on the leaf valve, the spacer being configured to sandwich an inner part of the leaf valve between the spacer and the valve disc;

an annular plate laminated on the leaf valve and mounted on an outer periphery of the spacer slidably in an axial direction, the annular plate being configured to slide on the outer periphery of the spacer toward the valve disc to cause the outer periphery of the leaf valve to deflect; and a biasing part configured to exert a variable biasing force on the annular plate toward the valve disc to slide the annular plate, wherein:

the valve disc further includes an inner seat part provided at a location radially inward of the at least one passage, the inner seat part being configured to support the inner part of the leaf valve; and the annular plate is configured to push an outer part of the leaf valve toward the valve seat by the biasing part, the outer part being radially outward of the inner seat part.

* * * * *